United States Patent
Stern et al.

(10) Patent No.: US 11,281,303 B2
(45) Date of Patent: Mar. 22, 2022

(54) VISUAL INDICATOR FOR PAUSED RADAR GESTURES

(71) Applicant: Google LLC, Mountain View, CA (US)

(72) Inventors: Devon James O'Reilley Stern, Oakland, CA (US); Leonardo Giusti, San Francisco, CA (US); Vignesh Sachidanandam, Redwood City, CA (US); Lauren Bedal, San Francisco, CA (US); John David Jacobs, San Diego, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/912,635

(22) Filed: Jun. 25, 2020

(65) Prior Publication Data

US 2021/0064146 A1  Mar. 4, 2021

Related U.S. Application Data

(63) Continuation of application No. PCT/US2019/049233, filed on Aug. 30, 2019.

(51) Int. Cl.
*G09G 5/00* (2006.01)
*G06F 3/01* (2006.01)
(Continued)

(52) U.S. Cl.
CPC .............. *G06F 3/017* (2013.01); *G01S 7/415* (2013.01); *G06F 3/0346* (2013.01); *G09G 5/026* (2013.01);
(Continued)

(58) Field of Classification Search
CPC ........ G06F 3/017; G06F 3/0346; G01S 7/415; G09G 5/026
(Continued)

(56) References Cited

U.S. PATENT DOCUMENTS 5,670,987 A   9/1997  Koi et al.
6,215,890 B1  4/2001  Matsuo et al.
(Continued)

FOREIGN PATENT DOCUMENTS

CN   103502911   1/2014
CN   106062777   10/2016
(Continued)

OTHER PUBLICATIONS

"ControlAir on the Mac App Store", retrieved from https://apps.apple.com/om/app/controlair/id950009491 on Jun. 25, 2019, 2 pages.
(Continued)

*Primary Examiner* — Jonathan M Blancha
(74) *Attorney, Agent, or Firm* — Colby Nipper PLLC

(57) ABSTRACT

This document describes techniques and systems that enable a visual indicator for paused radar gestures. The techniques and systems use a radar field to enable an electronic device to accurately determine radar gestures, or other movement, by a user. Further, the electronic device can determine certain conditions that can make it difficult for the electronic device to properly determine the user's radar gestures. When the device includes an application that can be controlled using radar gestures (a radar-gesture application), and the conditions are present, the device can enter a gesture-paused mode. When the device enters this mode, the techniques provide a gesture-paused feedback element on a display, which lets the user know that there is at least one radar-gesture application available or running on the electronic device but that radar gestures cannot presently be used to control the application.

20 Claims, 20 Drawing Sheets

US 11,281,303 B2

Page 2

(51) Int. Cl.
  G01S 7/41     (2006.01)
  G06F 3/0346   (2013.01)
  G09G 5/10     (2006.01)
  G09G 5/373    (2006.01)
  G09G 5/02     (2006.01)

(52) U.S. Cl.
  CPC ............ G09G 5/10 (2013.01); G09G 5/373
        (2013.01); G09G 2354/00 (2013.01)

(58) Field of Classification Search
  USPC ........................................................ 345/156
  See application file for complete search history.

(56)          References Cited

U.S. PATENT DOCUMENTS

| | | |
|---|---|---|
| 6,727,892 B1 | 4/2004 | Murphy |
| 6,990,335 B1 | 1/2006 | Shamoon et al. |
| 8,237,666 B2 | 8/2012 | Soo et al. |
| 8,373,666 B2 | 2/2013 | Jung et al. |
| 8,508,347 B2 | 8/2013 | Pihlaja |
| 8,659,548 B2 | 2/2014 | Hildreth |
| 9,134,798 B2 | 9/2015 | Morris et al. |
| 9,207,852 B1 | 12/2015 | Zhou et al. |
| 9,448,634 B1 | 9/2016 | Wakeford et al. |
| 9,575,560 B2 | 2/2017 | Poupyrev et al. |
| 9,629,201 B2 | 4/2017 | Chen et al. |
| 9,921,660 B2 | 3/2018 | Poupyrev |
| 10,061,509 B2 | 8/2018 | Mese et al. |
| 10,088,908 B1 | 10/2018 | Poupyrev et al. |
| 10,101,874 B2 | 10/2018 | Kwon et al. |
| 10,139,916 B2 | 11/2018 | Poupyrev |
| 10,284,541 B1 | 5/2019 | Subramanian et al. |
| 10,300,370 B1 | 5/2019 | Amihood et al. |
| 10,356,617 B2 | 7/2019 | Abernathy et al. |
| 10,394,333 B2 | 8/2019 | Cheng et al. |
| 11,169,615 B2 | 11/2021 | Stern et al. |
| 2002/0158838 A1 | 10/2002 | Smith et al. |
| 2003/0095154 A1 | 5/2003 | Colmenarez |
| 2003/0122651 A1 | 7/2003 | Doi et al. |
| 2006/0256082 A1 | 11/2006 | Cho et al. |
| 2008/0178126 A1 | 7/2008 | Beeck et al. |
| 2008/0300055 A1 | 12/2008 | Lutnick et al. |
| 2009/0191968 A1 | 7/2009 | Johnson et al. |
| 2009/0296930 A1 | 12/2009 | Krantz et al. |
| 2010/0008031 A1 | 1/2010 | Reifman |
| 2010/0192102 A1 | 7/2010 | Chmielewski et al. |
| 2010/0205667 A1 | 8/2010 | Anderson et al. |
| 2010/0215254 A1 | 8/2010 | Prokhorov |
| 2010/0306716 A1 | 12/2010 | Perez |
| 2011/0090761 A1 | 4/2011 | Nishino et al. |
| 2011/0181509 A1 | 7/2011 | Rautiainen et al. |
| 2011/0181510 A1 | 7/2011 | Hakala et al. |
| 2011/0185318 A1 | 7/2011 | Hinckley et al. |
| 2011/0304541 A1* | 12/2011 | Dalal ............... G06F 3/017 345/158 |
| 2011/0310005 A1 | 12/2011 | Chen et al. |
| 2012/0032834 A1 | 2/2012 | Weeks et al. |
| 2012/0092284 A1 | 4/2012 | Rofougaran et al. |
| 2012/0110516 A1 | 5/2012 | Tumanov |
| 2012/0131229 A1 | 5/2012 | McCarthy et al. |
| 2012/0185910 A1 | 7/2012 | Miettinen et al. |
| 2012/0194551 A1 | 8/2012 | Osterhout et al. |
| 2012/0214594 A1 | 8/2012 | Kirovski et al. |
| 2012/0229377 A1 | 9/2012 | Kim et al. |
| 2012/0235790 A1 | 9/2012 | Zhao et al. |
| 2012/0280900 A1 | 11/2012 | Wang et al. |
| 2013/0038564 A1 | 2/2013 | Ho |
| 2013/0106898 A1 | 5/2013 | Saint-Loubert-Bie et al. |
| 2013/0191791 A1 | 7/2013 | Rydenhag et al. |
| 2013/0316687 A1 | 11/2013 | Subbaramoo et al. |
| 2014/0028539 A1 | 1/2014 | Newham et al. |
| 2014/0118257 A1 | 5/2014 | Baldwin |
| 2014/0124647 A1 | 5/2014 | Hsu |
| 2014/0139422 A1 | 5/2014 | Mistry et al. |
| 2014/0332441 A1 | 11/2014 | Jayetileke et al. |
| 2014/0333431 A1 | 11/2014 | Abdelsamie et al. |
| 2014/0358368 A1 | 12/2014 | Entenmann et al. |
| 2015/0007049 A1 | 1/2015 | Langlois |
| 2015/0084852 A1 | 3/2015 | Shon et al. |
| 2015/0088283 A1 | 3/2015 | Fiedler et al. |
| 2015/0121108 A1 | 4/2015 | Agrawal et al. |
| 2015/0169071 A1 | 6/2015 | Jitkoff |
| 2015/0205821 A1 | 7/2015 | Kogan |
| 2015/0212641 A1 | 7/2015 | Tanneberger et al. |
| 2015/0277569 A1 | 10/2015 | Sprenger et al. |
| 2015/0324004 A1 | 11/2015 | Lee et al. |
| 2015/0346820 A1 | 12/2015 | Poupyrev et al. |
| 2015/0362986 A1 | 12/2015 | Lee et al. |
| 2016/0041617 A1* | 2/2016 | Poupyrev ............... G01S 7/415 345/156 |
| 2016/0041618 A1 | 2/2016 | Poupyrev |
| 2016/0054803 A1 | 2/2016 | Poupyrev |
| 2016/0071341 A1 | 3/2016 | Menzel |
| 2016/0073351 A1 | 3/2016 | Cardozo et al. |
| 2016/0098089 A1 | 4/2016 | Poupyrev |
| 2016/0150124 A1 | 5/2016 | Panda et al. |
| 2016/0170491 A1 | 6/2016 | Jung |
| 2016/0179205 A1 | 6/2016 | Katz |
| 2016/0187992 A1 | 6/2016 | Yamamoto et al. |
| 2016/0216769 A1* | 7/2016 | Goetz .................. G06F 3/0304 |
| 2016/0252607 A1 | 9/2016 | Saboo et al. |
| 2016/0261760 A1 | 9/2016 | Aso et al. |
| 2016/0275348 A1 | 9/2016 | Slaby et al. |
| 2016/0306491 A1 | 10/2016 | Lee et al. |
| 2016/0320854 A1 | 11/2016 | Lien et al. |
| 2017/0010658 A1 | 1/2017 | Tanaka et al. |
| 2017/0021728 A1 | 1/2017 | Holger et al. |
| 2017/0052618 A1 | 2/2017 | Lee et al. |
| 2017/0097413 A1 | 4/2017 | Gillian et al. |
| 2017/0097684 A1 | 4/2017 | Lien |
| 2017/0115738 A1 | 4/2017 | Wei |
| 2017/0115739 A1 | 4/2017 | Wei |
| 2017/0168595 A1 | 6/2017 | Sakaguchi et al. |
| 2017/0220843 A1 | 8/2017 | Apostolos et al. |
| 2017/0243389 A1 | 8/2017 | Wild et al. |
| 2017/0289766 A1 | 10/2017 | Scott et al. |
| 2017/0299710 A1 | 10/2017 | Shin et al. |
| 2017/0337431 A1 | 11/2017 | Yang et al. |
| 2017/0358940 A1 | 12/2017 | Parikh et al. |
| 2018/0004301 A1 | 1/2018 | Poupyrev |
| 2018/0040144 A1* | 2/2018 | Li ........................ G06F 16/958 |
| 2018/0043246 A1 | 2/2018 | Chang |
| 2018/0052518 A1 | 2/2018 | Zhu et al. |
| 2018/0082656 A1 | 3/2018 | Ito et al. |
| 2018/0117447 A1 | 5/2018 | Tran |
| 2018/0157330 A1 | 6/2018 | Gu et al. |
| 2018/0164893 A1 | 6/2018 | Sperrhake et al. |
| 2018/0164942 A1 | 6/2018 | Huffman et al. |
| 2018/0173323 A1* | 6/2018 | Harvey .................. G06F 3/014 |
| 2018/0211024 A1 | 7/2018 | Zhao et al. |
| 2018/0329050 A1 | 11/2018 | Amihood et al. |
| 2019/0011993 A1 | 1/2019 | Ette et al. |
| 2019/0072410 A1 | 3/2019 | Tang |
| 2019/0079590 A1* | 3/2019 | Tomizawa ......... G02B 27/0172 |
| 2019/0087621 A1 | 3/2019 | Khuri-Yakub et al. |
| 2019/0129520 A1 | 5/2019 | Shin et al. |
| 2019/0138109 A1 | 5/2019 | Poupyrev et al. |
| 2019/0162010 A1 | 5/2019 | Rafrafi et al. |
| 2019/0187265 A1 | 6/2019 | Barbello et al. |
| 2019/0260661 A1 | 8/2019 | Amini et al. |
| 2019/0278339 A1 | 9/2019 | Cooper et al. |
| 2019/0286806 A1 | 9/2019 | Robinson et al. |
| 2019/0354668 A1 | 11/2019 | Flautner et al. |
| 2019/0357049 A1 | 11/2019 | Tali et al. |
| 2019/0389563 A1 | 12/2019 | Swain |
| 2020/0081560 A1 | 3/2020 | Geller et al. |
| 2020/0142645 A1 | 5/2020 | Wibbels et al. |
| 2020/0159897 A1 | 5/2020 | Schmitt et al. |
| 2020/0204541 A1 | 6/2020 | Nair et al. |
| 2020/0219338 A1 | 7/2020 | Chen et al. |
| 2020/0364967 A1 | 11/2020 | Spice |
| 2020/0366742 A1 | 11/2020 | Van Os et al. |
| 2020/0372239 A1 | 11/2020 | Schmitt et al. |

(56) References Cited

U.S. PATENT DOCUMENTS

| | | |
|---|---|---|
| 2020/0410072 A1 | 12/2020 | Giusti et al. |
| 2021/0019441 A1 | 1/2021 | Neves Creto et al. |
| 2021/0025976 A1 | 1/2021 | Alok et al. |
| 2021/0026454 A1 | 1/2021 | Hong et al. |
| 2021/0027049 A1 | 1/2021 | Chandel et al. |
| 2021/0029542 A1 | 1/2021 | Prag et al. |
| 2021/0064142 A1 | 3/2021 | Stern et al. |
| 2021/0064143 A1 | 3/2021 | Stern et al. |
| 2021/0064144 A1 | 3/2021 | Stern et al. |
| 2021/0064145 A1 | 3/2021 | Stern et al. |
| 2021/0103337 A1 | 4/2021 | Jeppsson et al. |
| 2021/0103348 A1 | 4/2021 | Jeppsson et al. |
| 2021/0158138 A1 | 5/2021 | Hazra et al. |
| 2021/0314250 A1 | 10/2021 | Laplante et al. |
| 2021/0342008 A1 | 11/2021 | Sachidanandam et al. |
| 2022/0026993 A1 | 1/2022 | Stern et al. |

FOREIGN PATENT DOCUMENTS

| | | |
|---|---|---|
| CN | 106339076 | 1/2017 |
| CN | 106537173 | 3/2017 |
| CN | 107710012 | 2/2018 |
| CN | 108781308 | 11/2018 |
| EP | 2385450 | 11/2011 |
| EP | 3267291 | 1/2018 |
| GB | 2548964 | 10/2017 |
| GB | 2575185 | 1/2020 |
| JP | 2016076061 | 5/2016 |
| KR | 20150033182 | 4/2015 |
| KR | 20150112708 | 10/2015 |
| WO | 2015196063 | 12/2015 |
| WO | 2016022764 | 2/2016 |
| WO | 2019118017 | 6/2019 |
| WO | 2019146032 | 8/2019 |
| WO | 2019206091 | 10/2019 |
| WO | 2021021218 | 2/2021 |
| WO | 2021021219 | 2/2021 |
| WO | 2021021220 | 2/2021 |
| WO | 2021021224 | 2/2021 |
| WO | 2021021227 | 2/2021 |
| WO | 2021040742 | 3/2021 |
| WO | 2021040745 | 3/2021 |
| WO | 2021040747 | 3/2021 |
| WO | 2021040749 | 3/2021 |

OTHER PUBLICATIONS

"Intelligent Rendering of Readable Content onto Display Devices", Published on IP.com on Sep. 21, 2010, Sep. 21, 2010, 4 pages.
"International Search Report and Written Opinion", PCT Application No. PCT/US2019/039306, dated Mar. 11, 2020, 17 pages.
"International Search Report and Written Opinion", PCT Application No. PCT/US2019/049208, dated Mar. 26, 2020, 13 pages.
"International Search Report and Written Opinion", PCT Application No. PCT/US2019/049212, dated Mar. 26, 2020, 14 pages.
"International Search Report and Written Opinion", PCT Application No. PCT/US2019/053676, dated Apr. 2, 2020, 14 pages.
"International Search Report and Written Opinion", PCT Application No. PCT/US2019/049233, dated Apr. 20, 2020, 19 pages.
"International Search Report and Written Opinion", PCT Application No. PCT/US2019/049236, dated May 26, 2020, 17 pages.
"International Search Report and Written Opinion", PCT Application No. PCT/US2019/049204, dated May 4, 2020, 15 pages.
"International Search Report and Written Opinion", PCT Application No. PCT/US2019/049164, dated May 6, 2020, 14 pages.
"International Search Report and Written Opinion", PCT Application No. PCT/US2019/049225, dated May 6, 2020, 15 pages.
Aboussouan, "Super-Resolution Image Construction Using an Array Camera", Technical Disclosure Commons; Retrieved from http://www.tdcommons.org/dpubs_series/643, Aug. 18, 2017, 7 pages.
Amihood, et al., "Closed-Loop Manufacturing System Using Radar", Technical Disclosure Commons; Retrieved from http://www.tdcommons.org/dpubs_series/464, Apr. 17, 2017, 8 pages.
Bardram, et al., "Context-Aware User Authentication—Supporting Proximity-Based Login in Pervasive Computing", Centre for Pervasive Computing; Department of Computer Science, University of Aarhus; A.K. Dey et al. (Eds.): UbiComp 2003, LNCS 2864; © Springer-Verlag Berlin Heidelberg, 2003, pp. 107-123.
Colgan, "How Does the Leap Motion Controller Work?", Retrieved from http://blog.leapmotion.com/hardware-to-software-how-does-the-leap-motion-controller-work/ on Jun. 25, 2019, Aug. 9, 2014, 10 pages.
Karagozler, et al., "Embedding Radars in Robots to Accurately Measure Motion", Technical Disclosure Commons; Retrieved from http://www.tdcommons.org/dpubs_series/454, Mar. 30, 2017, 8 pages.
Lien, et al., "Embedding Radars in Robots for Safety and Obstacle Detection", Technical Disclosure Commons; Retrieved from http://www.tdcommons.org/dpubs_series/455, Apr. 2, 2017, 10 pages.
Oh, et al., "Gesture Sensor for Mobile Devices", Samsung Electronics Co., Ltd; White Paper, 2013, 12 pages.
"Foreign Office Action", KR Application No. 10-2019-0157391, dated Jan. 29, 2021, 8 pages.
"Non-Final Office Action", U.S. Appl. No. 16/912,307, filed Mar. 19, 2021, 11 pages.
"Non-Final Office Action", U.S. Appl. No. 16/601,452, filed Mar. 24, 2021, 13 pages.
"International Search Report and Written Opinion", PCT Application No. PCT/US2019/055731, dated Mar. 26, 2020, 15 pages.
"International Search Report and Written Opinion", PCT Application No. PCT/US2019/049216, dated Apr. 2, 2020, 14 pages.
"Non-Final Office Action", U.S. Appl. No. 16/601,421, filed Oct. 2, 2020, 15 pages.
"Final Office Action", U.S. Appl. No. 16/601,421, filed Mar. 30, 2021, 17 pages.
"Foreign Office Action", KR Application No. 10-2019-0157394, dated Mar. 25, 2021, 10 pages.
"Non-Final Office Action", U.S. Appl. No. 16/912,373, filed Apr. 1, 2021, 15 pages.
"Non-Final Office Action", U.S. Appl. No. 16/871,945, filed May 7, 2021, 41 pages.
"Non-Final Office Action", U.S. Appl. No. 16/871,945, filed Mar. 8, 2021, 41 pages.
Poupyrev, "Welcome to Project Soli—Youtube", Retrieved at: https://www.youtube.com/watch?v=0QNiZfSsPc0, May 29, 2015, 1 page.
Yeeun, "Brain Out—Blog", Retrieved at: https://blog.naver.com/junye2147/221658923923, Sep. 25, 2019, 29 pages.
"Notice of Allowance", U.S. Appl. No. 16/912,307, dated Jun. 23, 2021, 8 pages.
"Final Office Action", U.S. Appl. No. 16/871,945, dated Aug. 25, 2021, 46 pages.
"Final Office Action", U.S. Appl. No. 16/601,452, dated Sep. 30, 2021, 15 pages.
"Final Office Action", U.S. Appl. No. 16/912,373, dated Oct. 8, 2021, 11 pages.
"Foreign Notice of Allowance", KR Application No. 10-2019-0157394, dated Sep. 24, 2021, 3 pages.
"Foreign Office Action", CN Application No. 201980006096.3, dated Jul. 14, 2021, 18 pages.
"Foreign Office Action", KR Application No. 10-2019-0157391, dated Jul. 29, 2021, 9 pages.
"Non-Final Office Action", U.S. Appl. No. 16/601,421, dated Sep. 14, 2021, 29 pages.
"Non-Final Office Action", U.S. Appl. No. 16/879,662, dated Sep. 16, 2021, 12 pages.
Park, "Development of Kinect-Based Pose Recognition Model for Exercise Game", May 2016, pp. 303-310.
"Notice of Allowance", U.S. Appl. No. 16/879,662, dated Nov. 17, 2021, 7 pages.
"Extended European Search Report", EP Application No. 21191070.8, dated Dec. 1, 2021, 13 pages.
"Non-Final Office Action", U.S. Appl. No. 16/965,735, dated Nov. 23, 2021, 12 pages.
"Non-Final Office Action", U.S. Appl. No. 16/872,055, dated Nov. 23, 2021, 25 pages.
"Non-Final Office Action", U.S. Appl. No. 16/886,626, dated Dec. 17, 2021, 11 pages.

(56) References Cited

OTHER PUBLICATIONS

"Foreign Office Action", KR Application No. 10-2021-7037578, dated Jan. 19, 2022, 6 pages.
"International Preliminary Report on Patentability", Application No. PCT/US2019/039306, dated Dec. 28, 2021, 11 pages.
"Non-Final Office Action", U.S. Appl. No. 16/912,534, dated Jan. 6, 2022, 21 pages.
"Non-Final Office Action", U.S. Appl. No. 16/912,603, dated Feb. 3, 2022, 14 pages.
"Non-Final Office Action", U.S. Appl. No. 16/912,373, dated Dec. 24, 2021, 6 pages.
"Non-Final Office Action", U.S. Appl. No. 16/871,945, dated Dec. 24, 2021, 8 pages.

* cited by examiner

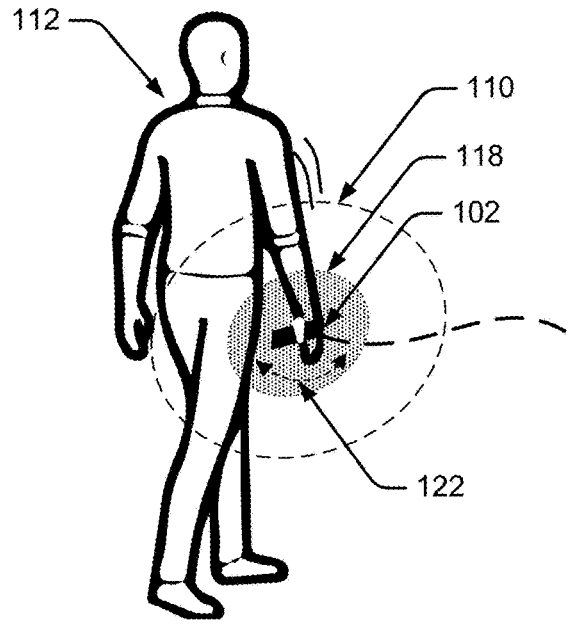
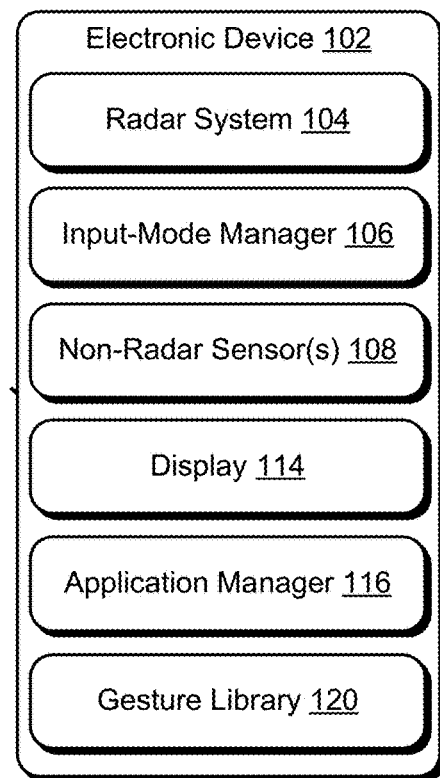
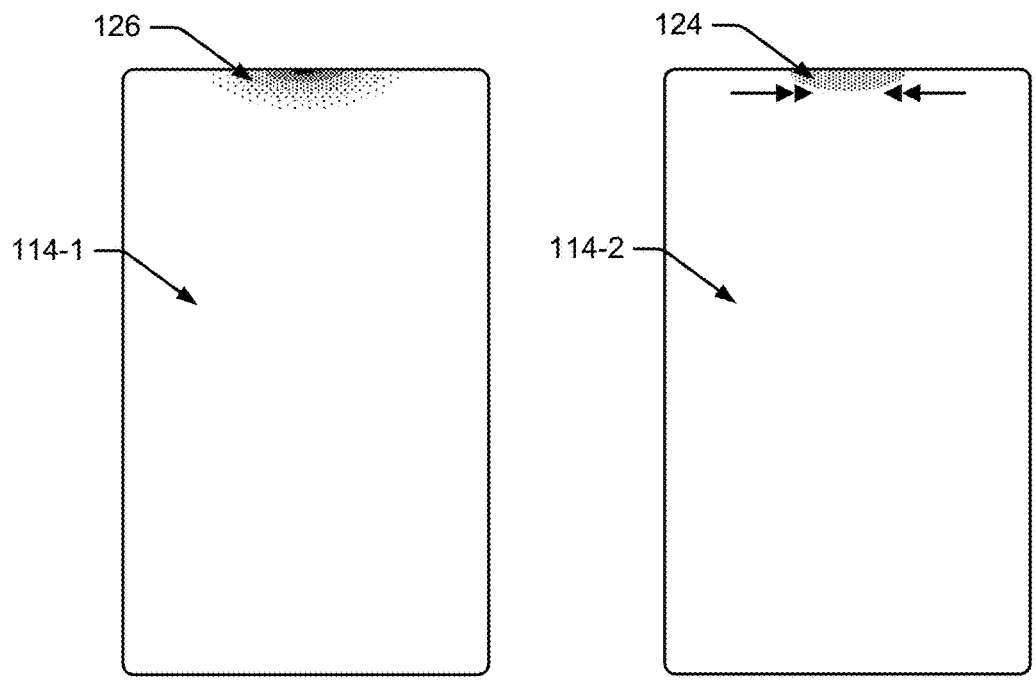
FIG. 1

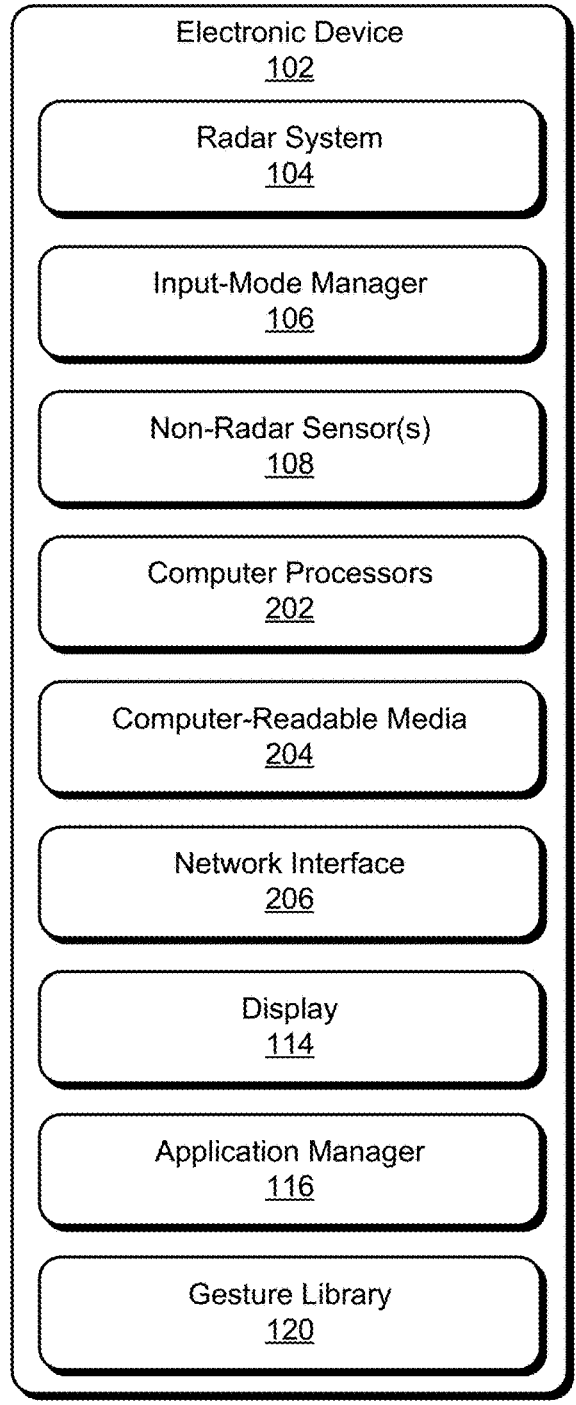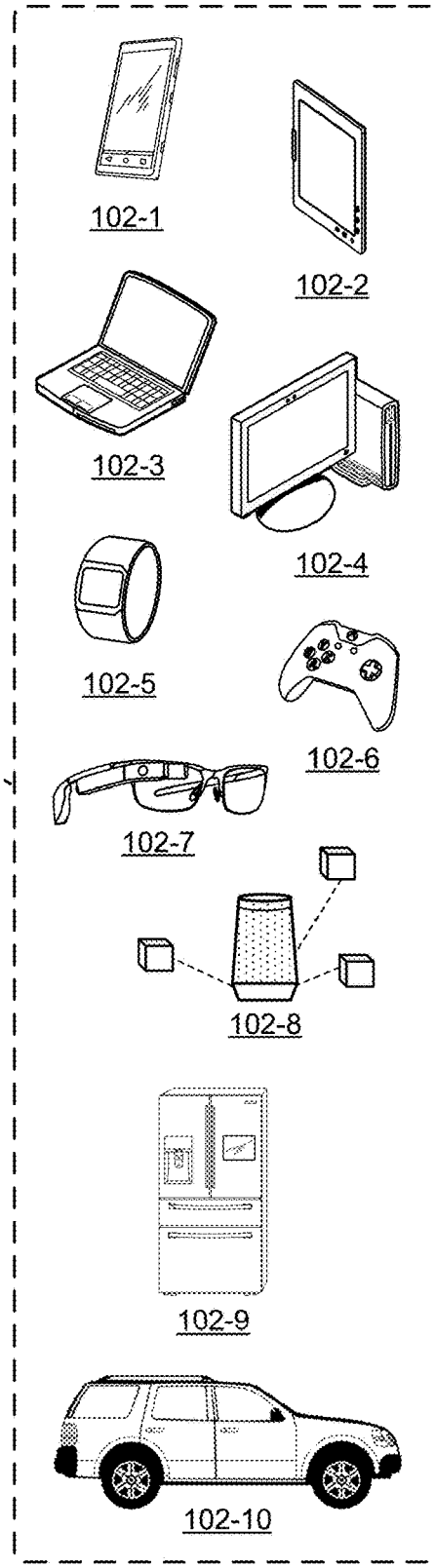
FIG. 2

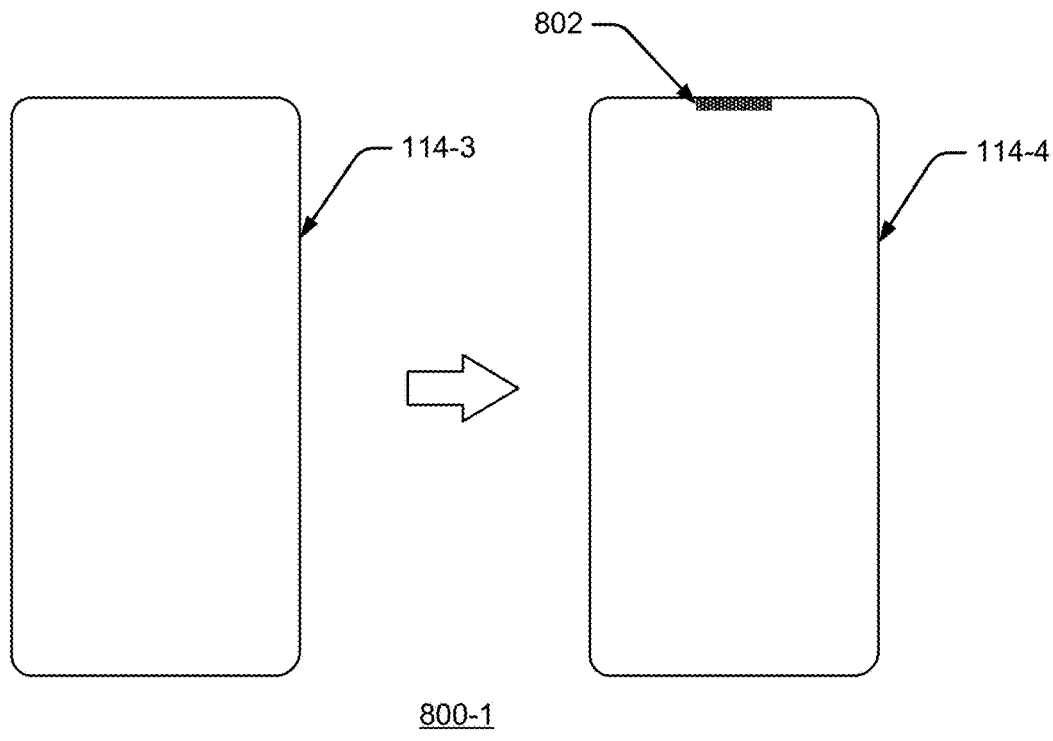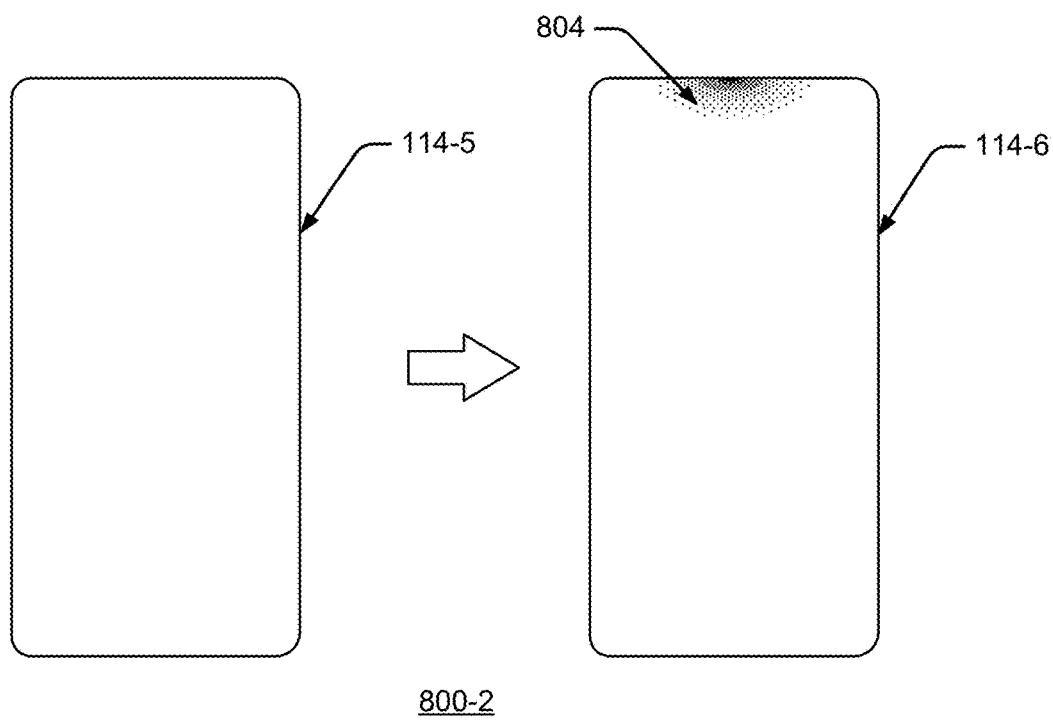
FIG. 8

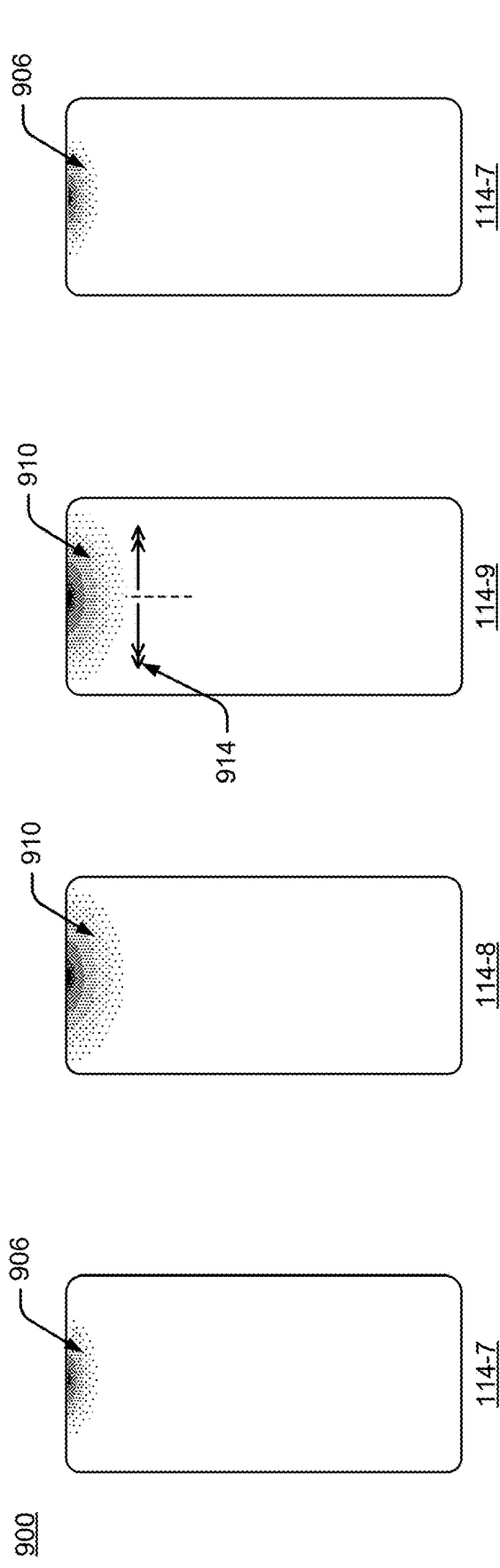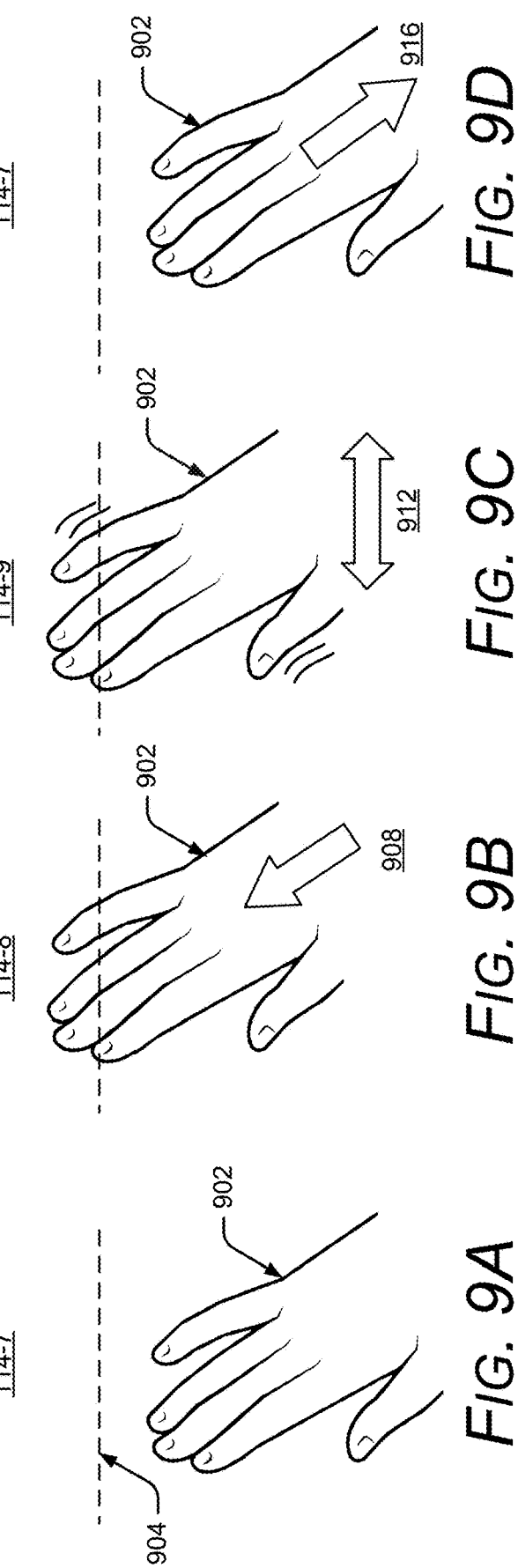

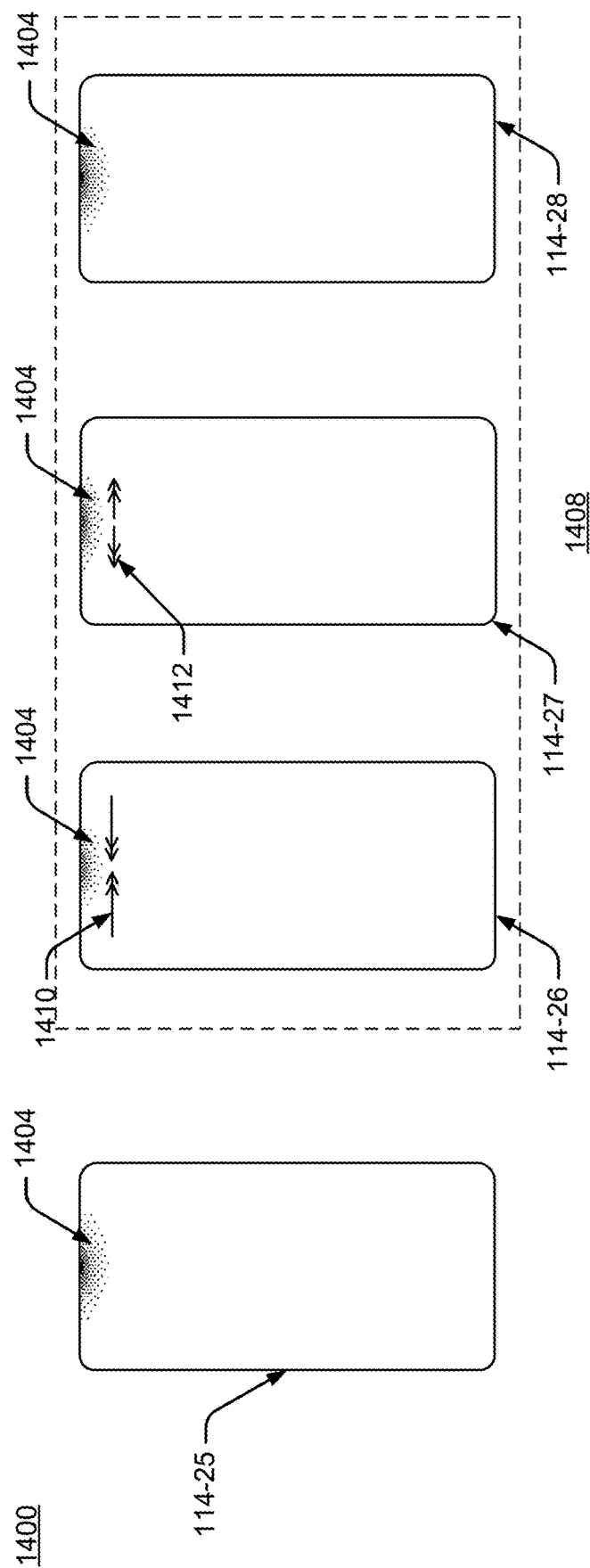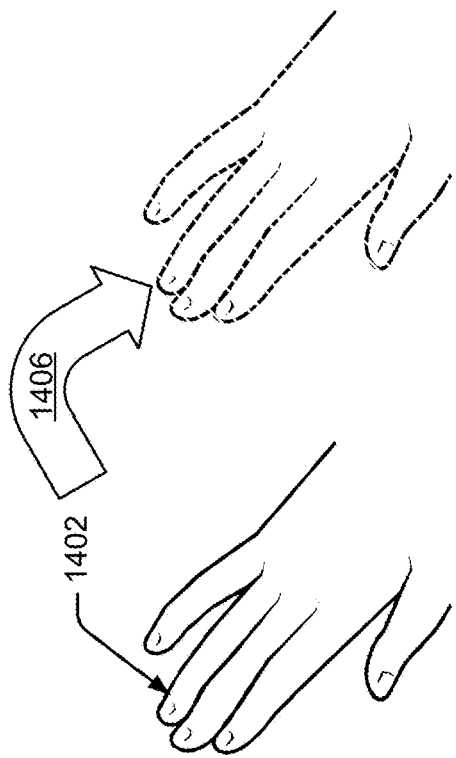
FIG. 14

VISUAL INDICATOR FOR PAUSED RADAR GESTURES

RELATED APPLICATIONS

This application is a continuation application of International Application No. PCT/US2019/049233, filed Aug. 30, 2019, and titled "Visual Indicator for Paused Radar Gestures," the disclosure of which is incorporated in its entirety by reference herein.

BACKGROUND

Smartphones, wearable computers, tablets, and other electronic devices are relied upon for both personal and business use. Users communicate with them via voice and touch and treat them like a virtual assistant to schedule meetings and events, consume digital media, and share presentations and other documents. Further, machine-learning techniques can help these devices to anticipate some of their users' preferences for using the devices. For all this computing power and artificial intelligence, however, these devices are still reactive communicators. That is, however "smart" a smartphone is, and however much the user talks to it like it is a person, the electronic device is still dependent on being activated before it can perform tasks and provide feedback. To activate the mobile device, the user typically has to first pick up the device to make it aware of the user's intention to use the electronic device. Only after this physical interaction can the device make applications and functionality available for the user. Consequently, many electronic devices provide poor user experiences prior to explicit interaction by the user.

SUMMARY

This document describes techniques and systems that enable a visual indicator for paused radar gestures. The techniques and systems use a radar field to enable an electronic device to accurately determine the presence or absence of a user near the electronic device and to detect a reach or other radar gesture the user makes. Further, the electronic device can determine certain conditions that can make it difficult for the electronic device to properly determine the user's radar gestures. When the device includes an application that can be controlled using radar gestures, and the conditions are present, the device may enter a state in which radar gestures are paused. When the device enters this state, the techniques provide a gesture-paused feedback element. The gesture-paused feedback element lets the user know that, while there is at least one application available or running on the electronic device that can be controlled with radar gestures, the radar gestures cannot presently be used to control the application. This can also educate the user about what the electronic device is capable of and allow the user to take advantage of the additional functionality and features provided by the availability of the radar gesture.

Aspects described below also include a method implemented in an electronic device that includes a display, a computer processor, and a radar system. The method comprises detecting, a gesture-pause trigger, the detecting during a period in which: the radar system provides a radar field through which a radar gesture can be determined and an application capable of receiving a control input corresponding to the radar gesture is executing, through the computer processor, on the electronic device. The method also comprises providing, in response to detecting the gesture-pause trigger, a gesture-paused feedback element on the display of the electronic device. The gesture-paused feedback element indicates that the application cannot receive the control input corresponding to the radar gesture.

Aspects described below include an electronic device comprising a display, a computer processor, a radar system, and a computer-readable media. The radar system is implemented at least partially in hardware and provides a radar field. The radar system also senses reflections from a user in the radar field, analyzes the reflections from the user in the radar field, and provides radar data based on the analysis of the reflections. The computer-readable media includes stored instructions that can be executed by the computer processor to implement an input-mode manager. The input-mode manager detects a gesture-pause trigger. The gesture-pause trigger is detected by the input-mode manager during a period in which the radar system is providing the radar field through which a radar gesture can be determined based on the radar data and during which an application capable of receiving a control input corresponding to the radar gesture is executing, through the computer processor, on the electronic device. The input-mode manager also provides, in response to the detection of the gesture-pause trigger, a gesture-paused feedback element on the display of the electronic device. The gesture-paused feedback element indicates that the application cannot receive the control input corresponding to the radar gesture.

Aspects described below include a system comprising a display, and an electronic device that includes, or is associated with means for providing a radar field that provides radar data, the radar data based on sensing and analyzing reflections from an object in the radar field. The system also includes means for detecting a gesture-pause trigger during a period in which the radar system is providing the radar field through which a radar gesture can be determined based on the radar data and in which an application capable of receiving a control input corresponding to the radar gesture is executing, through the computer processor, on the electronic device. The system also includes means for providing, in response to the detection of the gesture-pause trigger, a gesture-paused feedback element on the display of the electronic device. The gesture-paused feedback element indicates that the application cannot receive the control input corresponding to the radar gesture.

This summary is provided to introduce simplified concepts concerning the visual indicator for paused radar gestures, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a visual indicator for paused radar gestures are described in this document with reference to the following drawings. The same numbers are used throughout the drawings to reference like features and components:

FIG. 1 illustrates an example environment in which techniques enabling the visual indicator for paused radar gestures can be implemented.

FIG. 2 illustrates an example implementation of an electronic device, including a radar system, that can implement the visual indicator for paused radar gestures.

FIGS. 8-14 illustrate visual elements, which can be presented on the display of the electronic device of FIGS. 1 and 2 when a radar-gesture application is running on the electronic device, to provide feedback related to radar gestures.

DETAILED DESCRIPTION

Overview

Figure 3:
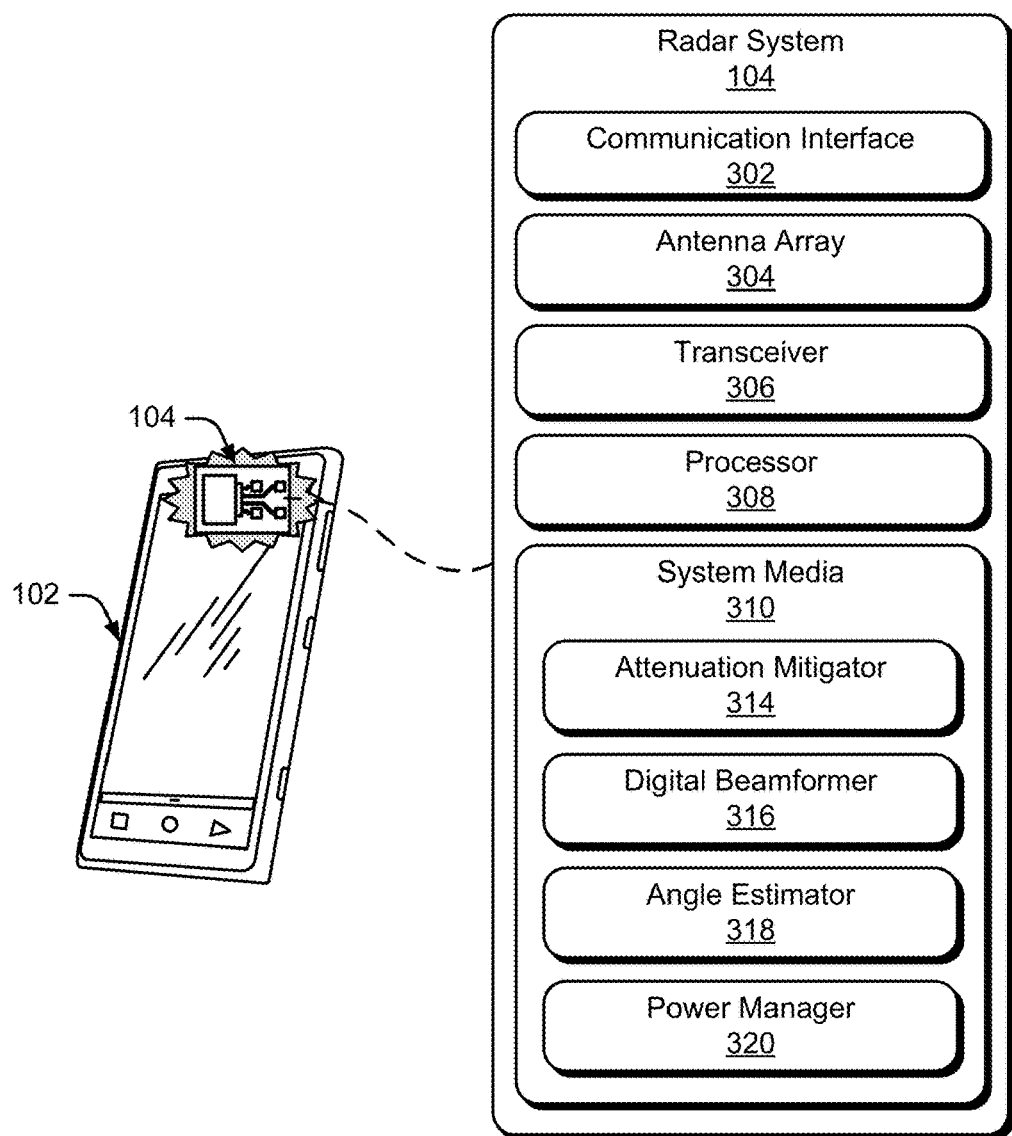
FIG. 3 illustrates an example implementation of the radar system of FIGS. 1 and 2.

This document describes techniques and systems that enable a visual indicator for paused radar gestures. The described techniques employ a radar system that detects and determines radar-based touch-independent gestures (radar gestures) that are made by the user. The techniques also determine when the device is running an application that can receive control input through radar-based touch-independent gestures (a radar-gesture application). When the device is running a radar-gesture application (or has one stored that can be run) and certain conditions are present, the device may enter a state in which radar gestures are paused (sometimes referred to as a gesture-paused mode). When the device enters this state, the techniques provide a gesture-paused feedback element, which gives the user feedback when radar gestures are not available to control a radar-gesture application on the electronic device.

In this description, the terms "radar-based touch-independent gesture," "3D gesture," or "radar gesture" refer to the nature of a gesture in space, away from the electronic device (e.g., the gesture does not require the user to touch the device, though the gesture does not preclude touch). The radar gesture itself may often only have an active informational component that lies in two dimensions, such as a radar gesture consisting of an upper-left-to-lower-right swipe in a plane, but because the radar gesture also has a distance from the electronic device (a "third" dimension), the radar gestures discussed herein can be generally be considered three-dimensional.

Using these techniques, the electronic device can provide feedback and a notification to make the user aware of the available radar gestures and provide feedback regarding the use, success, failure, and results of the radar gestures. In some cases, a determination of the user's absence, presence, or location can also be used to provide a more-responsive and more-efficient authentication process. For example, the techniques enable the device to anticipate when the user is ready to be authenticated and to more-accurately determine when to lock the device when the user is away. Because the described techniques allow the electronic device to provide the user with useful feedback about available input modes, interactions may be more convenient and less frustrating because the user is aware of the input modes and can be confident about different ways in which the device can interact and receive input.

Consider an example smartphone that includes the described radar system. In this example, a radar-gesture application (e.g., an application that has a capability to receive a control input through radar gestures to control the application) is operating on the electronic device. Examples of radar-gesture applications include music players, media players, and applications or features of an electronic device that provide alerts or reminders, such as a calendar or clock. In this example, an input-mode manager causes the electronic device to present a gesture-paused feedback element on a display of the device when the device enters the state in which radar gestures are paused, such as the gesture-paused mode. The device may enter this gesture-paused state based on various conditions related to factors such as the velocity, position, or motion of the user or the electronic device. For example, the user may be walking with the electronic device in a pocket or other container while the user's hands are swinging back and forth within a gesture zone of the electronic device, which can create ambiguity regarding whether the user intends to make a radar gesture.

The gesture zone is a volume around the electronic device that is a sub-volume of the radar field and within which the electronic device, the radar system, the input-mode manager (or another component associated with the electronic device) can determine a radar gesture (e.g., using radar data to determine various parameters of a user's motion within the gesture zone). The gesture zone may be a threshold distance, such as within approximately three, five, seven, nine, or twelve inches. In some cases, the gesture zone may extend different threshold distances from the electronic device in different directions (e.g., it can have a wedged, oblong, ellipsoid, or asymmetrical shape). The size or shape of the gesture zone can also vary over time or be based on other factors such as a state of the electronic device (e.g., battery level, orientation, locked or unlocked), or an environment (such as in a pocket or purse, in a car, or on a flat surface).

The gesture-paused feedback element is a user-perceivable element (e.g., a visual element that is presented on the display of the electronic device) that indicates to the user that the radar-gesture applications on the electronic device are not currently able to be controlled by a radar gesture. These elements can be used to inform the user that a condition has been detected that currently precludes the use of the radar gesture for interacting with the radar-gesture application. For example, when a radar-gesture application is running on the electronic device, the display may present an icon, a contrasted lighting area (e.g., an area that is brighter or dimmer than the surrounding area), or an area of different or contrasting color (including in some cases, a combination of one or more of these features). When the device enters, or is in, the gesture-paused state, the gesture-paused feedback element is presented and when the device exits, or is not in, the gesture-paused state, the gesture-paused feedback element is not presented.

The described techniques and systems employ a radar system, along with other features, to provide a useful and rewarding user experience, including visual feedback, based on the user's gestures and the operation of a radar-gesture application on the electronic device. Rather than relying only on the user's knowledge and awareness of a particular radar-gesture application, the electronic device can provide feedback to the user to indicate the availability, success, or failure of a radar gesture the user made.

Some conventional electronic devices may include sensors, such as cameras, proximity sensors (e.g., capacitive or infra-red sensors), or accelerometers to determine the location of the user and adjust various functions of the electronic device based on the proximity of the user. For example, the electronic device may provide additional privacy or aesthetic value by turning off a display unless the user is within a predetermined distance. The conventional electronic device, however, typically cannot provide a useful and rich ambient experience that can educate the user about the capabilities of the electronic device and the user's interactions with the electronic device. These are but a few examples of how the described techniques and devices may be used to enable a visual indicator for paused radar gestures, other examples and implementations of which are described throughout this document. The document now turns to an example operating environment, after which example devices, methods, and systems are described.

Operating Environment

FIG. 1 illustrates an example environment 100 in which techniques enabling a visual indicator for paused radar gestures can be implemented. The example environment 100 includes an electronic device 102, which includes, or is associated with, a persistent radar system 104, a persistent input-mode manager 106 (input-mode manager 106), and, optionally, one or more non-radar sensors 108 (non-radar sensor 108). The term "persistent," with reference to the radar system 104 or the input-mode manager 106, means that no user interaction is required to activate the radar system 104 (which may operate in various modes, such as a dormant mode, an engaged mode, or an active mode) or the input-mode manager 106. In some implementations, the "persistent" state may be paused or turned off (e.g., by a user). In other implementations, the "persistent" state may be scheduled or otherwise managed in accordance with one or more parameters of the electronic device 102 (or another electronic device). For example, the user may schedule the "persistent" state such that it is only operational during daylight hours, even though the electronic device 102 is on both at night and during the day. The non-radar sensor 108 can be any of a variety of devices, such as an audio sensor (e.g., a microphone), a touch-input sensor (e.g., a touch-screen), or an image-capture device (e.g., a camera or video-camera).

In the example environment 100, the radar system 104 provides a radar field 110 by transmitting one or more radar signals or waveforms as described below with reference to FIGS. 3-6. The radar field 110 is a volume of space from which the radar system 104 can detect reflections of the radar signals and waveforms (e.g., radar signals and waveforms reflected from objects in the volume of space). The radar field 110 may be configured in multiple shapes, such as a sphere, a hemisphere, an ellipsoid, a cone, one or more lobes, or an asymmetric shape (e.g., that can cover an area on either side of an obstruction that is not penetrable by radar). The radar system 104 also enables the electronic device 102, or another electronic device, to sense and analyze reflections from an object in the radar field 110. The radar field 110 may be used to provide a recognition zone. The recognition zone is a volume around the radar system 104 that may extend any of a variety of distances from the radar system 104, such as approximately three, seven, ten, or fourteen feet (or approximately one, two, three, or four meters). The recognition zone may be the same or less than a maximum extent of the radar field 110. The recognition zone may be a static size or shape that is predefined, user-selectable, or determined via another method (e.g., based on power requirements, remaining battery life, or another factor).

In some cases, the recognition zone may be dynamically and automatically adjustable (e.g., by the radar system 104, the input-mode manager 106, or another component) based on various factors, such as the velocity or location of the electronic device 102, a time of day, or a state of an application running on the electronic device 102. The threshold distance or recognition zone can be determined based on a number of relevant factors, such as battery level, location of the electronic device, velocity of the electronic device, or data received from one or more of the radar system, other sensors, or applications running on the electronic device.

Some implementations of the radar system 104 are particularly advantageous as applied in the context of smartphones, such as the electronic device 102, for which there is a convergence of issues such as a need for low power, a need for processing efficiency, limitations in a spacing and layout of antenna elements, and other issues, and are even further advantageous in the particular context of smartphones for which radar detection of fine hand gestures is desired. Although the implementations are particularly advantageous in the described context of the smartphone for which fine radar-detected hand gestures are required, it is to be appreciated that the applicability of the features and advantages of the present invention is not necessarily so limited, and other implementations involving other types of electronic devices (e.g., as described with reference to FIG. 2) are also within the scope of the present teachings.

The object may be any of a variety of objects from which the radar system 104 can sense and analyze radar reflections, such as wood, plastic, metal, fabric, a human body, or a portion of a human body (e.g., a foot, hand, or finger of a user of the electronic device 102). As shown in FIG. 1, the object is a user 112 of the electronic device 102. Based on the analysis of the reflections, the radar system 104 can provide radar data that includes various types of information associated with the radar field 110 and the reflections from the user 112 (or a portion of the user 112), as described with reference to FIGS. 3-6 (e.g., the radar system 104 can pass the radar data to other entities, such as the input-mode manager 106).

The radar data can be continuously or periodically provided over time, based on the sensed and analyzed reflections from the object (e.g., the user 112 or the portion of the user 112 in the radar field 110). A position of the user 112 can change over time (e.g., the object in the radar field may move within the radar field 110) and the radar data can thus vary over time corresponding to the changed positions, reflections, and analyses. Because the radar data may vary over time, the radar system 104 provides radar data that includes one or more subsets of radar data that correspond to different periods of time. For example, the radar system 104 can provide a first subset of the radar data corresponding to a first time-period, a second subset of the radar data corresponding to a second time-period, and so forth. In some cases, different subsets of the radar data may overlap, entirely or in part (e.g., one subset of the radar data may include some or all of the same data as another subset).

The electronic device 102 can also include a display 114 and an application manager 116. The display 114 can include any suitable display device, such as a touchscreen, a liquid crystal display (LCD), thin film transistor (TFT) LCD, an in-place switching (IPS) LCD, a capacitive touchscreen display, an organic light emitting diode (OLED) display, an active-matrix organic light-emitting diode (AMOLED) display, super AMOLED display, and so forth. The display 114 is used to display visual elements that are associated with various modes of the electronic device 102, which are described in further detail with reference to FIGS. 8-19. The application manager 116 can communicate and interact with applications operating on the electronic device 102 to determine and resolve conflicts between applications (e.g., processor resource usage, power usage, or access to other components of the electronic device 102). The application manager 116 can also interact with applications to determine the applications' available input modes, such as touch, voice, or radar gestures, and communicate the available modes to the input-mode manager 106.

The input-mode manager 106 can be used to interact with or control various components of the electronic device 102 (e.g., modules, managers, systems, interfaces, or one or more of the non-radar sensors 108). For instance, the input-mode manager 106 (independently or through the application manager 116) can determine that an application operating on the electronic device has a capability to receive a control input corresponding to a radar gesture (e.g., is a radar-gesture application). The radar gestures may be based on the radar data and received through the radar system 104. For example, the input-mode manager 106, or the radar system 104, can use one or more subsets of the radar data to detect a motion performed by a portion of a user 112, such as a hand, or an object, that is within a gesture zone 118 of the electronic device 102. The input-mode manager 106 then determines whether the user's motion is a radar gesture.

The gesture zone 118 is a region or volume around the electronic device 102 within which the radar system 104 (or another module or application) can detect a motion by the user or a portion of the user (e.g., the user's hand 12) and determine whether the motion is a radar gesture. The gesture zone of the radar field is a smaller area or region than the radar field (e.g., the gesture zone has a smaller volume than the radar field and is within the radar field). For example, the gesture zone 118 can be a fixed volume around the electronic device that has a static size and/or shape (e.g., a threshold distance around the electronic device 102, such as within three, five, seven, nine, or twelve inches) that is predefined, user-selectable, or determined via another method (e.g., based on power requirements, remaining battery life, or another factor). In other cases, the gesture zone 118 may be a volume around the electronic device that is dynamically and automatically adjustable by the electronic device 102, the radar system 104, or the input-mode manager 106, based on factors such as the velocity or location of the electronic device 102, a time of day, a state of an application running on the electronic device 102, or another factor. While the radar system 104 can detect objects within the radar field 110 at greater distances, the gesture zone 118 helps the electronic device 102 and the radar-gesture applications to distinguish between intentional radar gestures by the user and other kinds of motions that may resemble radar gestures, but are not intended as such by the user.

A variety of suitable techniques can be used to determine whether the motion is a radar gesture. For example, the input-mode manager 106 (or another component associated with the electronic device 102) can use the radar data (e.g., one or more subsets of the radar data) to determine whether the motion meets one or more criteria to be considered a radar gesture. The criteria can include various parameters of the motion, such as a path, shape, length, velocity, or distance from the electronic device. In some cases, the input-mode manager 106 determines the parameters for the motion and compares them to gesture data in a gesture library 120 to determine whether the user's motion matches a known radar gesture. When the motion does not meet the criteria, it is determined not to be a radar gesture. In a similar way, when the user's motion meets the criteria, it is determined to be a radar gesture.

When the motion meets the criteria, (e.g., is determined to be a radar gesture), the input-mode manager 106 (or another component associated with the electronic device 102) determines whether the radar gesture corresponds to a control input of the application. The control input is an input, such as a control signal, that corresponds to an action of the radar-gesture application. For example, the control input can correspond to an instruction to dismiss an alert or notification on the display of the electronic device, silence a ringer or alarm, or skip to a next or previous media item. Not every application will have a corresponding control input for every gesture (e.g., a gesture that "works" for one application may not "work" for another application, even if the gesture is properly made). In some cases, the gesture library 120, or another component, can store relationships between control inputs and radar gestures, and the input-mode manager 106 can use the relationships in the gesture library 120 to determine whether the radar gesture corresponds to a control input of the application. Thus, a radar gesture may be successful if it is properly made (e.g., meets the criteria), when it corresponds to a control input of the application, or when the application receives and responds to the control input. Note that the radar system 104, or another entity associated with the electronic device, can be used to detect various kinds of radar gestures, such as a reach, a swipe gesture (a motion that is generally horizontal or vertical with respect to content on the display 114), or an "omni-gesture" (a gesture without a particular orientation with respect to the content).

The input-mode manager 106 can also detect a gesture-pause trigger 122 and, in response to the detection of the gesture-pause trigger 122, cause the electronic device to enter the gesture-paused mode and provide a gesture-paused feedback element 124 on the display 114 of the electronic device 102. For example, consider a time period in which the radar system 104 is providing the radar field through which a radar gesture can be determined based on the radar data and in which an application on the electronic device 102 that is capable of receiving a control input corresponding to the radar gesture is executing (e.g., through the computer processor). When the input-mode manager 106 detects the gesture-pause trigger 122 during this time period, the input-mode manager 106 provides the gesture-paused feedback element 124. The appearance of the gesture-paused feedback element 124 indicates that the application cannot perform an action associated with the control input.

The gesture-pause trigger 122 is a condition, or set of conditions, that when present cause the electronic device 102 and/or the radar system 104 to enter a gesture-paused mode (e.g., a state in which radar gestures are paused because the radar-gesture applications cannot perform the action associated with the control input or, in some implementations, cannot receive the control input corresponding to the radar gesture). Generally, the gesture-pause trigger 122 is a condition that can make it difficult for the electronic device 102 or the radar system 104 to accurately and efficiently determine whether a user's motion is a radar gesture. For example, as shown in FIG. 1, the gesture-pause trigger 122 can be an oscillating motion of the electronic device 102 that exceeds a threshold frequency (e.g., above approximately 0.25, 0.50, 0.75, 1.0, or 1.5 oscillations per second), such as when the user 112 is carrying the electronic device 102 while walking or running Other examples of the gesture-pause trigger 122 include a motion of the electronic device at a velocity above a threshold velocity (e.g., above approximately 3, 4, 5, or 10 miles per hour) or an oscillating motion of an object in the radar field, such as the user 112 (or a portion of the user 112), where the oscillating motion exceeds a threshold frequency (e.g., above approximately 0.25, 0.50, 0.75, 1.0, or 1.5 oscillations per second).

In some implementations, the input-mode manager 106 detects the gesture-pause trigger 122 using the radar data, data from the non-radar sensors 108 (e.g., an inertial measurement unit (IMU), accelerometer, gyroscope), or a combination of both the radar data and the data from the non-radar sensors 108. In some cases, the gesture-paused feedback element 124 is provided only when the gesture-pause trigger 122 is detected while the electronic device 102 is within a threshold distance of the user 112 (e.g., within approximately one, three, four, five, or six feet of the user 112). The threshold distance from the user may be determined using the radar data, data from the non-radar sensors 108 (e.g., a proximity sensor or an image-capture sensor), or a combination of both the radar data and the data from the non-radar sensors 108.

The gesture-paused feedback element 124 is a user-perceivable element, such as a visual element that appears on an active area of the display 114. The gesture-paused feedback element 124 can also be (or include) a light element that is not on the display (e.g., a light-emitting diode (LED) or an LED array mounted on a housing or bezel of the electronic device), a haptic element (e.g., a vibration element), and/or an audio element (e.g., a user-perceivable sound). In some cases, the gesture-paused feedback element 124 may be presented at or along an edge of the display 114. In this document, the phrases "at an edge" and "along an edge" refer to being near or adjacent to an edge (e.g., adjacent to the edge with no gap or with a gap such as one pixel, two pixels, three pixels, and so forth). The gesture-paused feedback element 124 may have any of a variety of shapes, sizes, colors, and other visual parameters or properties. Examples of the other visual parameters or properties include luminosity, color, contrast, shape, saturation, or opaqueness. Luminosity refers to the brightness of an object as perceived by a human. Modifying the luminosity may include modifying luminance (e.g., brightness), contrast, and/or opaqueness.

The visual element may have an area that is a portion of the active area of the display 114 that has a luminosity or other visual property that is different from a luminosity or other visual property of another portion of the display 114 that is proximate to the visual element. In this case, the visual element may also have a segment of an exterior border that is within a threshold distance from an edge of the active area of the display. While some of these examples describe the gesture-paused feedback element 124 as presented at or along an edge of the display 114, the gesture-paused feedback element 124 may appear at a location on the display 114 that is not an edge. For example, the edge of the display 114 may include an area beginning at a border of the active area of the display 114 and extending a distance from the border that is no more than approximately 15 percent of a total length of the border of the display 114.

In some implementations, the luminosity (or other visual parameter) of the gesture-paused feedback element 124 may vary as the gesture-paused feedback element 124 extends across a distance from the edge of the active area of the display 114 (e.g., have a luminosity at or along the edge of the display 114 that decreases as the shape extends away from the edge, or vice versa). For example, the gesture-paused feedback element 124 may be presented as an area of the display 114 that has a different luminosity than another area of the display 114 (e.g., an area surrounding or near to the gesture-paused feedback element 124) and that is adjacent to the edge of the display 114. In another example, the gesture-paused feedback element 124 may be presented as a line, with a predetermined thickness, that has a different luminosity than the display 114 and that is adjacent to the edge of the display 114. In some implementations, the gesture-paused feedback element 124 moves on the active area of the display 114 and the movement of the gesture-paused feedback element 124 can correspond to the motion of the gesture-pause trigger 122 (e.g., the velocity, oscillation frequency, or other movement of the gesture-paused feedback element 124 can correspond to the motion, velocity, or oscillation frequency of the gesture-pause trigger 122).

As described above, the gesture-paused feedback element 124 can indicate that the radar-gesture application cannot receive the control input corresponding to the radar gesture. In this case, the user 112 may or may not have attempted to make a radar gesture. The input-mode manager 106 provides the gesture-paused feedback element 124 based on detection of the gesture-pause trigger 122 and does not require that a radar gesture was attempted. Rather, the gesture-paused feedback element 124 is an alert to the user that radar gestures are not currently available to control the radar-gesture applications on the electronic device 102.

Consider an example illustrated in FIG. 1, which shows the user 112 within the gesture zone 118. In FIG. 1, a visual feedback element 126 is presented on an example display 114-1 (e.g., to indicate that the user 112, or a portion of the user 112, such as a hand, has been detected within the gesture zone 118 and that at least one radar-gesture application is operating on the electronic device 102). In this example, the gesture-pause trigger 122 is shown by a curved, dashed-line arrow that represents an oscillation of the electronic device 102, caused by the user 112 walking with the electronic device 102 at the user's side. In another example display 114-2, the gesture-paused feedback element 124 is presented in response to the detection of the gesture-pause trigger 122. As shown on the example display 114-2, the gesture-paused feedback element 124 is smaller and dimmer than the visual element 126. In other implementations (not shown in FIG. 1), the gesture-paused feedback element 124 also, or instead, moves back and forth or pulses (periodically grows and shrinks), at a frequency that may match the frequency of the motion constituting the gesture-pause trigger 122, before returning to the original position when the condition detected as the gesture-pause trigger 122 ends.

In the example shown in FIG. 1, the gesture-paused feedback element 124 and the visual feedback element 126 are both shown as a glowing area located at or near a top edge of the display 114. In other implementations, the gesture-paused feedback element 124 and/or the visual feedback element 126 may be another size, another shape, or be presented at another location. This example shows how the gesture-paused feedback element 124 allows the user to see that radar gestures are currently unavailable to control the radar-gesture applications on the electronic device 102. Thus, the gesture-paused feedback element 124 provides dynamically responsive visual feedback that corresponds to a state of the electronic device 102 (or the radar system 104 or a radar-gesture application), which can improve the experience of the user 112 with the electronic device 102.

In some implementations, the gesture-paused feedback element 124 and the visual feedback element 126 may be the same visual element (e.g., the visual properties are the same or similar, and only the feedback functions are different). In other implementations, the gesture-paused feedback element 124 may be presented as an adjustment to a visual element that is already being presented at or along the edge of the active area of the display (e.g., the visual feedback element 126). For example, in the example shown in FIG. 1, the visual feedback element 126 is already being presented. When the gesture-pause trigger 122 is detected, the visual feedback element 126 may be adjusted to become the example gesture-paused feedback element 124, such as by changing size, shape, color, or another visual property.

The color of the gesture-paused feedback element 124 may be any suitable color that can be visually differentiated from the background of the display 114 on which it is presented. The color of the gesture-paused feedback element 124 may change based on any of a variety of factors, such as an operational state of the electronic device 102 or an ambient background color of the display 114. In some implementations, the input-mode manager 106 can determine a background color of a region of the display 114 on which the gesture-paused feedback element 124 is, or will be, displayed. In response to determining the background color, the input-mode manager 106 can provide, or cause the display 114 to provide, the gesture-paused feedback element 124 in another color that is different from the background color. The different color of the gesture-paused feedback element 124 can provide human-discernable contrast between the gesture-paused feedback element 124 and the background color to make it easier for the user to see the gesture-paused feedback element 124. In some cases, the input-mode manager 106 can continuously, automatically, and dynamically adjust the color of the gesture-paused feedback element 124, based on changes to the background color.

The gesture-paused feedback element 124, in some implementations, may appear, at least in part, as a brief animation. For example, the gesture-paused feedback element 124 may appear at the edge of the active display and then grow or shrink before taking on a default appearance. Similarly, the color, luminosity, or shape may change as the gesture-paused feedback element 124 appears or disappears (e.g., if the condition detected as the gesture-pause trigger 122 ends) before taking on the default appearance.

In some cases, the gesture-paused feedback element 124 may be an image that appears on the display 114, rather than an element that appears in a region of the display 114. The image may have visual parameters that are different from the parameters of an ambient background of the display 114, such as luminosity, saturation, color, and so forth. In other cases, the ambient background may be an image, and the gesture-paused feedback element 124 is the same image, with different visual parameters, such as luminosity, saturation, color, and so forth. In this way, the gesture-paused feedback element 124 can improve the user's experience by communicating to the user that the electronic device is operating in a mode in which radar gestures are currently not available for interacting with the electronic device 102. Additional details and examples of the gesture-paused feedback element 124 are described with reference to FIGS. 15 and 16.

The location of visual feedback elements, such as the gesture-paused feedback element 124 may be determined based on an orientation of content on the display 114. For example, the input-mode manager 106 may obtain the orientation of the content on the display 114 from the application manager 116 (or from another source). The input-mode manager 106 can also determine, based on the orientation of the content, a direction of the radar gestures that can be used to interact with the content. Based on the direction of the radar gestures, the input-mode manager 106 can cause the display to provide the gesture-paused feedback element 124 at a particular edge of the active area of the display 114 that corresponds to the direction of the radar gestures. Thus, if the context of the displayed content is horizontal (e.g., the direction of the radar gesture would be left-to-right or right-to-left), the gesture-paused feedback element 124 is displayed at a top or bottom edge, to help indicate to the user that the radar gestures are horizontal. Similarly, if the context of the displayed content is vertical (e.g., the direction of the radar gestures would be bottom-to-top or top-to-bottom), the gesture-paused feedback element 124 is displayed at a side edge (e.g., a left edge), to help indicate to the user that the radar gestures are vertical.

Further, the input-mode manager 106 may also be able to detect a change in an orientation of the electronic device 102 with respect to the user. For example, the user may rotate the device from a vertical to a horizontal orientation to watch a video or from a horizontal to a vertical orientation to read an article. Based on the change in orientation, the input-mode manager 106 can cause the display 114 to provide visual feedback elements, such as the gesture-paused feedback element 124 on a different edge of the active display. This different edge can maintain an orientation and location of the gesture-paused feedback element 124 with respect to the user (e.g., the gesture-paused feedback element 124 moves or relocates as the orientation of the user to the device changes). Thus, if the gesture-paused feedback element 124 is positioned on a top edge of the display 114 and the user rotates the electronic device 102, the location of the gesture-paused feedback element 124 changes from one edge to another so that it remains on "top" with reference to the user. As noted, the input-mode manager 106 also takes into account the orientation of the content, and these features can be used in conjunction with each other to provide the gesture-paused feedback element 124 on the display 114 at the location appropriate for the orientation of both the content on the display 114 and the orientation of the display 114 with respect to the user.

In some implementations, the input-mode manager 106 can determine that the radar-gesture application that is operating on the electronic device 102 is operating in an immersive mode, such as a full-screen mode without any presented controls. In response to this determination, when the gesture-pause trigger 122 is detected, the input-mode manager 106 can cause the display 114 to briefly or periodically provide the gesture-paused feedback element 124. For example, the display 114 can provide the gesture-paused feedback element 124 for a feedback-element-presentation time duration and then stop presenting the gesture-paused feedback element 124 for a non-feedback-element-presentation time duration. Both the feedback-element-presentation time duration and the non-feedback-element-presentation time duration may be predetermined or selectable. In some cases, the time durations may be user-selectable (e.g., by the user) or selected by the input-mode manager 106 based on various factors, such as the type of radar-gesture application running in the immersive mode (e.g., a game or a streaming media player), the status of the radar-gesture application, or the frequency with which the user employs a radar gesture.

Visual feedback elements, including the gesture-paused feedback element 124, may also fade or disappear entirely when the user interacts with the electronic device 102 using input other than a radar gesture (e.g., a touch or voice input). For example, while the electronic device 102 is in the gesture-paused state, the user may decide to start another application using a touch command. In this case, the gesture-paused feedback element 124 may fade or disappear when the user picks up the electronic device 102 or touches the display 114. When the user stops touching the display 114 or puts down the electronic device 102, the gesture-paused feedback element 124 reappears (or brightens) if one or more radar-gesture applications are operating on the electronic device 102 and the gesture-pause trigger 122 is still detected. The gesture-paused feedback element 124 may reappear or brighten immediately when the touch or voice input ends, or after a selectable time duration.

Visual feedback elements, such as the gesture-paused feedback element 124 may be provided while the electronic device 102 is in a locked state or an unlocked state. For example, the electronic device 102 may provide the gesture-paused feedback element 124 (to indicate that the application cannot receive the control input corresponding to the radar gesture) when a user is nearby (e.g., within the recognition zone), but not authenticated, or when an authenticated user is nearby. The locked and unlocked states refer to a level of access to the electronic device 102. A locked state may be a state in which no user in authenticated and anyone using the device will have less than full rights or access (e.g., no access or rights, or limited access or rights). Examples of the locked state may include the aware and engaged modes of the electronic device 102 as described herein. Similarly, an unlocked state can be a state in which at least one user is authenticated and that user has full rights and/or access to the device. An example of the unlocked state is the active mode of the electronic device 102, as described herein. In some cases, the locked or unlocked state may have varying characteristics, depending on the type, configuration, or status (e.g., a battery level or a connectivity status) of the electronic device 102. Accordingly, characteristics of the locked and unlocked states for different devices or for the same device in different contexts may overlap, or include similar features, depending on those factors.

In more detail, consider FIG. 2, which illustrates an example implementation 200 of the electronic device 102 (including the radar system 104, the input-mode manager 106, the non-radar sensor 108, the display 114, the application manager 116, and the gesture library 120) that can implement the visual indicator for paused radar gestures. The electronic device 102 of FIG. 2 is illustrated with a variety of example devices, including a smartphone 102-1, a tablet 102-2, a laptop 102-3, a desktop computer 102-4, a computing watch 102-5, a gaming system 102-6, computing spectacles 102-7, a home-automation and control system 102-8, a smart refrigerator 102-9, and an automobile 102-10. The electronic device 102 can also include other devices, such as televisions, entertainment systems, audio systems, drones, track pads, drawing pads, netbooks, e-readers, home security systems, and other home appliances. Note that the electronic device 102 can be wearable, non-wearable but mobile, or relatively immobile (e.g., desktops and appliances).

In some implementations, exemplary overall lateral dimensions of the electronic device 102 can be approximately eight centimeters by approximately fifteen centimeters. Exemplary footprints of the radar system 104 can be even more limited, such as approximately four millimeters by six millimeters with antennas included. This requirement for such a limited footprint for the radar system 104 is to accommodate the many other desirable features of the electronic device 102 in such a space-limited package (e.g., a fingerprint sensor, the non-radar sensor 108, and so forth). Combined with power and processing limitations, this size requirement can lead to compromises in the accuracy and efficacy of radar-gesture detection, at least some of which can be overcome in view of the teachings herein.

The electronic device 102 also includes one or more computer processors 202 and one or more computer-readable media 204, which includes memory media and storage media. Applications and/or an operating system (not shown) implemented as computer-readable instructions on the computer-readable media 204 can be executed by the computer processors 202 to provide some or all of the functionalities described herein. For example, the processors 202 can be used to execute instructions on the computer-readable media 204 to implement the input-mode manager 106 and/or the application manager 116. The electronic device 102 may also include a network interface 206. The electronic device 102 can use the network interface 206 for communicating data over wired, wireless, or optical networks. By way of example and not limitation, the network interface 206 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the radar system 104 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. The radar system 104 can operate as a monostatic radar by transmitting and receiving its own radar signals.

In some implementations, the radar system 104 may also cooperate with other radar systems 104 that are within an external environment to implement a bistatic radar, a multistatic radar, or a network radar. Constraints or limitations of the electronic device 102, however, may impact a design of the radar system 104. The electronic device 102, for example, may have limited power available to operate the radar, limited computational capability, size constraints, layout restrictions, an exterior housing that attenuates or distorts radar signals, and so forth. The radar system 104 includes several features that enable advanced radar functionality and high performance to be realized in the presence of these constraints, as further described below with respect to FIG. 3. Note that in FIG. 1 and FIG. 2, the radar system 104, the input-mode manager 106, the application manager 116, and the gesture library 120 are illustrated as part of the electronic device 102. In other implementations, one or more of the radar system 104, the input-mode manager 106, the application manager 116, or the gesture library 120 may be separate or remote from the electronic device 102.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 through FIG. 20 illustrate some of many possible environments and devices capable of employing the described techniques. FIGS. 3-6 describe additional details and features of the radar system 104. In FIGS. 3-6, the radar system 104 is described in the context of the electronic device 102, but as noted above, the applicability of the features and advantages of the described systems and techniques are not necessarily so limited, and other implementations involving other types of electronic devices may also be within the scope of the present teachings.

FIG. 3 illustrates an example implementation 300 of the radar system 104 that can be used to enable a visual indicator for paused radar gestures. In the example 300, the radar system 104 includes at least one of each of the following components: a communication interface 302, an antenna array 304, a transceiver 306, a processor 308, and a system media 310 (e.g., one or more computer-readable storage media). The processor 308 can be implemented as a digital signal processor, a controller, an application processor, another processor (e.g., the computer processor 202 of the electronic device 102) or some combination thereof. The system media 310, which may be included within, or be separate from, the computer-readable media 204 of the electronic device 102, includes one or more of the following modules: an attenuation mitigator 314, a digital beamformer 316, an angle estimator 318, or a power manager 320. These modules can compensate for, or mitigate the effects of, integrating the radar system 104 within the electronic device 102, thereby enabling the radar system 104 to recognize small or complex gestures, distinguish between different orientations of the user, continuously monitor an external environment, or realize a target false-alarm rate. With these features, the radar system 104 can be implemented within a variety of different devices, such as the devices illustrated in FIG. 2.

Using the communication interface 302, the radar system 104 can provide radar data to the input-mode manager 106. The communication interface 302 may be a wireless or wired interface based on the radar system 104 being implemented separate from, or integrated within, the electronic device 102. Depending on the application, the radar data may include raw or minimally processed data, in-phase and quadrature (I/Q) data, range-Doppler data, processed data including target location information (e.g., range, azimuth, elevation), clutter map data, and so forth. Generally, the radar data contains information that is usable by the input-mode manager 106 for the visual indicator for paused radar gestures.

Figure 4:
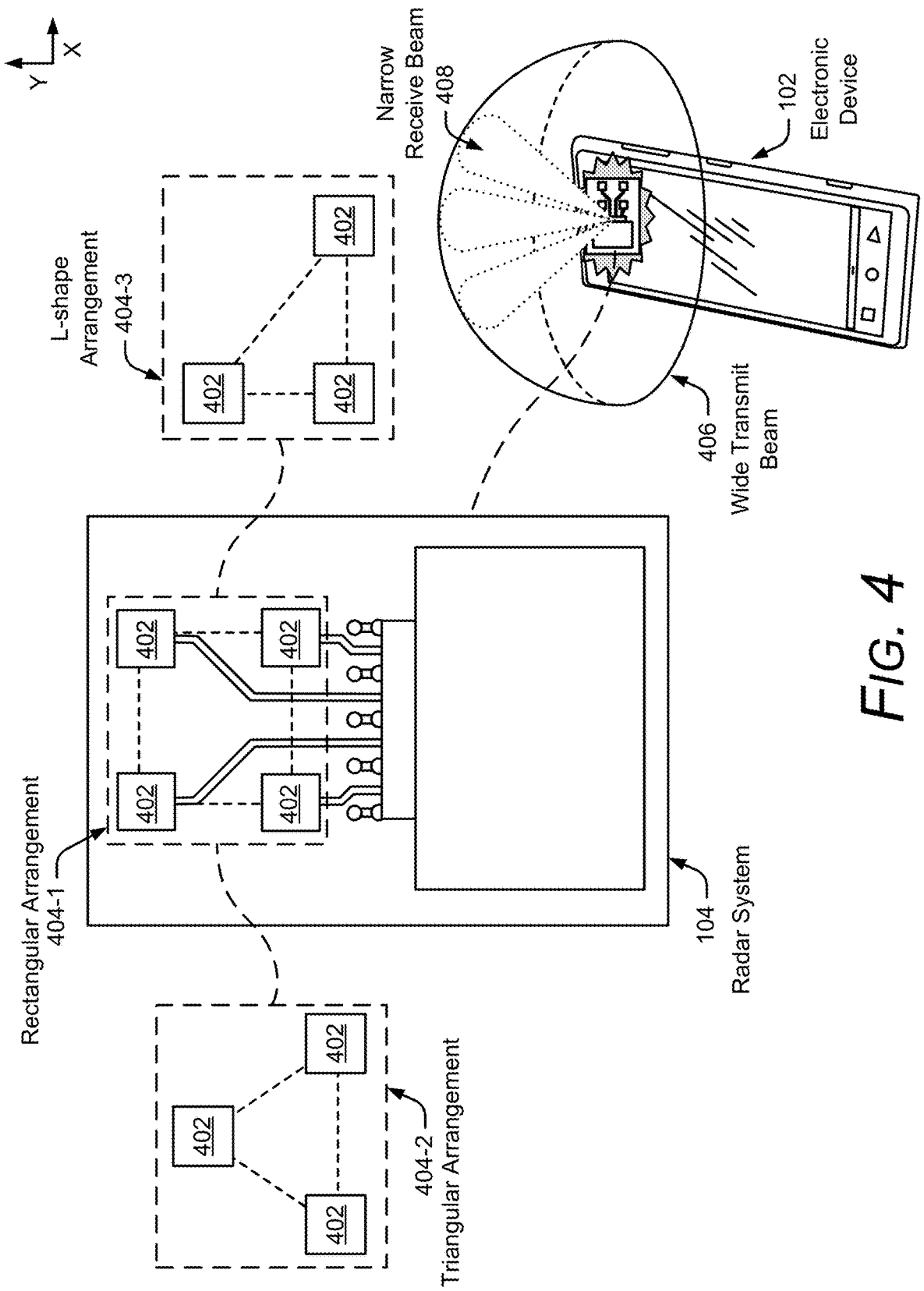
FIG. 4 illustrates example arrangements of receiving antenna elements for the radar system of FIG. 3.

The antenna array 304 includes at least one transmitting antenna element (not shown) and at least two receiving antenna elements (as shown in FIG. 4). In some cases, the antenna array 304 may include multiple transmitting antenna elements to implement a multiple-input multiple-output (MIMO) radar capable of transmitting multiple distinct waveforms at a time (e.g., a different waveform per transmitting antenna element). The use of multiple waveforms can increase a measurement accuracy of the radar system 104. The receiving antenna elements can be positioned in a one-dimensional shape (e.g., a line) or a two-dimensional shape for implementations that include three or more receiving antenna elements. The one-dimensional shape enables the radar system 104 to measure one angular dimension (e.g., an azimuth or an elevation) while the two-dimensional shape enables two angular dimensions to be measured (e.g., both azimuth and elevation). Example two-dimensional arrangements of the receiving antenna elements are further described with respect to FIG. 4.

FIG. 4 illustrates example arrangements 400 of receiving antenna elements 402. If the antenna array 304 includes at least four receiving antenna elements 402, for example, the receiving antenna elements 402 can be arranged in a rectangular arrangement 404-1 as depicted in the middle of FIG. 4. Alternatively, a triangular arrangement 404-2 or an L-shape arrangement 404-3 may be used if the antenna array 304 includes at least three receiving antenna elements 402.

Due to a size or layout constraint of the electronic device 102, an element spacing between the receiving antenna elements 402 or a quantity of the receiving antenna elements 402 may not be ideal for the angles at which the radar system 104 is to monitor. In particular, the element spacing may cause angular ambiguities to be present that make it challenging for conventional radars to estimate an angular position of a target. Conventional radars may therefore limit a field of view (e.g., angles that are to be monitored) to avoid an ambiguous zone, which has the angular ambiguities, and thereby reduce false detections. For example, conventional radars may limit the field of view to angles between approximately −45 degrees to 45 degrees to avoid angular ambiguities that occur using a wavelength of 5 millimeters (mm) and an element spacing of 3.5 mm (e.g., the element spacing being 70% of the wavelength). Consequently, the conventional radar may be unable to detect targets that are beyond the 45-degree limits of the field of view. In contrast, the radar system 104 includes the digital beamformer 316 and the angle estimator 318, which resolve the angular ambiguities and enable the radar system 104 to monitor angles beyond the 45-degree limit, such as angles between approximately −90 degrees to 90 degrees, or up to approximately −180 degrees and 180 degrees. These angular ranges can be applied across one or more directions (e.g., azimuth and/or elevation). Accordingly, the radar system 104 can realize low false-alarm rates for a variety of different antenna array designs, including element spacings that are less than, greater than, or equal to half a center wavelength of the radar signal.

Using the antenna array 304, the radar system 104 can form beams that are steered or un-steered, wide or narrow, or shaped (e.g., as a hemisphere, cube, fan, cone, or cylinder). As an example, the one or more transmitting antenna elements (not shown) may have an un-steered omnidirectional radiation pattern or may be able to produce a wide beam, such as the wide transmit beam 406. Either of these techniques enable the radar system 104 to illuminate a large volume of space. To achieve target angular accuracies and angular resolutions, however, the receiving antenna elements 402 and the digital beamformer 316 can be used to generate thousands of narrow and steered beams (e.g., 2000 beams, 4000 beams, or 6000 beams), such as the narrow receive beam 408. In this way, the radar system 104 can efficiently monitor the external environment and accurately determine arrival angles of reflections within the external environment.

Returning to FIG. 3, the transceiver 306 includes circuitry and logic for transmitting and receiving radar signals via the antenna array 304. Components of the transceiver 306 can include amplifiers, mixers, switches, analog-to-digital converters, filters, and so forth for conditioning the radar signals. The transceiver 306 can also include logic to perform in-phase/quadrature (I/Q) operations, such as modulation or demodulation. The transceiver 306 can be configured for continuous wave radar operations or pulsed radar operations. A variety of modulations can be used to produce the radar signals, including linear frequency modulations, triangular frequency modulations, stepped frequency modulations, or phase modulations.

The transceiver 306 can generate radar signals within a range of frequencies (e.g., a frequency spectrum), such as between 1 gigahertz (GHz) and 400 GHz, between 4 GHz and 100 GHz, or between 57 GHz and 63 GHz. The frequency spectrum can be divided into multiple sub-spectra that have a similar bandwidth or different bandwidths. The bandwidths can be on the order of 500 megahertz (MHz), 1 GHz, 2 GHz, and so forth. As an example, different frequency sub-spectra may include frequencies between approximately 57 GHz and 59 GHz, 59 GHz and 61 GHz, or 61 GHz and 63 GHz. Multiple frequency sub-spectra that have a same bandwidth and may be contiguous or non-contiguous may also be chosen for coherence. The multiple frequency sub-spectra can be transmitted simultaneously or separated in time using a single radar signal or multiple radar signals. The contiguous frequency sub-spectra enable the radar signal to have a wider bandwidth while the non-contiguous frequency sub-spectra can further emphasize amplitude and phase differences that enable the angle estimator 318 to resolve angular ambiguities. The attenuation mitigator 314 or the angle estimator 318 may cause the transceiver 306 to utilize one or more frequency sub-spectra to improve performance of the radar system 104, as further described with respect to FIGS. 5 and 6.

A power manager 320 enables the radar system 104 to conserve power internally or externally within the electronic device 102. In some implementations, the power manager 320 communicates with the input-mode manager 106 to conserve power within either or both of the radar system 104 or the electronic device 102. Internally, for example, the power manager 320 can cause the radar system 104 to collect data using a predefined power mode or a specific gesture-frame update rate. The gesture-frame update rate represents how often the radar system 104 actively monitors the external environment by transmitting and receiving one or more radar signals. Generally speaking, the power consumption is proportional to the gesture-frame update rate. As such, higher gesture-frame update rates result in larger amounts of power being consumed by the radar system 104.

Each predefined power mode can be associated with a particular framing structure, a particular transmit power level, or particular hardware (e.g., a low-power processor or a high-power processor). Adjusting one or more of these affects the radar system's 104 power consumption. Reducing power consumption, however, affects performance, such as the gesture-frame update rate and response delay. In this case, the power manager 320 dynamically switches between different power modes such that gesture-frame update rate, response delay and power consumption are managed together based on the activity within the environment. In general, the power manager 320 determines when and how power can be conserved, and incrementally adjusts power consumption to enable the radar system 104 to operate within power limitations of the electronic device 102. In some cases, the power manager 320 may monitor an amount of available power remaining and adjust operations of the radar system 104 accordingly. For example, if the remaining amount of power is low, the power manager 320 may continue operating in a lower-power mode instead of switching to a higher-power mode.

The lower-power mode, for example, may use a lower gesture-frame update rate on the order of a few hertz (e.g., approximately 1 Hz or less than 5 Hz) and consume power on the order of a few milliwatts (mW) (e.g., between approximately 2 mW and 4 mW). The higher-power mode, on the other hand, may use a higher gesture-frame update rate on the order of tens of hertz (Hz) (e.g., approximately 20 Hz or greater than 10 Hz), which causes the radar system 104 to consume power on the order of several milliwatts (e.g., between approximately 6 mW and 20 mW). While the lower-power mode can be used to monitor the external environment or detect an approaching user, the power manager 320 may switch to the higher-power mode if the radar system 104 determines the user is starting to perform a gesture. Different triggers may cause the power manager 320 to dynamically switch between the different power modes. Example triggers include motion or the lack of motion, appearance or disappearance of the user, the user moving into or out of a designated region (e.g., a region defined by range, azimuth, or elevation), a change in velocity of a motion associated with the user, or a change in reflected signal strength (e.g., due to changes in radar cross section). In general, the triggers that indicate a lower probability of the user interacting with the electronic device 102 or a preference to collect data using a longer response delay may cause a lower-power mode to be activated to conserve power.

Each power mode can be associated with a particular framing structure. The framing structure specifies a configuration, scheduling, and signal characteristics associated with the transmission and reception of the radar signals. In general, the framing structure is set up such that the appropriate radar data can be collected based on the external environment. The framing structure can be customized to facilitate collection of different types of radar data for different applications (e.g., proximity detection, feature recognition, or gesture recognition). During inactive times throughout each level of the framing structure, the power-manager 320 can turn off the components within the transceiver 306 in FIG. 3 to conserve power. The framing structure enables power to be conserved through adjustable duty cycles within each frame type. For example, a first duty cycle can be based on a quantity of active feature frames relative to a total quantity of feature frames. A second duty cycle can be based on a quantity of active radar frames relative to a total quantity of radar frames. A third duty cycle can be based on a duration of the radar signal relative to a duration of a radar frame.

Consider an example framing structure (not illustrated) for the lower-power mode that consumes approximately 2 mW of power and has a gesture-frame update rate between approximately 1 Hz and 4 Hz. In this example, the framing structure includes a gesture frame with a duration between approximately 250 ms and 1 second. The gesture frame includes thirty-one pulse-mode feature frames. One of the thirty-one pulse-mode feature frames is in the active state. This results in the duty cycle being approximately equal to 3.2%. A duration of each pulse-mode feature frame is between approximately 8 ms and 32 ms. Each pulse-mode feature frame is composed of eight radar frames. Within the active pulse-mode feature frame, all eight radar frames are in the active state. This results in the duty cycle being equal to 100%. A duration of each radar frame is between approximately 1 ms and 4 ms. An active time within each of the active radar frames is between approximately 32 µs and 128 µs. As such, the resulting duty cycle is approximately 3.2%. This example framing structure has been found to yield good performance results. These good performance results are in terms of good gesture recognition and presence detection while also yielding good power efficiency results in the application context of a handheld smartphone in a low-power state. Based on this example framing structure, the power manager 320 can determine a time for which the radar system 104 is not actively collecting radar data. Based on this inactive time period, the power manager 320 can conserve power by adjusting an operational state of the radar system 104 and turning off one or more components of the transceiver 306, as further described below.

The power manager 320 can also conserve power by turning off one or more components within the transceiver 306 (e.g., a voltage-controlled oscillator, a multiplexer, an analog-to-digital converter, a phase lock loop, or a crystal oscillator) during inactive time periods. These inactive time periods occur if the radar system 104 is not actively transmitting or receiving radar signals, which may be on the order of microseconds (μs), milliseconds (ms), or seconds (s). Further, the power manager 320 can modify transmission power of the radar signals by adjusting an amount of amplification provided by a signal amplifier. Additionally, the power manager 320 can control the use of different hardware components within the radar system 104 to conserve power. If the processor 308 comprises a lower-power processor and a higher-power processor (e.g., processors with different amounts of memory and computational capability), for example, the power manager 320 can switch between utilizing the lower-power processor for low-level analysis (e.g., implementing the idle mode, detecting motion, determining a location of a user, or monitoring the environment) and the higher-power processor for situations in which high-fidelity or accurate radar data is requested by the input-mode manager 106 (e.g., for implementing the aware mode, the engaged mode, or the active mode, gesture recognition or user orientation).

Further, the power manager 320 can determine a context of the environment around the electronic device 102. From that context, the power manager 320 can determine which power states are to be made available and how they are configured. For example, if the electronic device 102 is in a user's pocket, then although the user is detected as being proximate to the electronic device 102, there is no need for the radar system 104 to operate in the higher-power mode with a high gesture-frame update rate. Accordingly, the power manager 320 can cause the radar system 104 to remain in the lower-power mode, even though the user is detected as being proximate to the electronic device 102 and cause the display 114 to remain in an off or other lower-power state. The electronic device 102 can determine the context of its environment using any suitable non-radar sensor 108 (e.g., gyroscope, accelerometer, light sensor, proximity sensor, capacitance sensor, and so on) in combination with the radar system 104. The context may include time of day, calendar day, lightness/darkness, number of users near the user, surrounding noise level, speed of movement of surrounding objects (including the user) relative to the electronic device 102, and so forth).

Figure 5:
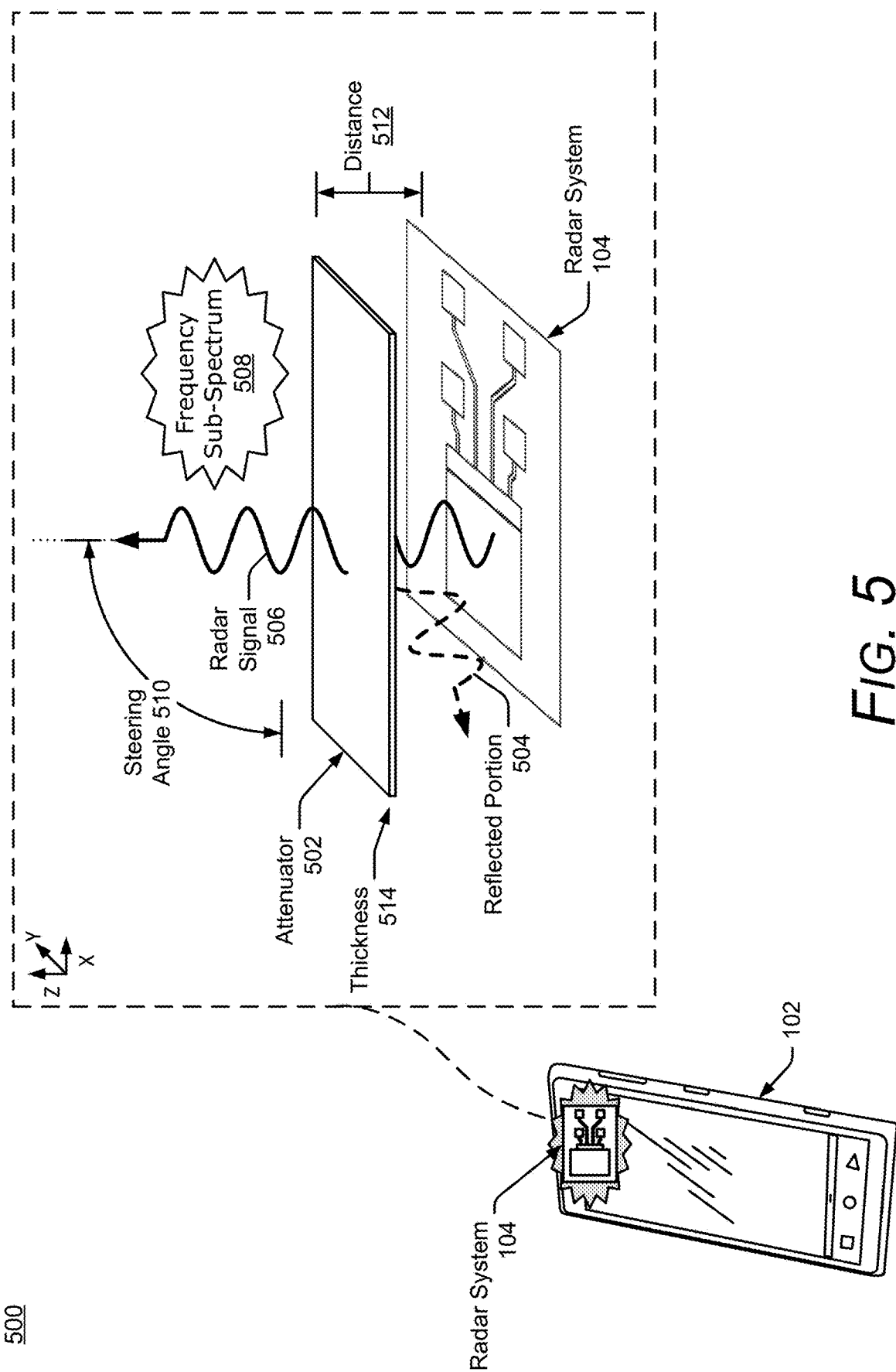
FIG. 5 illustrates additional details of an example implementation of the radar system of FIGS. 1 and 2.

FIG. 5 illustrates additional details of an example implementation 500 of the radar system 104 within the electronic device 102. In the example 500, the antenna array 304 is positioned underneath an exterior housing of the electronic device 102, such as a glass cover or an external case. Depending on its material properties, the exterior housing may act as an attenuator 502, which attenuates or distorts radar signals that are transmitted and received by the radar system 104. The attenuator 502 may include different types of glass or plastics, some of which may be found within display screens, exterior housings, or other components of the electronic device 102 and have a dielectric constant (e.g., relative permittivity) between approximately four and ten. Accordingly, the attenuator 502 is opaque or semi-transparent to a radar signal 506 and may cause a portion of a transmitted or received radar signal 506 to be reflected (as shown by a reflected portion 504). For conventional radars, the attenuator 502 may decrease an effective range that can be monitored, prevent small targets from being detected, or reduce overall accuracy.

Assuming a transmit power of the radar system 104 is limited, and re-designing the exterior housing is not desirable, one or more attenuation-dependent properties of the radar signal 506 (e.g., a frequency sub-spectrum 508 or a steering angle 510) or attenuation-dependent characteristics of the attenuator 502 (e.g., a distance 512 between the attenuator 502 and the radar system 104 or a thickness 514 of the attenuator 502) are adjusted to mitigate the effects of the attenuator 502. Some of these characteristics can be set during manufacturing or adjusted by the attenuation mitigator 314 during operation of the radar system 104. The attenuation mitigator 314, for example, can cause the transceiver 306 to transmit the radar signal 506 using the selected frequency sub-spectrum 508 or the steering angle 510, cause a platform to move the radar system 104 closer or farther from the attenuator 502 to change the distance 512, or prompt the user to apply another attenuator to increase the thickness 514 of the attenuator 502.

Appropriate adjustments can be made by the attenuation mitigator 314 based on pre-determined characteristics of the attenuator 502 (e.g., characteristics stored in the computer-readable media 204 of the electronic device 102 or within the system media 310) or by processing returns of the radar signal 506 to measure one or more characteristics of the attenuator 502. Even if some of the attenuation-dependent characteristics are fixed or constrained, the attenuation mitigator 314 can take these limitations into account to balance each parameter and achieve a target radar performance. As a result, the attenuation mitigator 314 enables the radar system 104 to realize enhanced accuracy and larger effective ranges for detecting and tracking the user that is located on an opposite side of the attenuator 502. These techniques provide alternatives to increasing transmit power, which increases power consumption of the radar system 104, or changing material properties of the attenuator 502, which can be difficult and expensive once a device is in production.

Figure 6:
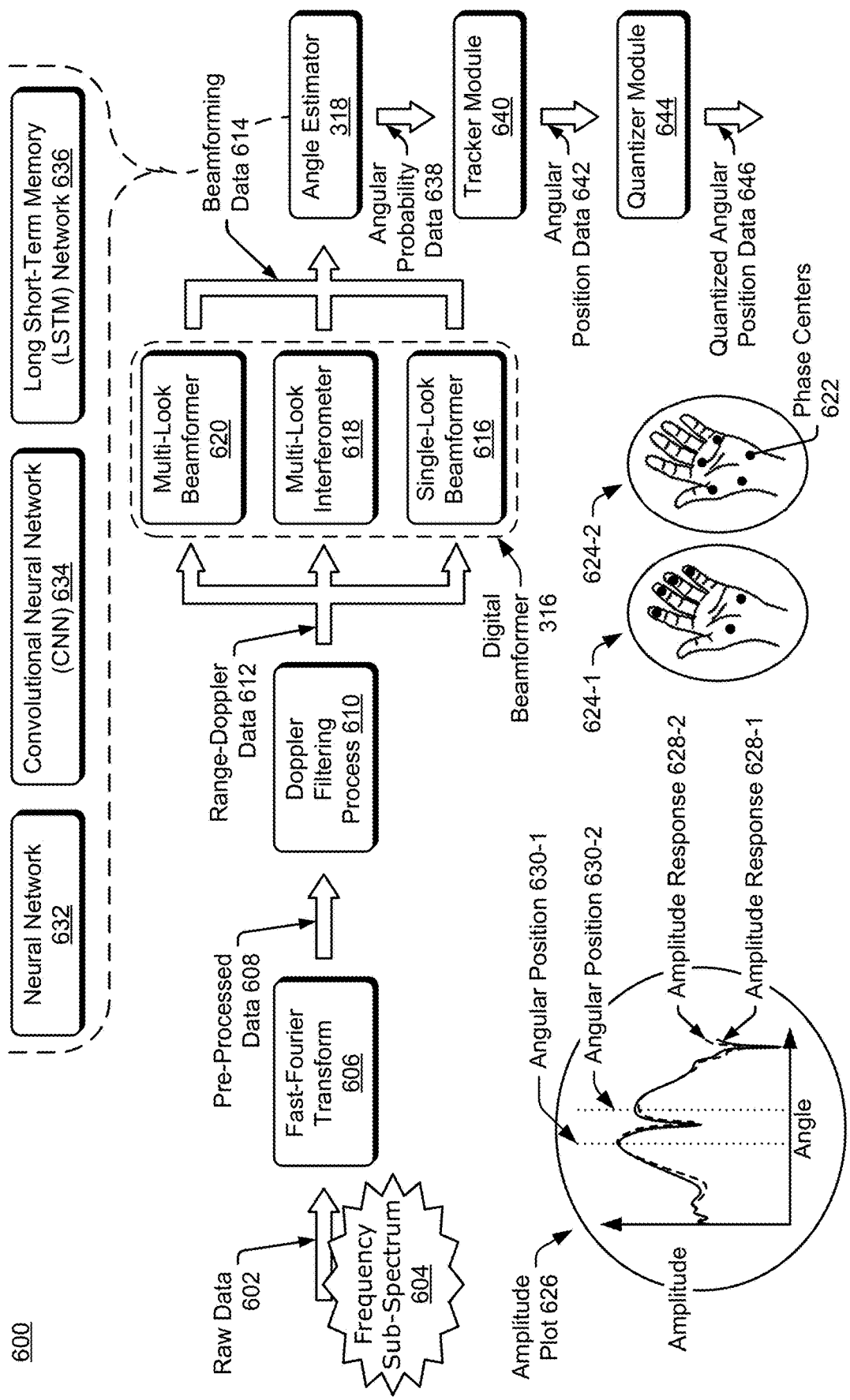
FIG. 6 illustrates an example scheme that can be implemented by the radar system of FIGS. 1 and 2.

FIG. 6 illustrates an example scheme 600 implemented by the radar system 104. Portions of the scheme 600 may be performed by the processor 308, the computer processors 202, or other hardware circuitry. The scheme 600 can be customized to support different types of electronic devices and radar-based applications (e.g., the input-mode manager 106), and also enables the radar system 104 to achieve target angular accuracies despite design constraints.

The transceiver 306 produces raw data 602 based on individual responses of the receiving antenna elements 402 to a received radar signal. The received radar signal may be associated with one or more frequency sub-spectra 604 that were selected by the angle estimator 318 to facilitate angular ambiguity resolution. The frequency sub-spectra 604, for example, may be chosen to reduce a quantity of sidelobes or reduce an amplitude of the sidelobes (e.g., reduce the amplitude by 0.5 dB, 1 dB, or more). A quantity of frequency sub-spectra can be determined based on a target angular accuracy or computational limitations of the radar system 104.

The raw data 602 contains digital information (e.g., in-phase and quadrature data) for a period of time, different wavenumbers, and multiple channels respectively associated with the receiving antenna elements 402. A Fast-Fourier Transform (FFT) 606 is performed on the raw data 602 to generate pre-processed data 608. The pre-processed data 608 includes digital information across the period of time, for different ranges (e.g., range bins), and for the multiple channels. A Doppler filtering process 610 is performed on the pre-processed data 608 to generate range-Doppler data 612. The Doppler filtering process 610 may comprise another FFT that generates amplitude and phase information for multiple range bins, multiple Doppler frequencies, and for the multiple channels. The digital beamformer 316 produces beamforming data 614 based on the range-Doppler data 612. The beamforming data 614 contains digital information for a set of azimuths and/or elevations, which represents the field of view for which different steering angles or beams are formed by the digital beamformer 316. Although not depicted, the digital beamformer 316 may alternatively generate the beamforming data 614 based on the pre-processed data 608 and the Doppler filtering process 610 may generate the range-Doppler data 612 based on the beamforming data 614. To reduce a quantity of computations, the digital beamformer 316 may process a portion of the range-Doppler data 612 or the pre-processed data 608 based on a range, time, or Doppler frequency interval of interest.

The digital beamformer 316 can be implemented using a single-look beamformer 616, a multi-look interferometer 618, or a multi-look beamformer 620. In general, the single-look beamformer 616 can be used for deterministic objects (e.g., point-source targets having a single phase center). For non-deterministic targets (e.g., targets having multiple phase centers), the multi-look interferometer 618 or the multi-look beamformer 620 are used to improve accuracies relative to the single-look beamformer 616. Humans are an example of a non-deterministic target and have multiple phase centers 622 that can change based on different aspect angles, as shown at 624-1 and 624-2. Variations in the constructive or destructive interference generated by the multiple phase centers 622 can make it challenging for conventional radars to accurately determine angular positions. The multi-look interferometer 618 or the multi-look beamformer 620, however, perform coherent averaging to increase an accuracy of the beamforming data 614. The multi-look interferometer 618 coherently averages two channels to generate phase information that can be used to accurately determine the angular information. The multi-look beamformer 620, on the other hand, can coherently average two or more channels using linear or non-linear beamformers, such as Fourier, Capon, multiple signal classification (MUSIC), or minimum variance distortion less response (MVDR). The increased accuracies provided via the multi-look beamformer 620 or the multi-look interferometer 618 enable the radar system 104 to recognize small gestures or distinguish between multiple portions of the user.

The angle estimator 318 analyzes the beamforming data 614 to estimate one or more angular positions. The angle estimator 318 may utilize signal-processing techniques, pattern-matching techniques, or machine-learning. The angle estimator 318 also resolves angular ambiguities that may result from a design of the radar system 104 or the field of view the radar system 104 monitors. An example angular ambiguity is shown within an amplitude plot 626 (e.g., amplitude response).

The amplitude plot 626 depicts amplitude differences that can occur for different angular positions of the target and for different steering angles 510. A first amplitude response 628-1 (illustrated with a solid line) is shown for a target positioned at a first angular position 630-1. Likewise, a second amplitude response 628-2 (illustrated with a dotted line) is shown for the target positioned at a second angular position 630-2. In this example, the differences are considered across angles between −180 degrees and 180 degrees.

As shown in the amplitude plot 626, an ambiguous zone exists for the two angular positions 630-1 and 630-2. The first amplitude response 628-1 has a highest peak at the first angular position 630-1 and a lesser peak at the second angular position 630-2. While the highest peak corresponds to the actual position of the target, the lesser peak causes the first angular position 630-1 to be ambiguous because it is within some threshold for which conventional radars may be unable to confidently determine whether the target is at the first angular position 630-1 or the second angular position 630-2. In contrast, the second amplitude response 628-2 has a lesser peak at the second angular position 630-2 and a higher peak at the first angular position 630-1. In this case, the lesser peak corresponds to the target's location.

While conventional radars may be limited to using a highest peak amplitude to determine the angular positions, the angle estimator 318 instead analyzes subtle differences in shapes of the amplitude responses 628-1 and 628-2. Characteristics of the shapes can include, for example, roll-offs, peak or null widths, an angular location of the peaks or nulls, a height or depth of the peaks and nulls, shapes of sidelobes, symmetry within the amplitude response 628-1 or 628-2, or the lack of symmetry within the amplitude response 628-1 or 628-2. Similar shape characteristics can be analyzed in a phase response, which can provide additional information for resolving the angular ambiguity. The angle estimator 318 therefore maps the unique angular signature or pattern to an angular position.

The angle estimator 318 can include a suite of algorithms or tools that can be selected according to the type of electronic device 102 (e.g., computational capability or power constraints) or a target angular resolution for the input-mode manager 106. In some implementations, the angle estimator 318 can include a neural network 632, a convolutional neural network (CNN) 634, or a long short-term memory (LSTM) network 636. The neural network 632 can have various depths or quantities of hidden layers (e.g., three hidden layers, five hidden layers, or ten hidden layers) and can also include different quantities of connections (e.g., the neural network 632 can comprise a fully-connected neural network or a partially-connected neural network). In some cases, the CNN 634 can be used to increase computational speed of the angle estimator 318. The LSTM network 636 can be used to enable the angle estimator 318 to track the target. Using machine-learning techniques, the angle estimator 318 employs non-linear functions to analyze the shape of the amplitude response 628-1 or 628-2 and generate angular probability data 638, which indicates a likelihood that the user or a portion of the user is within an angular bin. The angle estimator 318 may provide the angular probability data 638 for a few angular bins, such as two angular bins to provide probabilities of a target being to the left or right of the electronic device 102, or for thousands of angular bins (e.g., to provide the angular probability data 638 for a continuous angular measurement).

Based on the angular probability data 638, a tracker module 640 produces angular position data 642, which identifies an angular location of the target. The tracker module 640 may determine the angular location of the target based on the angular bin that has a highest probability in the angular probability data 638 or based on prediction information (e.g., previously-measured angular position information). The tracker module 640 may also keep track of one or more moving targets to enable the radar system 104 to confidently distinguish or identify the targets. Other data can also be used to determine the angular position, including range, Doppler, velocity, or acceleration. In some cases, the tracker module 640 can include an alpha-beta tracker, a Kalman filter, a multiple hypothesis tracker (MHT), and so forth.

A quantizer module 644 obtains the angular position data 642 and quantizes the data to produce quantized angular position data 646. The quantization can be performed based on a target angular resolution for the input-mode manager 106. In some situations, fewer quantization levels can be used such that the quantized angular position data 646 indicates whether the target is to the right or to the left of the electronic device 102 or identifies a 90-degree quadrant the target is located within. This may be sufficient for some radar-based applications, such as user proximity detection. In other situations, a larger number of quantization levels can be used such that the quantized angular position data 646 indicates an angular position of the target within an accuracy of a fraction of a degree, one degree, five degrees, and so forth. This resolution can be used for higher-resolution radar-based applications, such as gesture recognition, or in implementations of the gesture zone, recognition zone, aware mode, engaged mode, or active mode as described herein. In some implementations, the digital beamformer 316, the angle estimator 318, the tracker module 640, and the quantizer module 644 are together implemented in a single machine-learning module.

These and other capabilities and configurations, as well as ways in which entities of FIG. 1-6 act and interact, are set forth below. The described entities may be further divided, combined, used along with other sensors or components, and so on. In this way, different implementations of the electronic device 102, with different configurations of the radar system 104 and non-radar sensors, can be used to implement the visual indicator for paused radar gestures. The example operating environment 100 of FIG. 1 and the detailed illustrations of FIGS. 2-6 illustrate but some of many possible environments and devices capable of employing the described techniques.

Example Methods

Figure 7:
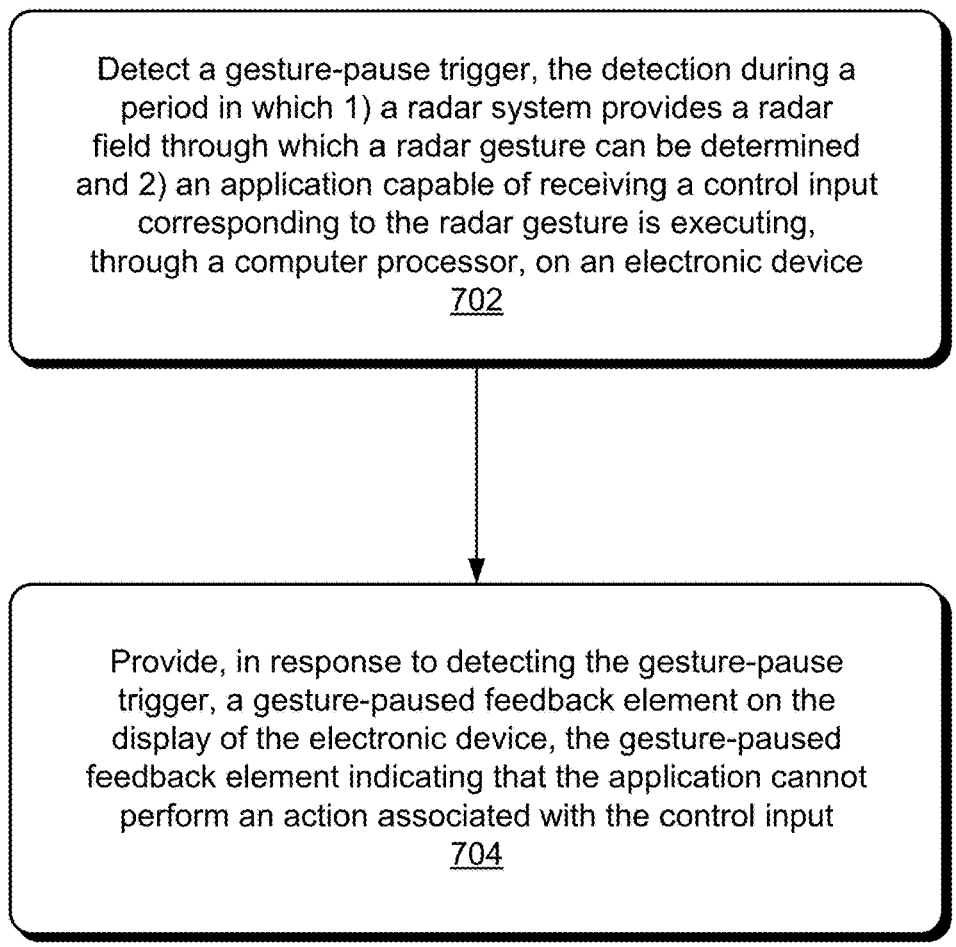
FIG. 7 depicts an example method that enables the visual indicator for paused radar gestures.

FIG. 7 depicts example method 700, which enables a visual indicator for paused radar gestures. The method 700 can be performed with an electronic device that includes, or is associated with, a display, a computer processor, and a radar system that can provide a radar field. The radar system and radar field can provide radar data, based on reflections of the radar field from objects in the radar field, such as a user of the electronic device (or from a portion of the user moving within the radar field, such as the user's hand) For example, the radar data may be generated by, and/or received through, the radar system 104, as described with reference to FIG. 1. The radar data is used to determine interactions of the user with the electronic device, such as a presence of the user in the radar field, gestures made by the user in the radar field (radar gestures), and movement of the user relative to the electronic device. Based on the determination of the user's presence, movements, and gestures, the electronic device can enter and exit different modes of functionality and present different visual elements on a display. The visual elements provide feedback to the user to indicate the user's posture with respect to the device, the availability of different functionalities for the electronic device, and the user's interactions with the electronic device. Additional examples of the visual elements are described with respect to FIGS. 8-16.

The method 700 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-6, reference to which is made for example only. The techniques are not limited to performance by one entity or multiple entities operating on one device.

At 702, a gesture-pause trigger is detected during a time period in which 1) a radar system is providing a radar field through which a radar gesture can be determined and 2) an application capable of receiving a control input corresponding to the radar gesture is executing, through the computer processor, on the electronic device. For example, the input-mode manager 106 can detect a gesture-pause trigger 122 during a time period in which two requirements are met. The first requirement is that the radar system 104 is providing the radar field through which a radar gesture can be determined based on the radar data obtained from reflections of objects in the radar field. The second requirement is that an application on the electronic device 102 that is capable of receiving a control input corresponding to the radar gesture is executing through the computer processor (e.g., a radar-gesture application is executing).

As described with reference to FIG. 1, the gesture-pause trigger 122 is a condition, or set of conditions, that when present, cause the electronic device 102 and/or the radar system 104 to enter a state in which radar gestures are paused (e.g., a state in which the radar-gesture applications cannot receive the control input corresponding to the radar gesture and/or perform an action associated with the control input). Generally, the gesture-pause trigger 122 is a condition that can make it difficult for the electronic device 102 or the radar system 104 to accurately and efficiently determine whether a user's motion is a radar gesture. Examples of the gesture-pause trigger 122 (described in detail with reference to FIG. 1) include an oscillating motion of the electronic device 102 that exceeds a threshold frequency, a motion of the electronic device at a velocity above a threshold velocity, and an oscillating motion of an object in the radar field that exceeds a threshold frequency. In some implementations (described in more detail with reference to FIG. 1), the input-mode manager 106 can detect the gesture-pause trigger 122 using the radar data, data from the non-radar sensors 108, or a combination of both the radar data and the data from the non-radar sensors 108.

At 704, in response to detecting the gesture-pause trigger, the electronic device enters the gesture-paused mode and a gesture-paused feedback element is provided on the display of the electronic device. The gesture-paused feedback element indicates that the radar-gesture application cannot receive the control input corresponding to the radar gesture. For example, the input-mode manager 106, in response to the detection of the gesture-pause trigger 122 during the described time period, can provide a gesture-paused feedback element 124 on the display 114 of the electronic device 102. The appearance of the gesture-paused feedback element 124 indicates that the radar-gesture application cannot perform the action associated with the control input or, in some implementations, cannot receive the control input corresponding to the radar gesture.

In some cases, the gesture-paused feedback element 124 is provided only when the gesture-pause trigger 122 is detected while the electronic device 102 is within a threshold distance of the user 112 (e.g., within approximately one, three, four, five, or six feet of the user 112). The threshold distance from the user may be determined using the radar data, data from the non-radar sensors 108 (e.g., a proximity sensor or an image-capture sensor), or a combination of both the radar data and the data from the non-radar sensors 108.

Generally, as described with reference to FIG. 1, the gesture-paused feedback element is a user-perceivable element, such as a visual element that appears on an active area of the display or an element that is not on the display (e.g., an LED or other lighted element, a haptic element, and/or an audio element). When the gesture-paused feedback element is a visual element that appears on the active area of the display, the gesture-paused feedback element may be provided at or along an edge of the display, as described with reference to FIG. 1, and may take any of a variety of shapes, sizes, colors, and other visual parameters or properties (e.g., luminosity, color, contrast, shape, saturation, or opaqueness).

In some implementations, as described with reference to FIG. 1, the visual element may have an area that is a portion of the active area of the display that has a luminosity or other visual property that is different from a luminosity or other visual property of another portion of the display that is proximate to the visual element. In this case, the visual element may also have a segment of an exterior border that is within a threshold distance from an edge of the active area of the display. Additionally, the luminosity (or other visual parameter) of the gesture-paused feedback element may vary as the gesture-paused feedback element extends across a distance from the edge of the active area of the display (e.g., have a luminosity at or along the edge of the display that decreases or increases as the shape extends away from the edge). In other implementations, the gesture-paused feedback element may appear at a location on the display that is not an edge (e.g., the gesture-paused feedback element may be provided in an interior region of the display and not be adjacent to or touch an edge of the display).

As described with reference to FIG. 1, the gesture-paused feedback element 124 can move on the active area of the display 114 and the movement can correspond to the motion of the gesture-pause trigger 122 (e.g., the velocity, oscillation frequency, or other movement of the gesture-paused feedback element 124 can correspond to the motion, velocity, or oscillation frequency of the gesture-pause trigger 122). Further, as described above, the gesture-paused feedback element 124 indicates that the radar-gesture application cannot receive the control input corresponding to the radar gesture because of conditions that may be unrelated to whether the user 112 has attempted to make a radar gesture. The input-mode manager 106 provides the gesture-paused feedback element 124 based on detection of the gesture-pause trigger 122 and does not require that a radar gesture was attempted. Rather, the gesture-paused feedback element 124 is an alert to the user that radar gestures are not currently available to control the radar-gesture applications on the electronic device 102.

In some implementations of the method 700, the gesture-paused feedback element may be provided as an adjustment to a visual element that is already being provided at or along the edge of the active area of the display (e.g., a previously provided visual element indicating that the application operating on the electronic device has the capability to receive radar gestures). For example, in the example shown in FIG. 1, the visual feedback element 126 is already being provided on the example display 114-1. When the gesture-pause trigger 122 is detected, the visual feedback element 126 may be adjusted to become the example gesture-paused feedback element 124, as shown on the example display 114-2, such as by changing size, shape, color, or another visual property.

The color of the gesture-paused feedback element may be any suitable color that can be visually differentiated from the background of the display on which it is provided. The color may change based on any of a variety of factors, as described with reference to FIG. 1. In some implementations of the method 700, a component of the electronic device (e.g., the input-mode manager 106), can determine a background color of a region of the display on which the gesture-paused feedback element is displayed. In response to determining the background color, the gesture-paused feedback element may be provided in another color that is different from the background color, which provides human-discernable contrast between the gesture-paused feedback element and the background color, as described with reference to FIG. 1. In some cases, the color of the gesture-paused feedback element can be continuously, automatically, and dynamically adjusted, based on changes to the background color.

As described with reference to FIG. 1, the gesture-paused feedback element may appear, at least in part, as a brief animation. For example, the gesture-paused feedback element may appear at the edge of the active display and then grow or shrink before taking on a default appearance. Similarly, the color, luminosity, or shape may change as the gesture-paused feedback element appears or disappears (e.g., if the radar-gesture application stops operating) before taking on the default appearance. Further, the gesture-paused feedback element may be an image that appears on the display, rather than an element that appears in a region of the display. The image may have visual parameters that are different from the parameters of an ambient background of the display, such as luminosity, saturation, or color. In other cases, the ambient background may be an image, and the gesture-paused feedback element is the same image, with different visual parameters, such as luminosity, saturation, color, and so forth. In this way, the gesture-paused feedback element can improve the user's experience by communicating to the user that the electronic device is operating in a mode in which radar gestures are currently not available for interacting with the electronic device.

In some implementations of the method 700, the location of the gesture-paused feedback element (and other visual feedback elements) may be determined based on an orientation of content on the display and/or a direction of the radar gesture that is used to interact with the content. For example, as described with reference to FIG. 1, a component of the electronic device, such as the input-mode manager 106, may obtain the orientation of the content on the display (e.g., from the application manager 116). Based on the orientation of the content, the display can determine the direction of the radar gestures that can be used to interact with the content and provide the gesture-paused feedback element at a particular edge of the active area of the display that corresponds to the direction of the radar gesture. Thus, if the context of the displayed content is horizontal, the gesture-paused feedback element is displayed at a top edge and, if the context of the displayed content is vertical, the gesture-paused feedback element is displayed at a side edge.

Further, a change in an orientation of the electronic device with respect to the user may be detected and, based on the change in orientation, visual feedback elements, such as the gesture-paused feedback element may be provided on a different edge of the display, in order to maintain the orientation and location of the gesture-paused feedback element with respect to the user. For example, as described with reference to FIG. 1, the user may rotate the device from a vertical to a horizontal orientation to watch a video or from a horizontal to a vertical orientation to read an article. Based on the change in orientation, the input-mode manager 106 can cause the display 114 to provide the gesture-paused feedback element 124 on a different edge of the active display, in order to maintain an orientation and location of the gesture-paused feedback element 124 with respect to the user. As noted, the orientation of the content may also be accounted for, and these features can be used in conjunction with each other to provide the gesture-paused feedback element on the display at the location appropriate for the orientation of both the content on the display and the orientation of the display with respect to the user.

In some cases, it can be determined that the radar-gesture application running on the electronic device is operating in an immersive mode (e.g., in a full-screen mode without any presented controls). In response to this determination, the display can briefly or periodically provide the gesture-paused feedback element when the gesture-pause trigger is detected. For example, as described with reference to FIG. 1, the gesture-paused feedback element 124 can be provided on the display for a feedback-element-presentation time duration and then stop being provided for a non-feedback-element-presentation time duration. Both the feedback-element-presentation time duration and the non-feedback-element-presentation time duration may be predetermined or selectable. The time durations may be selectable (e.g., by the user or by the input-mode manager 106 based on various factors, such as the type of radar-gesture application running in the immersive mode, the status of the radar-gesture application, or the frequency with which the user employs a radar gesture).

The gesture-paused feedback element (and other visual feedback elements) may fade or disappear entirely when the user interacts with the electronic device using input other than a radar gesture (e.g., a touch or voice input). For example, as described with reference to FIG. 1, the user may decide to start an application using a touch command on the electronic device, while the electronic device is in the gesture-paused state. In this case, the gesture-paused feedback element may fade or disappear when the user picks up the electronic device or touches the display. The gesture-paused feedback element restarts when the user stops touching the display or puts down the electronic device (if the gesture-pause trigger is still detected). The gesture-paused feedback element may reappear or brighten immediately when the touch or voice input ends, or after a selectable default time duration.

Visual feedback elements, such as the gesture-paused feedback element 124, can be provided while the electronic device 102 is in a locked state or an unlocked state. Thus, the electronic device may provide the gesture-paused feedback element when the described conditions are met, whether the user is authenticated or not authenticated. As described with reference to FIG. 1, the locked and unlocked states refer to a level of access to the electronic device. A locked state may be a state in which no user is authenticated and anyone using the device will have less than full rights or access (e.g., no access or rights, or limited access or rights). Examples of the locked state may include the aware and engaged modes of the electronic device as described herein. Similarly, an unlocked state can be a state in which at least one user is authenticated, and that user has full rights and/or access to the device. An example of the unlocked state is the active mode of the electronic device, as described herein.

These techniques for a visual indicator for paused radar gestures may be more secure than other authentication and feedback techniques. For example, a user's position, orientation, or use of radar gestures (especially user-defined gestures, micro-gestures, and posture or position-based gestures) are typically not duplicable or obtainable by an unauthorized person (unlike, for example, a password). Further, a radar image of the user (e.g., based on the radar data described above), even if it includes the user's face, does not visually identify the user like a photograph or video may do. Even so, further to the descriptions above, the user may be provided with controls allowing the user to make an election as to both whether and when any of the systems, programs, managers, modules, or features described in this document may enable collection of user information (e.g., images of the user, radar data describing the user, information about a user's social network, social actions or activities, profession, a user's preferences, or a user's current location), and whether and when the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, zip/postal code, or state level), so that a particular location of a user cannot be determined. Thus, the user may have control over what information is collected about the user, how that information is used, and what information is provided to or about the user.

Example Visual Elements

As noted, the techniques and systems described herein can enable the electronic device 102 to provide feedback and notification to make the user aware of an available application that can receive input via radar gestures and, in some cases, provide additional feedback regarding the use and results of the radar gestures. The feedback and notification are provided by one or more user-perceivable elements, such as visual elements that are presented on the display 114. The techniques and systems can also enable a determination of the user's absence, presence, and location, which can be used to provide a more-responsive and more-efficient authentication process. For example, the techniques enable the electronic device to anticipate when the user is ready to be authenticated and to more-accurately determine when to lock the device when the user is away. The feedback, visual elements, and other features enable interactions that are more convenient and less frustrating because the user is aware of the input modes and can be confident about different ways in which the device can interact and receive input. FIGS. 8-19 illustrate examples of the electronic device 102 running a radar-gesture application and describe examples of the visual elements that can be presented on the display to provide feedback to the user. Examples of the electronic device operating in multiple different modes and examples of the visual elements that can be presented on the display in the different modes are also described.

Consider FIG. 8, which illustrates generally, at 800, an example of a visual feedback element that can be used to indicate that a radar-gesture application is running on the electronic device 102. In FIG. 8, a detail view 800-1 shows an example display 114-3 to indicate a state of the electronic device 102 with no radar-gesture application running. Another state of the electronic device 102, in which at least one radar-gesture application is running, is shown on another example display 114-4. A visual element 802 at the top of the example display 114-4 indicates that the electronic device 102 can receive input through radar gestures, as described above. The visual element 802 is shown as an illuminated line, but, as noted above, may be presented at another location, at a different illumination level (e.g., only partially illuminated), or as another shape or type of element. For example, in another detail view 800-2, an example display 114-5 is shown to indicate the state of the electronic device 102 with no radar-gesture application running Another state of the electronic device 102, in which at least one radar-gesture application is running, is shown on another example display 114-6. A visual element 804 at the top of the example display 114-6 indicates that the electronic device 102 can receive input through radar gestures, as described above. The visual element 804 is shown as an illuminated area (e.g., a glowing area). As with the visual element 802, the visual element 804 could be presented at another location on the display 114-6, at a different illumination level (e.g., more-illuminated or less-illuminated), or as another shape or type of element. Note that for clarity, no other elements (e.g., time, date, or application launch icons) are shown on the example displays 114-3 through 114-6. In other implementations, however, the visual elements 802 or 804 may be displayed along with other content on the display. Further, the visual elements 802 or 804 may be displayed while the electronic device 102 is in the aware mode, the engaged mode, the active mode, or another mode.

In some implementations, the electronic device 102 can also provide more-detailed visual feedback that is related to the availability of radar gestures. For example, the input-mode manager 106, the application manager 116, or another component associated with the electronic device 102 can cause the display 114 to present other visual elements that provide feedback regarding input received through radar gestures. FIGS. 9-19 illustrate additional details of some of the ways that visual elements can be used to provide the feedback related to the use of radar gestures.

For instance, consider FIGS. 9A-9D, which illustrate generally, at 900, examples of a visual feedback element that may be used to indicate that a user's hand is within a gesture zone that enables a radar-gesture application to receive radar gestures (e.g., the gesture zone 118). The gesture zone 118 is an area around the electronic device 102 (or the radar system 104) within which the electronic device 102 can receive, interpret, and act on radar gestures, such as a swipe or a pinch. The gesture zone can extend any suitable distance from the electronic device 102 (e.g., approximately three, five, seven, nine, or twelve inches).

In FIG. 9A, an example display 114-7 is shown in a state in which at least one radar-gesture application is running (e.g., similar to the example display 114-6 described with reference to FIG. 8). A user's hand 902 is shown near the example display 114-7, but outside the gesture zone 118 (the border of the gesture zone is shown as a dotted line 904). An example visual element 906 is shown as a glowing area (e.g., an area or shape with varying brightness, color, or other properties) near the top of the example display 114-7 with a luminosity that changes with distance from the top. In other implementations, the visual element 906 could be presented at another location or as another shape or type of element (e.g., a line, as shown in the detail view 800-1 of FIG. 8). In FIG. 9B, the user's hand 902 moves toward the electronic device and crosses the border 904 of the gesture zone, as shown by the arrow 908. In response to the electronic device detecting the movement 908, another visual element 910 replaces the visual element 906, as shown on an example display 114-8. In this example, the visual element 910 is a glowing area that is larger than the visual element 906 and has a different brightness or luminosity (e.g., less-, more-, or fully-illuminated). In other implementations, the visual element 910 could also be presented at another location or as another shape or type of element.

As shown in FIG. 9C, when the user's hand 902 is within the border 904 of the gesture zone, the visual element 910 can, in some implementations, be used to provide feedback that indicates smaller, non-gesture motion of the user's hand 902, which are represented by a double-ended arrow 912. For example, as shown on an example display 114-9, the visual element can move to indicate the user's hand movements by moving back and forth with the user's hand, as shown by an arrow 914. In FIG. 9D, the user's hand 902 is withdrawn outside the border 904 of the gesture zone, as shown by an arrow 916. In response to the motion of the user's hand, the display 114 returns to the state as shown in the example display 114-7, in which the visual element 906 is displayed near the top edge of the display 114.

In some implementations (not shown in FIG. 9A-9D), the non-gesture motions can be represented by other visual elements or changes to the visual elements. For example, a size and/or shape can change, or a center or focal point of the shape can move to represent the motions (while the shape itself remains stationary). Additionally or alternatively, changes to an intensity of the brightness or color can be used to represent the motion (e.g., the brightness or color of the shape, or part of the shape, change in accordance with the non-gesture motions. The visual elements 906 and 910, along with the motion of the visual element 910, can help the user understand when gestures are available, and provide feedback that indicates the electronic device 102 is aware of the relative position of the user's hand, which can improve the user's experience with the electronic device 102.

Figure 11:
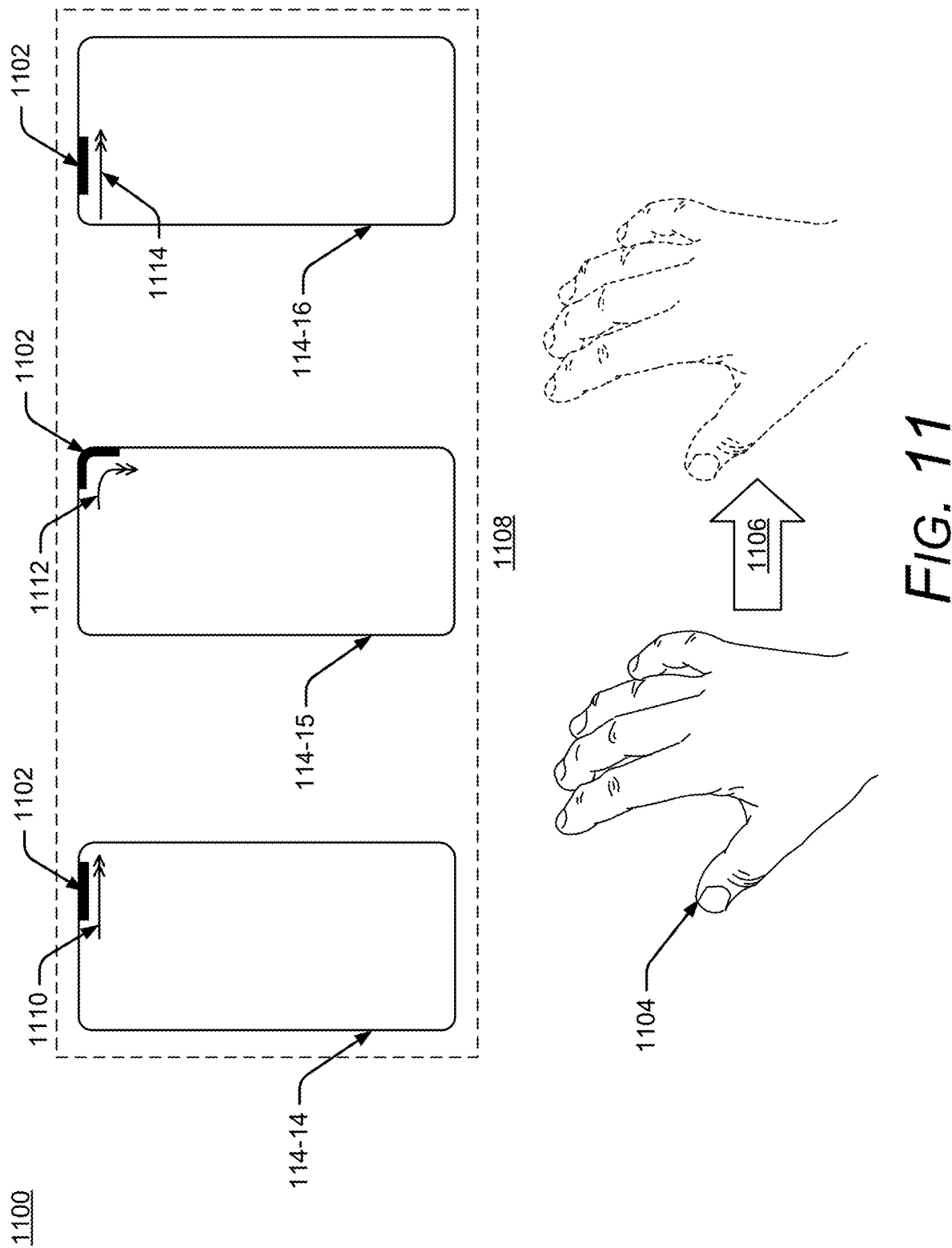
Figure 12:
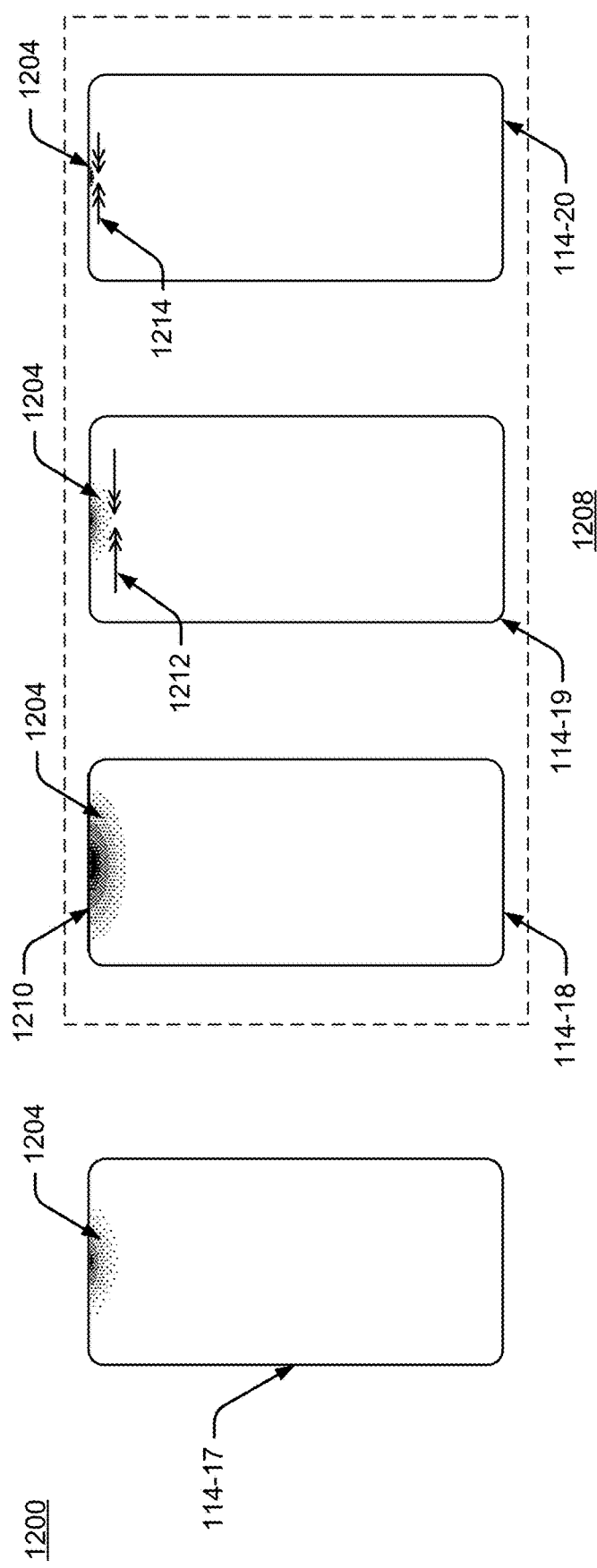

As described with reference to FIG. 9C, the electronic device 102 can provide visual feedback to represent smaller, non-gesture motion of the user's hand in the gesture zone, such as moving a visual element back and forth on the display, corresponding to the motion of the user's hand. Similarly, when the user makes a radar gesture (e.g., a swiping gesture to skip a song or an omni-gesture to dismiss an alert or notification), the electronic device 102 can provide feedback to notify the user that the gesture has been successfully received or that a gesture attempt was received but it was not clear enough to be confirmed as a radar gesture or did not correspond to a radar gesture for a radar-gesture application on the electronic device. For example, FIGS. 10-12 illustrate generally, at 1000 and 1100, sequences of example visual elements that can be used to notify the user that a gesture has been successfully received.

Consider FIG. 10, which illustrates an example display 114-10 in a state in which at least one radar-gesture application is running and a user's hand 1002 is within a boundary of a gesture zone (e.g., similar to the state represented by the example display 114-8 described with reference to FIG. 9B). The example display 114-10 is presenting a visual element 1004, shown as a glowing area (e.g., an area or shape with varying brightness, color, or other properties) near the top of the example display 114-10 with a luminosity that changes with distance from the top. In this example, the visual element 1004 indicates the availability of radar gestures. Continuing the example, the user makes a successful sliding or swiping gesture from left to right, as shown by the arrow 1006 (e.g., a gesture that meets the criteria for a radar gesture as described with reference to FIG. 1, corresponds to a control input of the application, and/or results in the application receiving or responding to the control input). In response to the motion 1006 of the user's hand 1002, the visual element 1004 also moves, as shown in a sequence 1008 (shown within a dashed-line rectangle). An example display 114-11 illustrates the beginning of the sequence 1008, as the visual element 1004 begins moving to the right, as shown by an arrow 1010.

The sequence 1008 continues in another example display 114-12, in which the visual element 1004 bends around a corner of the example display 114-12, as shown by an arrow 1012. The visual element 1004 can continue down a side of the display 114 for a variable distance (e.g., as soon as a trailing end of the visual element completes the bend or after the trailing end has traveled a particular distance along the side) and then disappear. Continuing the sequence 1008 in another example display 114-13, the visual element 1004 reappears or regenerates from the left side of the example display 114-13 and moves toward the center position, as shown by an arrow 1014. In some implementations, the visual element 1004 can reappear or regenerate at the initial position (as shown in the example display 114-10), rather than from the left side. When the sequence 1008 is complete, the display returns to the state as shown in the example display 114-10, with the visual element 1004 displayed near the top of the display 114 and may subtly track the user's hand 1002 while the hand remains within the boundary of the gesture zone. Note that in the example of FIG. 10, the sequence 1008 begins when the user begins the gesture. In other cases, the gesture and the sequence 1008 may be completed at different times or begin at another location on the display 114 and proceed in another direction, such as right to left, top to bottom, or bottom to top (e.g., if a radar gesture moved from right to left, top to bottom, or bottom to top).

Figure 10:
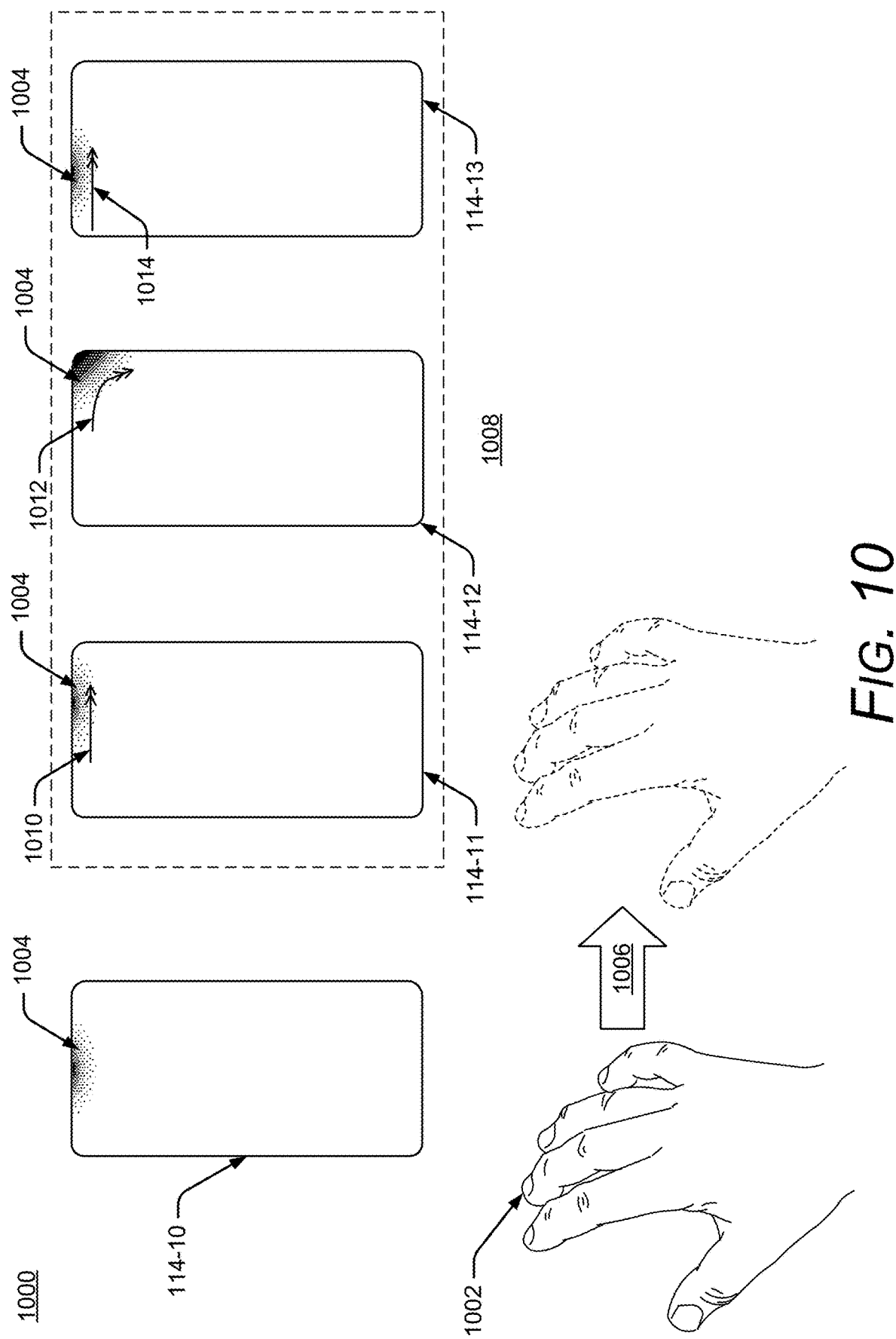

Further, while the visual element 1004 of FIG. 10 is shown as a glowing area near the top of the display 114, the visual element could be presented at another location or as another shape or type of element. For example, FIG. 11 shows another example visual element 1102 as an illuminated line near the top edge of the display 114. In response to a left-to-right motion of the user's hand 1104 (shown by an arrow 1106), the visual element 1102 also moves, as shown in a sequence 1108 (shown within a dashed-line rectangle). An example display 114-14 illustrates the beginning of the sequence 1108, as the visual element 1102 begins moving to the right, as shown by an arrow 1110.

The sequence 1108 continues in another example display 114-15, in which the visual element 1102 bends around a corner of the example display 114-15, as shown by an arrow 1112. As noted, the visual element 1102 may continue down a side of the display for a variable distance and then disappear. Continuing the sequence 1108 in another example display 114-16, the visual element 1102 reappears or regenerates from the left side of the example display 114-16 (or reappears at the initial position) and moves toward the center position, as shown by an arrow 1114. When the sequence 1108 is complete, the display returns to a state in which the visual element 1102 is displayed near the top of the display 114.

Consider another example (not illustrated), in which a user is listening to music with a radar-gesture application on a smartphone (e.g., the electronic device 102). Assume the user decides to skip a track and makes a radar gesture over the smartphone. The radar gesture may be a swipe in either direction (e.g., left-to-right to skip to the next track or right-to-left to restart the current track or skip to a previous track). When the user's hand enters the gesture zone, a visual element is presented. As the user begins the radar gesture, the electronic device (e.g., through the radar system 104, the input-mode manager 106, or the application manager 116) presents the visual element in the sequence 1008 or 1108, as described with reference to FIGS. 10 and 11, respectively.

In some implementations, the visual elements 1004 and 1102 can move in the horizontal direction (e.g., as shown in the example displays 114-12 and 114-15) while the radar gesture is being processed. When the radar gesture is successfully received (e.g., the control input is sent and/or the application responds), the motion of the visual elements 1004 and 1102 changes direction (e.g., goes around the corner as shown in the example displays 114-13 and 114-16). This is particularly advantageous for the human visual system as the change in direction registers very quickly as compared, for example, to the element simply reaching the right edge of the screen.

Other examples of visual feedback elements that can indicate a successful radar gesture include a visual element that bends or flexes (e.g., at one end, both ends, in the middle, or at another location) to show a successful radar gesture, such as a gesture made in a direction perpendicular to the display 114 or a gesture with a component that is perpendicular to the display 114. In other cases, the visual element 1004 or 1102 may disappear at or before it reaches the corner, or it may continue down a side of the display 114 around the corner, or even move all the way around the display 114.

In some implementations, a visual feedback element can provide feedback that is independent of the motion of the radar gestures. For example, in some implementations, an omni-gesture is used as a direction-independent radar gesture (e.g., because the omni-gesture dismisses alerts or alarms and is not intended to move content in a direction or skip/replay music, the direction of the gesture does not matter to its function). Consider FIG. 12, which illustrates generally, at 1200, a sequence of example visual elements that can be used to notify the user that a direction-independent radar gesture has been successfully received. In FIG. 12, an example display 114-17 is shown in a state in which at least one radar-gesture application is operating on the electronic device 102 and a user's hand 1202 is within a boundary of a gesture zone (e.g., similar to the state represented by the example display 114-8 described with reference to FIG. 9B). The example display 114-17 is presenting a visual element 1204, shown as a glowing area (e.g., an area or shape with varying brightness, color, or other properties) near the top of the example display 114-17 with a luminosity that changes with distance from the top. In this example, the visual element 1204 indicates the availability of radar gestures (e.g., that a radar-gesture application is currently running, or stored, on the electronic device). Continuing the example, assume that the radar-gesture application is presenting an alert on the display and that the user has decided to dismiss the alert. To do so, the user makes an omni-gesture toward the electronic device 102, as shown by the arrow 1206.

In response to the motion 1206 of the user's hand 1202, the visual element 1204 changes, as shown in a sequence 1208 (shown within a dashed-line rectangle). An example display 114-18 illustrates the beginning of the sequence 1208, as the visual element 1204 becomes larger and brighter (e.g., increases in luminosity), and includes a bright line 1210 proximate to the edge of the display 114-18. The sequence 1208 continues in another example display 114-19, in which the visual element 1204 begins to decrease in size, as shown by a double-ended arrow 1212. Continuing the sequence 1208 in another example display 114-20, the visual element 1204 continues to decrease in size, shrinking toward the center of the upper edge example display 114-20, as shown by a double-ended arrow 1214. The sequence 1208 continues until the visual element 1204 disappears (not illustrated).

When the sequence 1208 is complete, the display returns to the state as shown in the example display 114-17, with the visual element 1204 displayed near the top of the display 114 and subtly tracking the user's hand 1202 while the hand remains within the boundary of the gesture zone. Note that while the sequence 1208 in the example of FIG. 12 begins when the user begins the gesture, the gesture and the sequence 1208 may be completed at different times or begin at another location on the display 114 and proceed in another manner or direction, such as shrinking then growing or changing color and/or brightness without changing size. The examples of visual feedback elements shown in FIGS. 10-12 illustrate just some of the ways in which a visual feedback element can be employed to help the user understand when a radar gesture has been accepted and when the gesture is complete, which can improve the user's experience with the electronic device 102.

Visual feedback elements can also be used to provide feedback when a gesture is attempted but not received (e.g., the user's motion was detected but did not meet the criteria to be confirmed as a radar gesture, did not correspond to a control input of the application, and/or did not result in the application receiving or responding to the control input). For example, FIGS. 13 and 14 illustrate generally, at 1300 and 1400, sequences of example visual elements that can be used to notify the user that a gesture has been detected but not successfully made or received.

Consider FIG. 13, which illustrates an example display 114-21 in a state in which at least one radar-gesture application is running and in which a user's hand 1302 is within the boundary of a gesture zone (e.g., similar to the state represented in the example display 114-8 described with reference to FIG. 9B). The example display 114-21 is presenting a visual element 1304, shown as a glowing area (e.g., an area or shape with varying brightness, color, or other properties), near the top of the example display 114-21, with a luminosity that changes with distance from the top. In this example, the visual element 1304 indicates the availability of radar gestures and that the user's hand 1302 is within the gesture zone.

Figure 13:
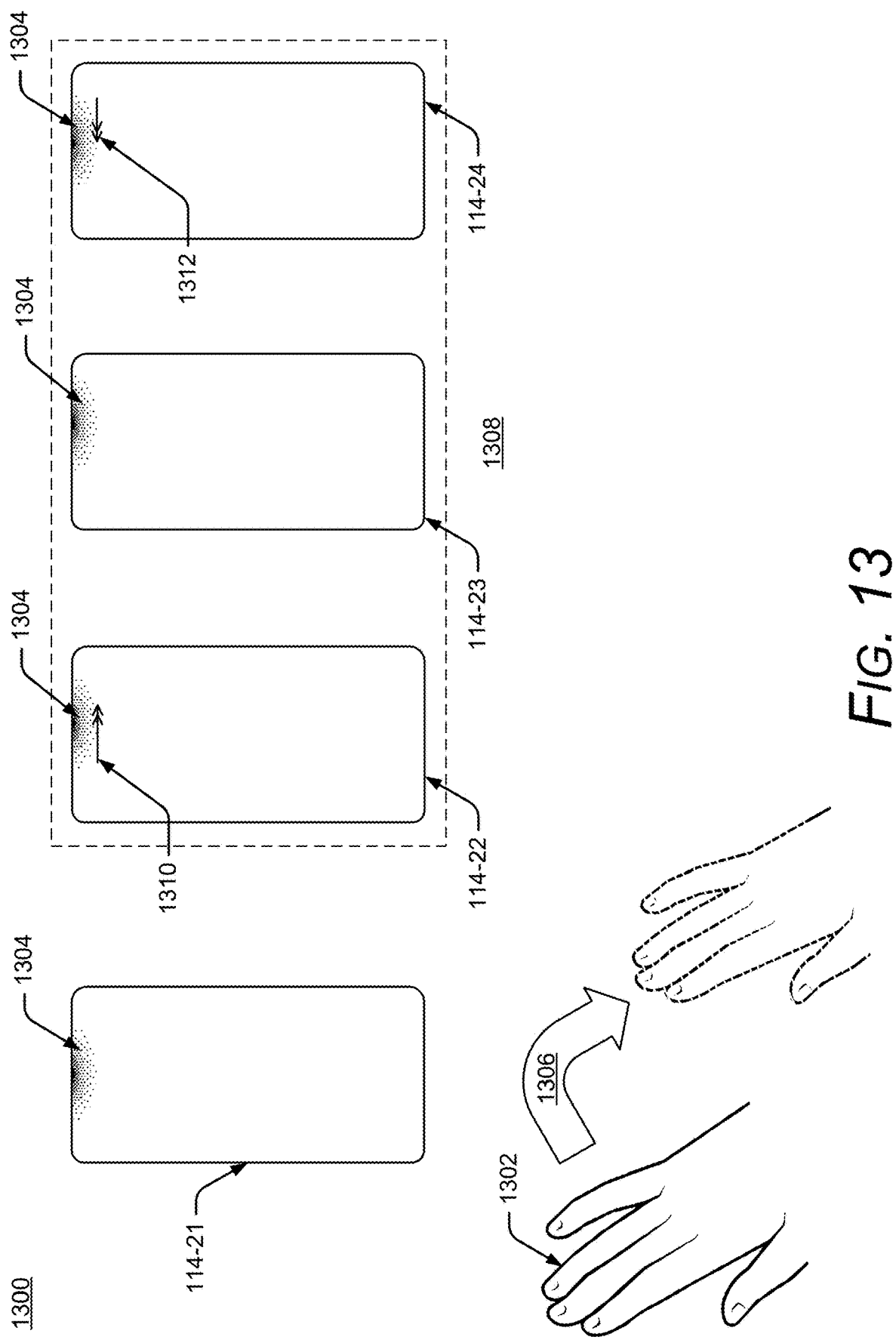

In the example of FIG. 13, assume that the user attempts to make a sliding or swiping gesture from left to right, but fails to meet the criteria for a swiping gesture or did not correspond to a radar gesture for a radar-gesture application on the electronic device, as described above. For example, as shown by a curved arrow 1306, the user's hand 1302 may fail to travel sufficient distance in a relevant direction before withdrawing. In this case, when the electronic device 102 (or the radar system 104) detects the motion 1306 of the user's hand 1302, which lacks sufficient definition to be successfully determined to be a radar gesture, the visual element 1304 moves as shown in a sequence 1308 (shown within a dashed-line rectangle). An example display 114-22 illustrates the beginning of the sequence 1308, as the visual element 1304 begins moving to the right, as shown by an arrow 1310.

Continuing the sequence 1308 in another example display 114-23, the visual element 1304 has stopped before reaching an opposite edge of the example display 114-23. In some cases, the visual element may decrease in size compared to its starting length (as shown in the example display 114-21) as it moves across the display. In other cases, the visual element 1304 may decrease in size when it stops (e.g., it compresses when it gets to the stopping point).

The sequence 1308 continues in another example display 114-24, in which the visual element 1304 reverses direction and begins to move back toward its original location (the center in this example), as shown by another arrow 1312. If the visual element 1304 decreased in size as it was moving or when it stopped its movement, then it can also begin to grow back to its original length as it moves back or when it completes its return. In other implementations, rather than stopping (and, in some cases, shrinking), the visual element 1304 may slow and bounce before reversing direction. When the sequence 1308 is complete, the display returns to the state as shown in the example display 114-21, with the visual element 1304 displayed near the top of the example display 114 and subtly tracking the user's hand 1302 while it remains within the boundary of the gesture zone (e.g., as shown in FIG. 9A-9D).

Other examples of sequences that show an unsuccessful radar-gesture attempt include a visual element that partially collapses on itself, such as by briefly shrinking, and then returns to its original size and position. For example, in some implementations, a visual feedback element can provide feedback that is independent of the motion of the radar gesture (an omni-gesture). In these implementations, the feedback can be a sequence of changes to the visual element.

FIG. 14 illustrates another sequence of example visual elements that can be used to notify the user that a gesture (e.g., an omni-gesture) has failed to be successfully made or received. In FIG. 14, an example display 114-25 is shown in a state in which at least one radar-gesture application is running and in which a user's hand 1402 is within the boundary of a gesture zone (e.g., similar to state represented in the example display 114-8 described with reference to FIG. 9B). The example display 114-25 is presenting a visual element 1404, shown as a glowing area (e.g., an area or shape with varying brightness, color, or other properties), near the top of the example display 114-25, with a luminosity that changes with distance from the top. In this example, the visual element 1404 indicates the availability of radar gestures and that the user's hand 1402 is within the gesture zone.

In the example of FIG. 14, assume that the user attempts to make an omni-gesture, as described above, but the gesture does not meet the criteria for an omni-gesture or did not correspond to a radar gesture for a radar-gesture application on the electronic device. For example, as shown by a curved arrow 1406, the user's hand 1402 may fail to travel sufficient distance before withdrawing. In this case, when the electronic device 102 (or the radar system 104) detects the motion 1406 of the user's hand 1402, which lacks sufficient definition to be successfully determined to be a radar gesture, the visual element 1404 moves as shown in a sequence 1408 (shown within a dashed-line rectangle). An example display 114-26 illustrates the beginning of the sequence 1408, as the visual element 1404 begins to dim in brightness and starts to shrink, as shown by a double-ended arrow 1410. Continuing the sequence 1408 in another example display 114-27, the visual element 1404 stops shrinking and begins to brighten and expand, as shown by another double-ended arrow 1412. The sequence 1408 continues in another example display 114-28, in which the visual element 1404 returns to the state as shown in the example display 114-25, with the visual element 1404 displayed near the top of the example display 114 and subtly tracking the user's hand 1402 while it remains within the boundary of the gesture zone (e.g., as shown in FIG. 9A-9D).

The motion of the visual elements 1304 and 1404 can help the user understand when a gesture has not been successfully completed. This helps the user learn better techniques for making successful radar gestures and also allows the user to become aware when an attempted gesture fails (e.g., so it can be attempted again, if necessary), which can improve the user's experience with the electronic device 102.

Note that the sequences 1308 and 1408 may begin when the electronic device 102 (or the radar system 104) detects (e.g., using one or more subsets of the radar data) that the user has attempted a radar gesture, but also determines that the gesture fails to meet at least one criterion that is necessary for acceptance. Accordingly, the attempted gesture and the sequence 1308 (or 1408) may be completed at different times, depending on the nature of the attempted gesture and the speed of the sequence 1308 (or 1408). Further, as described above, while both the visual elements 1304 and 1404 are shown as a glowing area near the top of the display 114, the visual elements 1304 and 1404 may be presented at another location or as another shape or type of element (e.g., an illuminated line, as shown in the detail view 800-1 of FIG. 8). Either or both of the sequences 1308 or 1408 could also begin at another location on the display 114 and proceed in another direction, such as right to left, top to bottom, or bottom to top (e.g., if an attempted radar gesture moved from right to left, top to bottom, or bottom to top).

Generally, the electronic device 102 includes a gesture-paused mode that can turn off or suspend the radar-gesture capabilities of the electronic device 102. The gesture-paused mode can be activated when the gesture-pause trigger 122 is detected, as described with reference to FIG. 1. When the gesture-pause trigger 122 is detected, the electronic device enters the gesture-paused mode and the input-mode manager 106 provides the gesture-paused feedback element 124. As noted, the gesture-pause trigger 122 can be any of a variety of circumstances, as described with reference to FIG. 1, such as an oscillating motion of the electronic device 102 that exceeds a threshold frequency, a motion of the electronic device at a velocity above a threshold velocity, or an oscillating motion of an object in the radar field, such as the user 112 (or a portion of the user 112), that exceeds a threshold frequency. The gesture-paused feedback element 124 can be presented with motion that corresponds to the gesture-pause trigger 122.

In a case in which the gesture-pause trigger is an oscillating motion of the electronic device, the corresponding movement of the visual element is a decrease in luminosity (or another visual property) of at least part of the gesture-paused feedback element 124 and a decrease in a size of the gesture-paused feedback element 124. In some cases, the gesture-paused feedback element 124 may shrink and dim and then remain in that state until the gesture-pause trigger 122 is no longer detected (e.g., the gesture-paused mode ends). In other cases, the gesture-paused feedback element 124 may also move laterally (back and forth) and the frequency of the lateral movement may approximately match the oscillation frequency of the electronic device 102. In still other implementations, the gesture-paused feedback element 124 can "pulse" or alternate between an original form and the dimmed and shrunken form and the pulsation frequency can match the oscillation frequency of the electronic device 102.

In another case, in which the gesture-pause trigger is an oscillating motion of the object in the radar field (e.g., the user 112 or a portion of the user 112, such as a hand), the corresponding movement of the gesture-paused feedback element 124 is a decrease in luminosity (or another visual property) of at least part of the gesture-paused feedback element 124 and a decrease in a size of the gesture-paused feedback element 124. In some cases, the gesture-paused feedback element 124 may shrink and dim and then remain in that state until the gesture-pause trigger 122 is no longer detected (e.g., the gesture-paused mode ends). In other cases, the gesture-paused feedback element 124 may also move laterally (back and forth) and the frequency of the lateral movement may approximately match the oscillation frequency of the object in the radar field. In still other implementations, the gesture-paused feedback element 124 can "pulse" or alternate between an original form and the dimmed and shrunken form and the pulsation frequency can match the oscillation frequency of the object in the radar field.

In either case (the gesture-pause trigger 122 being oscillation of the electronic device 102 or oscillation of the object in the radar field), the corresponding movement of the gesture-paused feedback element 124 can be the lateral movement or pulsation (including the matching frequencies), as described above, without a change in luminosity or size.

The electronic device 102 may determine to enter the gesture-paused mode based on input from any of a variety of sensors, including a radar sensor (e.g., the radar system 104), an inertial measurement unit (IMU), a proximity sensor (e.g., an active infrared proximity sensor), and so forth. For example, if the user is walking and listening to audio content with the electronic device 102 in the user's hand, swinging back and forth, the motion may be similar to a radar-based swipe gesture, but the user does not intend to skip tracks or adjust the volume. Accordingly, because the motion of the electronic device 102 can introduce ambiguity into the gesture interpretation process, the electronic device 102 may determine to enter the gesture-paused mode until the ambiguity is resolved (e.g., the user stops walking).

Figure 15:
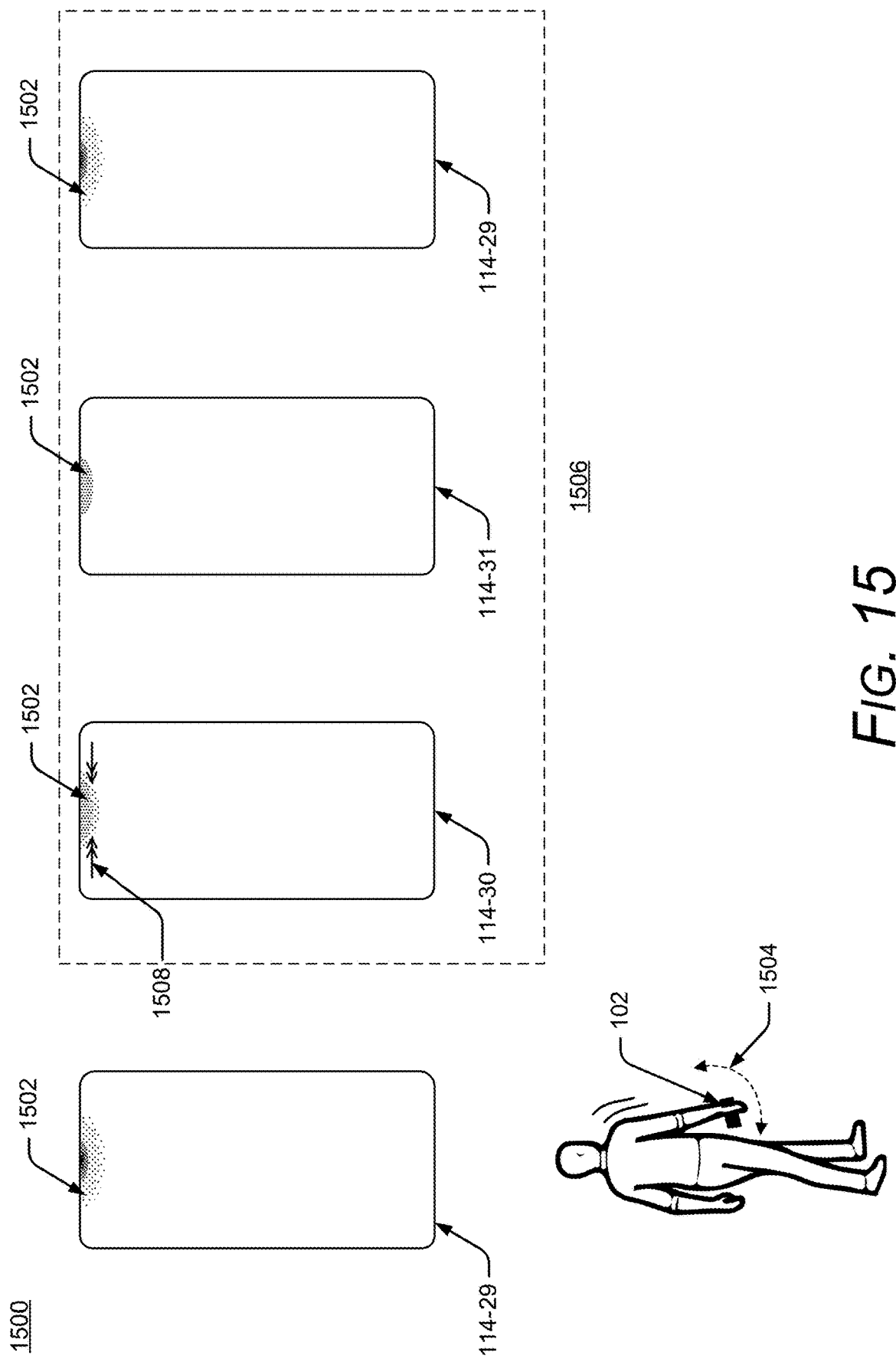
FIGS. 15 and 16 illustrate examples of a gesture-paused feedback element, which can be presented on the display of the electronic device of FIGS. 1 and 2 to alert the user that a radar-gesture application is running on the electronic device but radar gestures are currently paused.

FIG. 15 illustrates generally, at 1500, example visual elements (e.g., examples of the gesture-paused feedback element 124) that may be used to indicate that a radar-gesture application is available to receive radar gestures, but that gestures are currently paused. The gesture-paused mode may be activated whenever radar gestures are available, whether the user's hand is in or out of the gesture zone. In FIG. 15, an example display 114-29 is shown in a state in which at least one radar-gesture application is running and a user's hand is within the boundary of a gesture zone (e.g., similar to the state represented in the example display 114-8 described with reference to FIG. 9B). The example display 114-29 is presenting a visual element 1502, shown as a glowing area near the top of the example display 114-29, to indicate the availability of radar gestures and that the user's hand is within the gesture zone. If the user takes an action that causes the electronic device 102 to enter the gesture-paused mode (e.g., the gesture-pause trigger 122 is detected, such as by the user's hand moving back and forth as the user is walking, as shown by an arrow 1504), the visual element 1502 can change, as shown in a sequence 1506 (within a dashed-line rectangle).

An example display 114-30 illustrates the beginning of the sequence 1506 as the visual element 1502 dims in brightness and shrinks, as shown in the example display 114-30 by a double-ended arrow 1508. The sequence 1506 continues in another example display 114-31, in which the visual element 1502 has stopped shrinking and is displayed near the center of the top edge of the display 114-31. The smaller, dimmer, visual element 1502 indicates that the gesture-paused mode is engaged. The sequence 1506 ends when the gesture-pause trigger ends and the visual element 1502 returns to the state shown in the example display 114-29.

As described above, the visual element 1502 is shown as a glowing area near the center of the top of the display 114. In other implementations, the sequence 1506 can also begin at another location on the display 114 (e.g., depending on the orientation of content on the display 114, the direction of the radar gestures, or another factor) or the visual element 1502 can be presented at another location or as another shape or type of element. In some cases, the example visual element 1502 can have a color (e.g., blue, green, or a combination of more than one color). In these cases, the step described with reference to the example display 114-30 or 114-31 may include a change in color. The change may be to another color, such as blue to yellow. In other cases, the visual element 1502 becomes colorless, and is merely a contrasting glowing area, so that against a dark background it is a lighter area and against a light background it is a darker area.

Figure 16:
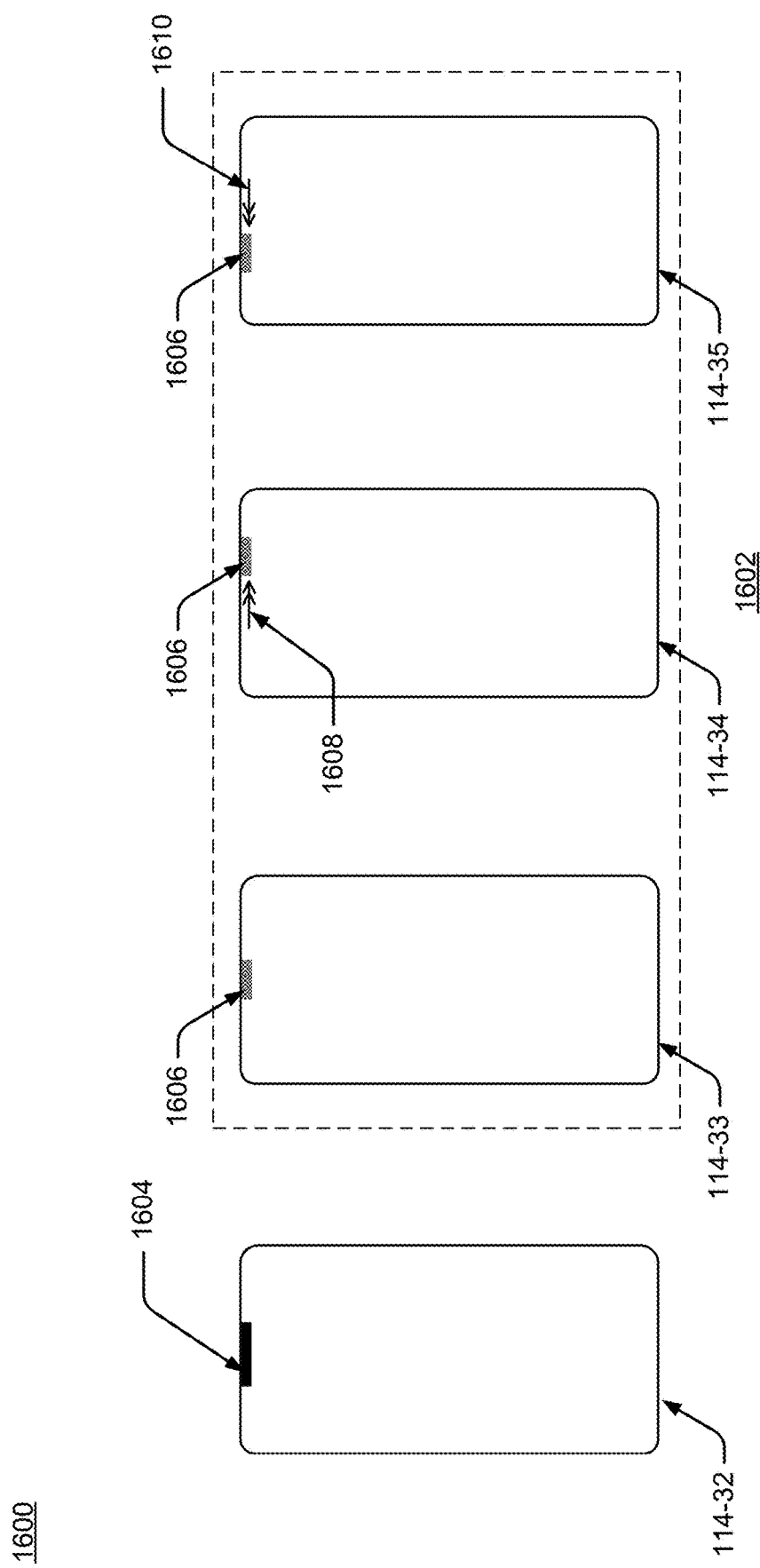

For example, FIG. 16 shows, generally at 1600, another example sequence 1602 that describes another visual feedback element (e.g., another form of the gesture-paused feedback element 124) that can be used to show a user that the electronic device 102 is in the gesture-paused mode. In FIG. 16, an example display 114-32 is shown in a state in which at least one radar-gesture application is running and a user's hand is within the boundary of a gesture zone (e.g., similar to the state represented in the example display 114-8 described with reference to FIG. 9B). The example display 114-32 is presenting a visual element 1604, shown as an illuminated line near the top of the example display 114-32, to indicate the availability of radar gestures and that the user's hand is within the gesture zone. The example sequence 1602 (shown within a dashed-line rectangle) begins with an example display 114-33, in which another visual element 1606 replaces the visual element 1604, in response to the electronic device 102 detecting the gesture-pause trigger 122 (e.g., an action that causes the electronic device 102 to enter the gesture-paused mode, such as the movement 1504 described with reference to FIG. 15). As shown on the example display 114-33, the visual element 1606 is another line that is shorter and dimmer than the visual element 1604.

The sequence 1602 continues in another example display 114-34, in which the visual element 1606 begins moving to the right, as shown by an arrow 1608. Continuing the sequence 1602 in another example display 114-35, the visual element 1606 moves to the left as shown by an arrow 1610. In the sequence 1602, the visual element 1606 may stop and reverse direction before it reaches a side of the display or go all the way to the edge before reversing direction. In some implementations, the visual element 1606 may further shrink when it stops to reverse directions and then return to another size when, after, or as, it begins moving in the opposite direction.

Further, the oscillation of the visual element 1606 may match the condition upon which the gesture-paused mode is based. For example, in the case of the user's arms swinging, the velocity or frequency of the oscillation of the visual element 1606 may approximately match the velocity or frequency of the user's hand moving. In some cases, the sequence 1602 can also begin at another location on the display 114 and proceed in another direction, such as right to left, top to bottom, or bottom to top (e.g., depending on the orientation of content on the display 114, the direction of the radar gestures, or another factor). When the electronic device 102 exits the gesture-paused mode, the sequence 1506 (or 1602) is complete and the display 114 returns to an appropriate state, depending on whether there are radar-gesture applications running and on the location of the user's hand The sequences 1506 and 1602 can help the user understand when gestures may be paused and allow the user to adjust how the electronic device 102 is used to avoid or take advantage of the gesture-paused mode, which can improve the user's experience with the electronic device 102. For example, the movement of the gesture-paused feedback element 124 that matches the movement of the user in the radar field or of the electronic device 102 helps communicate to the user that the gesture-paused mode has been activated, because there is correlation between the motion of the gesture-paused feedback element 124 and the state of the electronic device 102 (movement or oscillation).

In some cases (not shown in FIG. 15 or FIG. 16), the user's motion may not introduce ambiguity, such as a situation in which the user is walking with the electronic device and holding it steady in front of the user. In these cases, the electronic device does not enter the gesture-paused mode and the visual element 1502 (or 1604) may change one or more visual parameters to alert the user that radar gestures are available, even while the user and the electronic device are in motion. For example, the visual element 1502 (or 1606) may change from a default color to another color (e.g., from grey to blue, grey to white, or white to blue).

In some implementations, the electronic device 102 can determine that the radar-gesture application running on the electronic device 102 is operating in an immersive mode (e.g., in a full-screen mode without any presented controls). In response to this determination, the display can periodically provide the visual elements described with reference to FIGS. 8-16 (e.g., the visual elements 802, 804, 906, 910, 1004, 1102, 1204, 1304, 1404, 1502, 1604, 1606, and/or the gesture-paused feedback element 124). For example, the visual element can be provided on the display for a time duration and then stop being provided for another time duration. The time durations may be selectable (e.g., by a user or by the electronic device 102, based on factors such as the type of radar-gesture application running in the immersive mode, the status of the radar-gesture application, or the frequency with which the user employs a radar gesture).

Further, the visual elements described above with reference to FIGS. 8-16 (e.g., the visual elements 802, 804, 906, 910, 1004, 1102, 1204, 1304, 1404, 1502, 1604, 1606, and/or the gesture-paused feedback element 124), may be presented in any suitable color that can be visually differentiated from the background of the display on which it is presented. Further, the color of the visual elements may change based on any of a variety of factors, such as an operational state of the electronic device or an ambient background color of the display. For example, the radar system 104, input-mode manager 106, application manager 116, or another entity, module, or manager, can determine a background color of a region of the display on which the visual element is, or will be, displayed. In response to determining the background color, the visual element may be presented in another color that is different from the background color. The different color can provide human-discernable contrast between the visual element and the background color to make it easier for the user to see the visual element. In some cases, the color of the visual element can be continuously, automatically, and dynamically adjusted, based on changes to the background color.

In some cases, as described herein, the visual element may be hidden even when radar gestures are available (e.g., because the user interacted with a voice or touch input, or in order to reduce the risk of screen burn-in). In this situation, the visual element (e.g., the example visual elements illustrated in FIGS. 8-16), may still be shown when the appropriate conditions are met (e.g., the user makes a successful or unsuccessful radar gesture or the gesture-paused mode is activated). Consider a variation of the music player example above, in which the visual element is hidden while the user is listening to music and using a voice input to open another application. In this example, the user performs a radar gesture to skip a song, and the display presents the sequence 1008 (or 1108) to notify the user that the radar gesture was successful.

Figure 17:
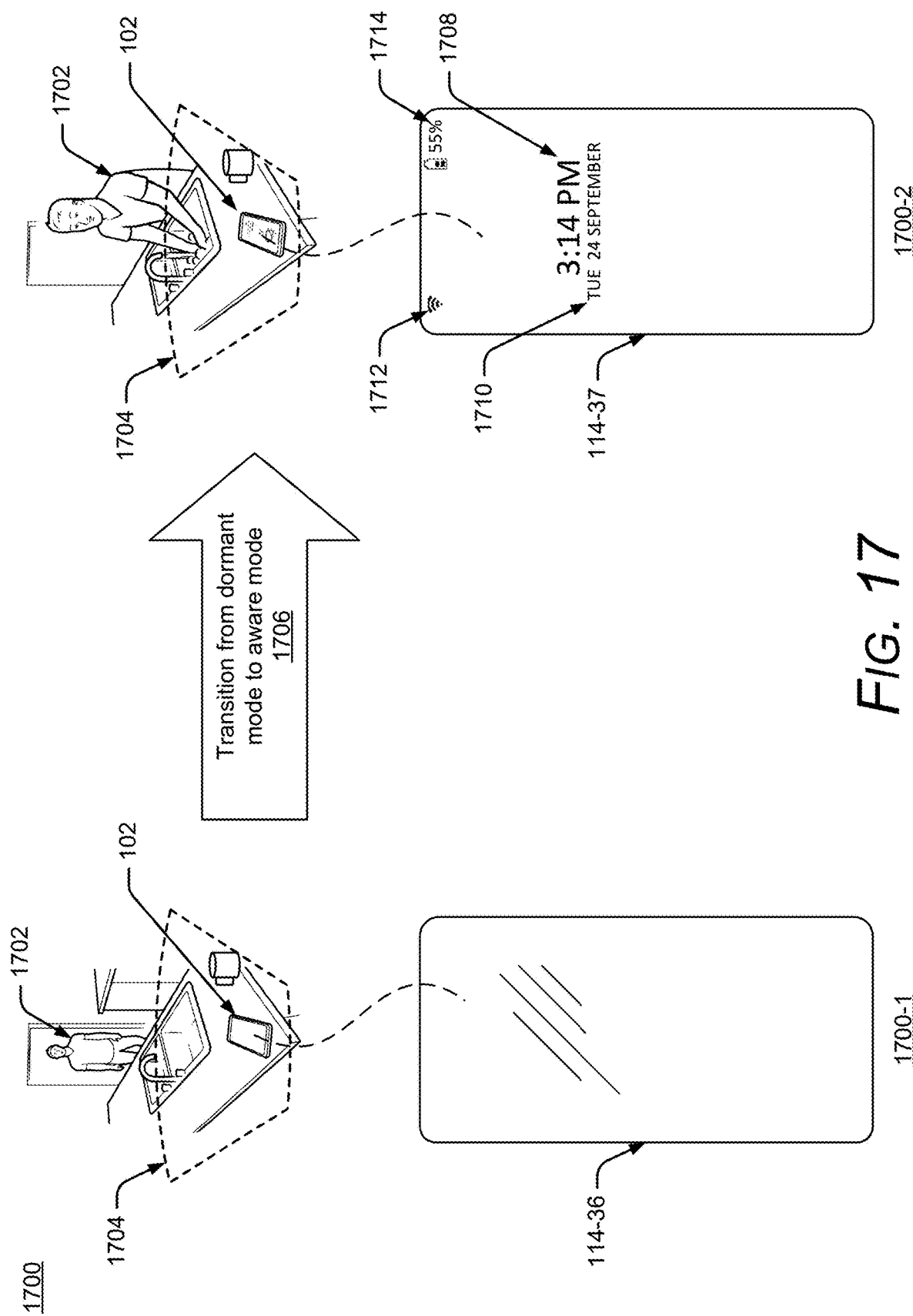
FIGS. 17-19 illustrate the electronic device of FIGS. 1 and 2 operating in multiple modes with examples of the visual elements that can be presented on the display in the different modes.
Figure 18:
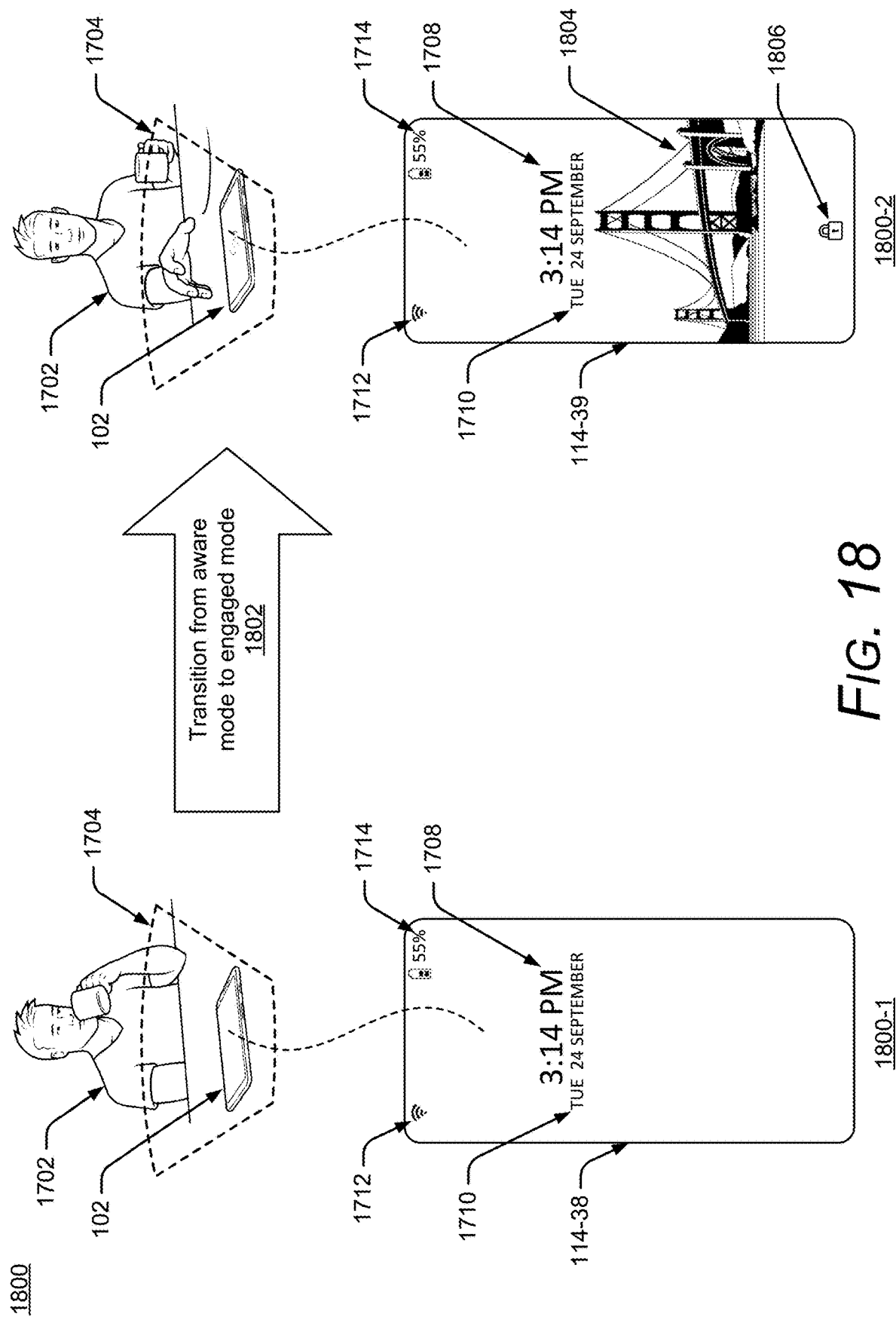
Figure 19:
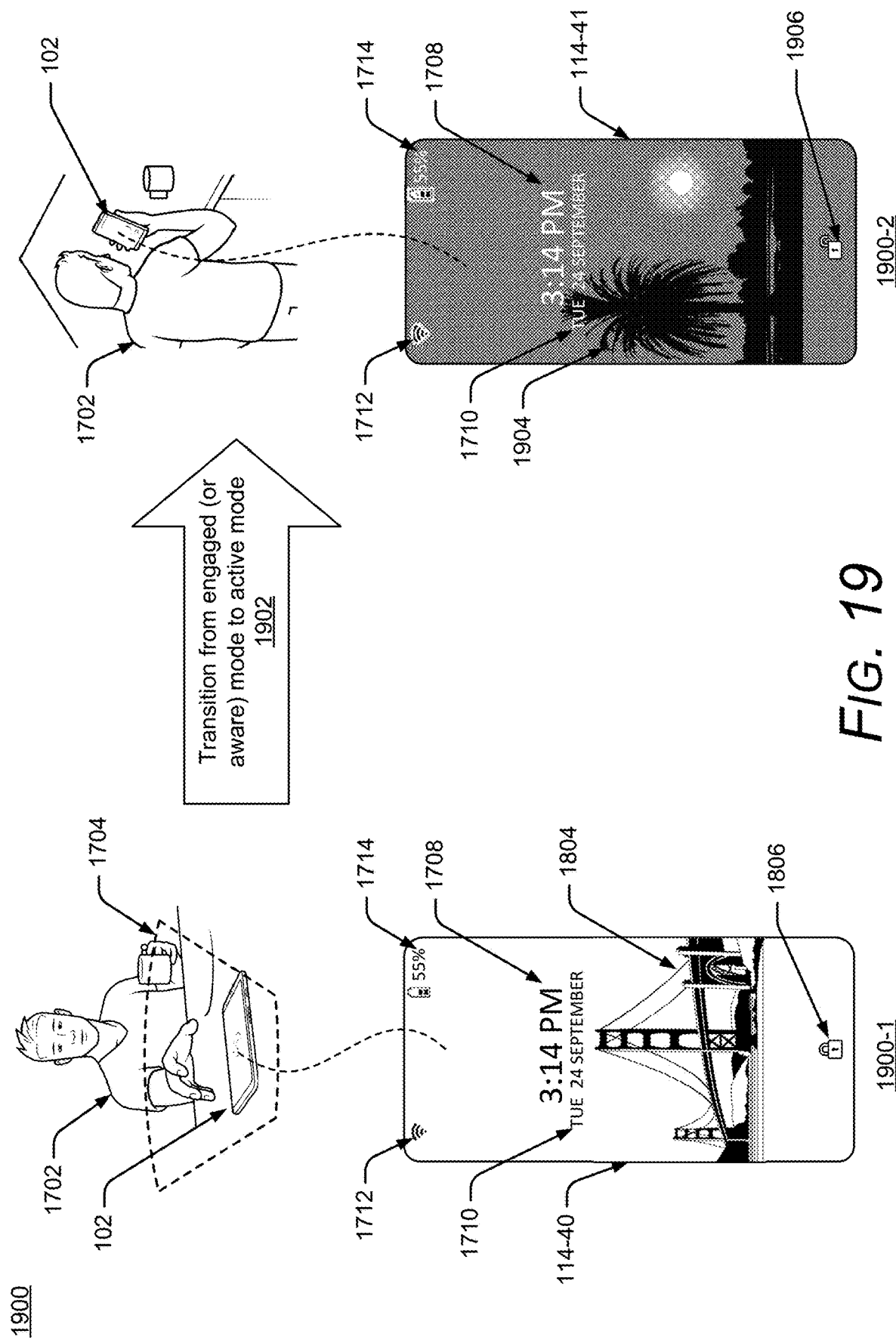

The user's location and movements can also be used to detect user actions that are categorized as indications of the user's intention to interact (or not interact) with the electronic device. For example, the electronic device may have access to a library (e.g., in a memory device) of actions that are categorized as indicators of a user's intent to interact or not interact with the device (e.g., reaching for the electronic device, turning or walking toward or away from the electronic device, leaning toward or looking at the electronic device). In some cases, the electronic device may also include machine-learning technology that can add, remove, or modify the actions stored in the library. Based on the detection of the user's presence, movements, and intention, the electronic device can cause the electronic device to enter and exit different modes of functionality and present different visual elements on a display, based on the modes. These modes can enable different functionalities for the electronic device, and help the user understand the mode the electronic device is operating in, and the services and functions that are available. FIGS. 17-19 illustrate the electronic device operating in the multiple modes and describe examples of the visual elements that can be presented on the display in the different modes.

For instance, when the user is not detected near the electronic device (e.g., within the radar field 110 or the recognition zone), the device operates in a dormant mode. In the dormant mode, the display (e.g., the display 114) may present fewer visual elements than in other modes, or no visual elements and the display may be on or off. When the electronic device determines the presence of the user within the recognition zone (e.g., using radar data, or one or more subsets of the radar data, from the radar system 104), the electronic device exits the dormant mode and enters an aware mode. In the aware mode, the display presents one or more visual elements that can indicate a status or functionality level of the electronic device.

While the electronic device is in the aware mode, the electronic device can detect a user action that is categorized as an indication of a user intent to interact with the electronic device. In response to detecting this user action, the electronic device can prepare an authentication system to perform an authentication process. In some implementations, when the electronic device detects the indication of the user's intent to interact, the electronic device also exits the aware mode and enters an engaged mode. In the engaged mode, the display presents additional or alternate visual elements that can indicate changes in the status or functionality level of the electronic device. The electronic device can also detect a trigger event and, based on the trigger event, cause the authentication system to authenticate the user. In response to the user being authenticated, the electronic device exits the aware or engaged mode and enters an active mode. In the active mode, the display presents additional or alternate visual elements that can indicate changes in the status or functionality level of the electronic device.

FIG. 17 illustrates an example 1700 of an electronic device transitioning from the dormant mode to the aware mode. A detail view 1700-1 shows the electronic device 102 in the dormant mode while a user 1702 is outside of a recognition zone 1704. In this example, the recognition zone 1704 has a wedge shape, but as noted, the recognition zone 1704 can take any suitable shape or size. Continuing the example, in this case the display 114 is not presenting any visual elements in the dormant mode, as shown on an example display 114-36. In another detail view 1700-2, the user 1702 is closer to the electronic device 102, which has determined that the user 1702 has entered the recognition zone 1704. Based on this determination, the electronic device 102 exits the dormant mode and enters the aware mode, as shown by an arrow 1706.

In the detail view 1700-2, multiple visual elements are presented on an example display 114-37. For example, in the aware mode, the example display 114-37 presents a time-of-day element 1708 (a clock), a date element 1710, a connectivity status element 1712 (e.g., Wi-Fi, cellular, or other network connectivity), and a battery-level indicator element 1714 (including a graphical element and a percentage indicator). In the detail view 1700-2, the remainder of the example display 114-37 is blank. In some implementations, however, additional elements may be displayed, including a background image, such as a wallpaper or other image. Though not shown in FIG. 17, if the user 1702 exits the recognition zone 1704, the electronic device 102 may stop displaying the visual elements and return to the dormant mode (immediately or after the user 1702 has been outside the recognition zone 1704 for a selectable predetermined amount of time).

FIG. 18 illustrates an example 1800 of an electronic device transitioning from the aware mode to the optional engaged mode. A detail view 1800-1 shows the user 1702 within the recognition zone 1704 and the electronic device 102 in the aware mode, as described with reference to FIG. 17, including displaying multiple visual elements (1708, 1710, 1712, 1714) on an example display 114-38. Another detail view 1800-2 shows the user 1702 reaching for the electronic device 102. The electronic device 102 detects the reach (e.g., using one or more subsets of the radar data) as a user action that is an indication of a user intent to interact with the electronic device 102. In response to detecting this user action indicating intent, the electronic device 102 exits the aware mode and enters the engaged mode, as shown by an arrow 1802.

In the detail view 1800-2, additional visual elements are presented on an example display 114-39. For example, in the engaged mode, the example display 114-39 presents a background image 1804 (in this case, an image of the Golden Gate Bridge). The background image 1804 may have dynamic features that adjust with the context of the user, such as animation, or varying brightness or transparency levels that change depending on the distance or speed of the reach. While in the engaged mode, the electronic device 102 also prepares an authentication system to perform an authentication process (note that in some cases, the electronic device 102 does not enter the engaged mode and instead prepares the authentication system while in the aware mode, in response to the user action that indicates user intent). Accordingly, the example display 114-39 also presents a lock icon 1806, which indicates that full access to the electronic device 102 is unavailable until the user 1702 is authenticated. In some implementations, additional visual elements may be displayed on the example display 114-39, and some or all of the visual elements presented on the example display 114-38 may cease being presented. Though not shown in FIG. 18, if the user 1702 withdraws the reach gestures, the electronic device 102 may exit the engaged mode and return to the aware mode (immediately or after the reach has been withdrawn for a selectable predetermined amount of time).

FIG. 19 illustrates an example 1900 of an electronic device transitioning from the engaged mode to the active mode after the user 1702 is authenticated (note that in some implementations, the electronic device can transition to the active mode from the aware mode). A detail view 1900-1 shows the user 1702 within the recognition zone 1704 and the electronic device 102 in the engaged mode, as described with reference to FIG. 18, including displaying multiple visual elements on an example display 114-40 (1708, 1710, 1712, 1714, 1804, 1806). As noted with reference to FIG. 18, when the user reaches for the electronic device 102, the authentication system prepares to authenticate the user 1702. In FIG. 19, another detail view 1900-2 shows that the user 1702 has picked up the electronic device 102. The electronic device 102 determines that being picked up is a trigger event, as described above, and authenticates the user 1702. When the user 1702 is authenticated, the electronic device 102 exits the engaged mode (or the aware mode) and enters an active mode, as shown by an arrow 1902.

Additional visual elements associated with the active mode may also be presented on an example display 114-41, as shown in the detail view 1900-2. For example, in the active mode, the example display 114-41 continues to present the visual elements associated with the aware mode, but the background image 1804 (associated with the engaged mode) has changed to another background image 1904, a beach silhouette (note that because the background image 1904 has a different color scheme, some of the visual elements have changed contrast or color so that they remain visible to the user 1702). Additionally, the engaged mode lock icon 1806 has transitioned to an unlock icon 1906, which indicates that the user 1702 is authenticated. In some implementations, the unlock icon 1906 may be presented for a duration of time and then fade. While not illustrated in FIG. 19, additional visual elements may be displayed on the example display 114-41 after the unlock icon 1906 fades, such as an instruction (e.g., "Swipe or tap to open"), one or more application launch icons, or other visual elements available to the electronic device 102.

In some implementations, the user 1702 may remain authenticated while the user 1702 remains within the recognition zone (e.g., the recognition zone 1704) or within another defined area within which the radar system can detect the presence of the user 1702. In these implementations, the display 114 may remain powered and able to receive input and present content, or the screen may turn off to save battery power. Because the user 1702 remains authenticated, even if the screen is off, the user can access the electronic device 102 by touching the screen, picking up the device, or another action, without having to be re-authenticated. In this way, the user's enjoyment and experience with the electronic device 102 can be improved while preserving battery power.

Further, the described progression between modes (e.g., from the dormant mode, through the aware and engaged modes, to authentication and the active mode), may instead run in an opposite direction. For example, when the electronic device 102 is in the active mode and the user 1702 sets it down (e.g., another trigger event occurs), the electronic device may enter a locked state (e.g., de-authenticate the user 1702), and/or place the electronic device 102 in the engaged or aware mode, as described above. Accordingly, if the user's hand remains near the electronic device 102 (e.g., remains in a "reach" position), the electronic device 102 may remain in the engaged mode. Conversely, if the user's hand is withdrawn, the electronic device 102 may enter the aware mode. Then, as noted, the electronic device 102 may remain in the aware mode while the user is in the recognition zone. During this progression between zones, the display 114 may present the visual elements described above for each zone, to indicate the changing status of the electronic device 102 to the user 1702.

As noted, in some implementations, applications running on the electronic device 102 may be able to receive input through radar-based touch-independent gestures (radar gestures). In these cases, the radar system 104 may detect a reach by the user and perform actions, based on the context of the electronic device 102. For example, when the electronic device is in any of the modes described above, the user may receive a phone call, receive an alarm, alert, or notification, or play music through the electronic device. In these situations, the user may reach toward the electronic device to respond to the action. Thus, a reach may reduce or silence the ringer or notification during an incoming call or an alarm. Further, if the user notices an alert or notification is being displayed, and reaches toward the electronic device, the notification may be dismissed or become interactive. For example, upon detecting the user's reach, the electronic device may display the notification in a mode that allows the user to respond by dismissing or postponing the alert/notification, replying (in the case of a message or email notification), or in another manner. In some cases, the displayed notification may change color or size as well. In the example of the user listening to music, a reach may cause the electronic device to present a control screen for the music player, so that the user can control the track, volume, or other parameter.

Some or all of these features may be available in different modes, and which features are available may be user-selectable. For example, the user may allow volume silencing and music control in all modes but allow responding to alerts and notifications only in the active mode (e.g., when the user has been authenticated and has not left the recognition zone). Other combinations of features and permission levels may also be selected by the user.

Among the advantages of the described implementations, including implementations in which radar sensing is used to detect the presence of the user within a recognition zone, and further including implementations in which radar is used to detect user action that is categorized as an indication of a user intent to interact with the electronic device, either of which might alternatively be achievable using the on-device camera that is provided with most modern smartphones, is that the power usage of the radar facility is substantially less than the power usage of the camera facility, while the propriety of the results can often be better with the radar facility than with the camera facility. For example, using the radar facility described hereinabove, the desired user-state or user-intention detection can be achieved at average power ranging from single-digit milliwatts to just a few dozen milliwatts (e.g., 10 mW, 20 mW, 30 mW or 40 mW), even including the processing power for processing the radar vector data to make the determinations. At these low levels of power, it would be readily acceptable to have the radar facility in an always-on state. As such, for example, with the smartphone radar facility in the always-on state, the desired delightful and seamless experience presently described can still be provided for a user that has been sitting across the room from their smartphone for many hours.

In contrast, the optical cameras provided with most of today's smartphones typically operate at hundreds of milliwatts of power (e.g., an order of magnitude higher than 40 mW, which is 400 mW). At such power rates, optical cameras would be disadvantageous because they would significantly reduce the battery life of most of today's smartphones, so much so as to make it highly impractical, if not prohibitive, to have the optical camera in an always-on state. An additional advantage of the radar facility is that the field of view can be quite large, readily enough to detect a user walking up from any direction even when lying flat and face-up on a table (for many typical implementations in which the radar chip is facing outward in the same general direction as the selfie camera) and, furthermore, by virtue of its Doppler processing ability can be highly effective (especially at operating frequencies near 60 GHz) in detecting even relatively subtle movements of moving bodies from the variety of directions.

Additionally, the radar facility can operate in environments in which the performance of the camera facility is reduced or restricted. For example, in lower-light environments, the camera facility may have a reduced ability to detect shape or movement. In contrast, the radar facility performs as well in lower light as in full light. The radar facility can also detect presence and gestures through some obstacles. For instance, if the smartphone is in a pocket of a jacket or pair of pants, a camera facility cannot detect a user or a gesture. The radar facility, however, can still detect objects in its field, even through a fabric that would block the camera facility. An even further advantage of using a radar facility over an onboard video camera facility of a smartphone is privacy, because a user can have the advantages of the herein described delightful and seamless experiences while at the same time not needing to be worried that there is a video camera taking video of them for such purposes.

Example Computing System

Figure 20:
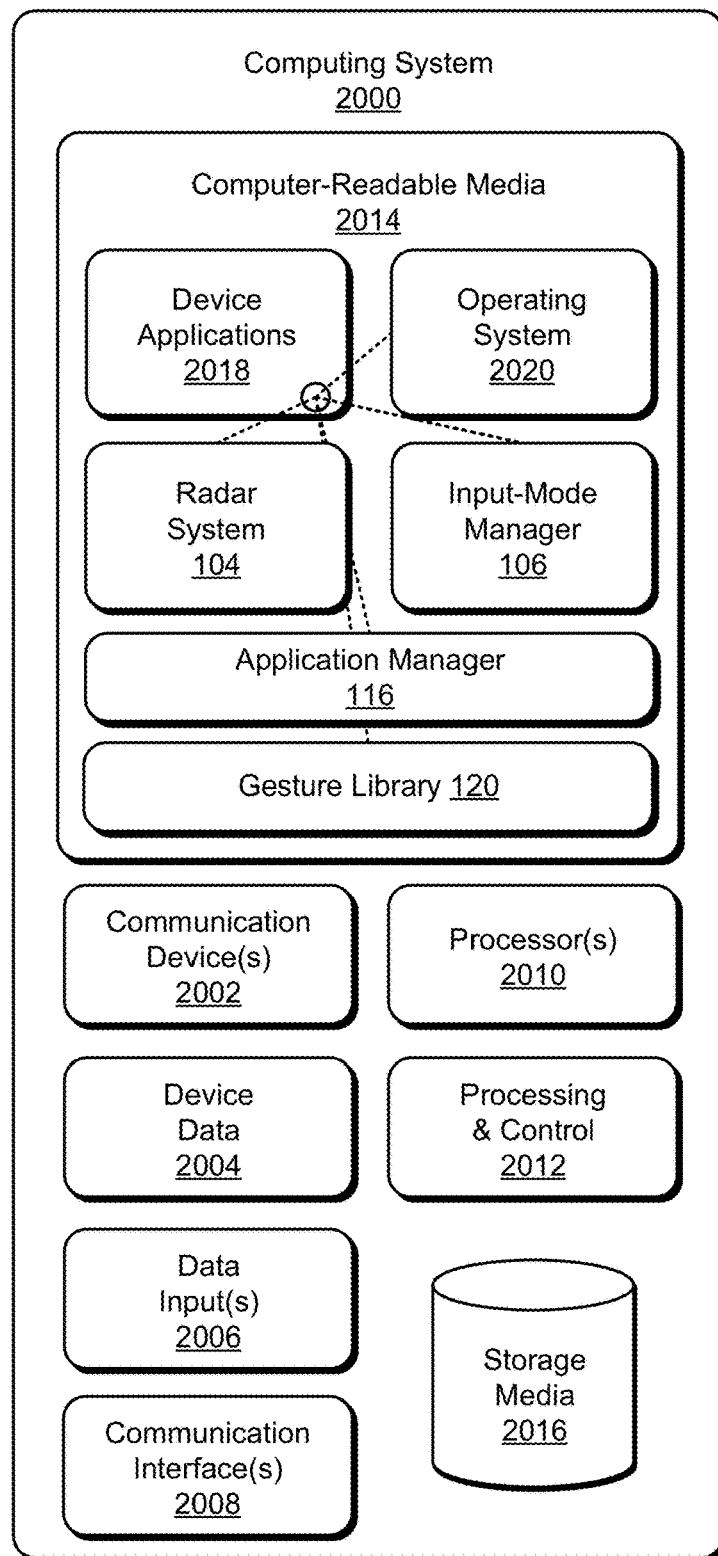
FIG. 20 illustrates an example computing system that can be implemented as any type of client, server, and/or electronic device as described with reference to FIGS. 1-19 to implement, or in which techniques may be implemented that enable, the visual indicator for paused radar gestures.

FIG. 20 illustrates various components of an example computing system 2000 that can be implemented as any type of client, server, and/or electronic device as described with reference to the previous FIGS. 1-19 to implement a visual indicator for paused radar gestures.

The computing system 2000 includes communication devices 2002 that enable wired and/or wireless communication of device data 2004 (e.g., radar data, authentication data, reference data, received data, data that is being received, data scheduled for broadcast, and data packets of the data). The device data 2004 or other device content can include configuration settings of the device, media content stored on the device, and/or information associated with a user of the device (e.g., an identity of a person within a radar field or customized gesture data). Media content stored on the computing system 2000 can include any type of radar, biometric, audio, video, and/or image data. The computing system 2000 includes one or more data inputs 2006 via which any type of data, media content, and/or inputs can be received, such as human utterances, interactions with a radar field (e.g., a radar gesture), touch inputs, user-selectable inputs or interactions (explicit or implicit), messages, music, television media content, recorded video content, and any other type of audio, video, and/or image data received from any content and/or data source.

The computing system 2000 also includes communication interfaces 2008, which can be implemented as any one or more of a serial and/or a parallel interface, a wireless interface, any type of network interface, a modem, and as any other type of communication interface. The communication interfaces 2008 provide a connection and/or communication links between the computing system 2000 and a communication network by which other electronic, computing, and communication devices communicate data with the computing system 2000.

The computing system 2000 includes one or more processors 2010 (e.g., any of microprocessors, controllers, or other controllers) that can process various computer-executable instructions to control the operation of the computing system 2000 and to enable techniques for, or in which can be implemented, the visual indicator for paused radar gestures. Alternatively or additionally, the computing system 2000 can be implemented with any one or combination of hardware, firmware, or fixed logic circuitry that is implemented in connection with processing and control circuits, which are generally identified at 2012. Although not shown, the computing system 2000 can include a system bus or data transfer system that couples the various components within the device. The system bus can include any one or combination of different bus structures, such as a memory bus or memory controller, a peripheral bus, a universal serial bus, and/or a processor or local bus that utilizes any of a variety of bus architectures. Also not shown, the computing system 2000 can include one or more non-radar sensors, such as the non-radar sensors 108.

The computing system 2000 also includes computer-readable media 2014, such as one or more memory devices that enable persistent and/or non-transitory data storage (e.g., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 2000 can also include a mass storage media device (storage media) 2016.

The computer-readable media 2014 provides data storage mechanisms to store the device data 2004, as well as various device applications 2018 and any other types of information and/or data related to operational aspects of the computing system 2000. For example, an operating system 2020 can be maintained as a computer application with the computer-readable media 2014 and executed on the processors 2010. The device applications 2018 may include a device manager, such as any form of a control application, software application, signal-processing and control modules, code that is native to a particular device, an abstraction module, a gesture recognition module, and/or other modules. The device applications 2018 may also include system components, engines, modules, or managers to implement the visual indicator for paused radar gestures, such as the radar system 104, the input-mode manager 106, the application manager 116, or the gesture library 120. The computing system 2000 may also include, or have access to, one or more machine-learning systems.

Several examples are described below.

Example 1: A method implemented in an electronic device that includes a display, a computer processor, and a radar system, the method comprising: detecting a gesture-pause trigger, the detecting during a period in which: the radar system provides a radar field through which a radar gesture can be determined; and an application capable of receiving a control input corresponding to the radar gesture is executing, through the computer processor, on the electronic device; and providing, in response to detecting the gesture-pause trigger, a gesture-paused feedback element on the display of the electronic device, the gesture-paused feedback element indicating that the application cannot perform an action associated with the control input.

Example 2: The method of example 1, wherein the gesture-pause trigger is at least one of: an oscillating motion of the electronic device, a first oscillation frequency of the oscillating motion of the electronic device exceeding a first threshold frequency; a motion of the electronic device at a velocity above a threshold velocity; or an oscillating motion of an object in the radar field, a second oscillation frequency of the oscillating motion of the object in the radar field exceeding a second threshold frequency.

Example 3: The method of example 1 or example 2, wherein the gesture-paused feedback element is a visual element that appears on an active area of the display.

Example 4: The method of example 3, wherein the visual element moves on the active area of the display, the movement corresponding to the gesture-pause trigger.

Example 5: The method of example 4, wherein the gesture-pause trigger is the oscillating motion of the electronic device and the corresponding movement of the visual element comprises: a decrease from a first luminosity of at least part of the visual element to a second luminosity of the at least part of the visual element; and a decrease from a first size of the visual feedback element to a second size of the visual feedback element.

Example 6: The method of example 5, wherein the corresponding movement of the visual element further comprises a lateral oscillation of the visual element, the lateral oscillation having a frequency that is approximately a same frequency as the first oscillation frequency of the oscillating motion of the electronic device.

Example 7: The method of example 4, wherein the gesture-pause trigger is the oscillating motion of the object in the radar field and the corresponding movement of the visual element comprises: a decrease from a first luminosity of at least part of the visual element to a second luminosity of the at least part of the visual element; and a decrease from a first size of the visual element to a second size of the visual element.

Example 8: The method of example 7, wherein the corresponding movement of the visual element further comprises a lateral oscillation of the visual element, the lateral oscillation having a frequency that is approximately a same frequency as the second oscillation frequency of the oscillating motion of the object in the radar field.

Example 9: The method of example 4, wherein: the gesture-pause trigger is the oscillating motion of the electronic device and the corresponding movement of the visual element comprises a lateral oscillation of the visual element, the lateral oscillation having a frequency that is approximately a same frequency as the first oscillation frequency of the oscillating motion of the electronic device; or the gesture-pause trigger is the oscillating motion of the object in the radar field and the corresponding movement of the visual element comprises a lateral oscillation of the visual element, the lateral oscillation having a frequency that is approximately a same frequency as the second oscillation frequency of the oscillating motion of the object in the radar field.

Example 10: The method of any of the preceding examples, further comprising: determining a background color of a region of the display on which the gesture-paused feedback element is displayed; and responsive to determining the background color of the region of the display on which the gesture-paused feedback element is displayed, causing the display to present the gesture-paused feedback element in another color that is different from the background color, the different color effective to provide human-discernable contrast between the gesture-paused feedback element and the region of the display on which the gesture-paused feedback element is displayed.

Example 11: The method of any of the preceding examples, further comprising: in response to detecting the gesture-pause trigger, causing the electronic device to: exit a current state in which the application can perform the action associated with the control input; and enter a new state in which the application cannot perform the action associated with the control input.

Example 12: An electronic device, comprising: a display; a computer processor; a radar system, implemented at least partially in hardware, configured to: provide a radar field; sense reflections from a user in the radar field; analyze the reflections from the user in the radar field; and provide, based on the analysis of the reflections, radar data; and a computer-readable media having instructions stored thereon that, responsive to execution by the computer processor, implement an input-mode manager configured to: detect a gesture-pause trigger, the detection during a period in which: the radar system is providing the radar field through which a radar gesture can be determined based on the radar data; and an application capable of receiving a control input corresponding to the radar gesture is executing, through the computer processor, on the electronic device; and provide, in response to the detection of the gesture-pause trigger, a gesture-paused feedback element on the display of the electronic device, the gesture-paused feedback element indicating that the application cannot perform an action associated with the control input.

Example 13: The electronic device of example 12, wherein the gesture-pause trigger is at least one of: an oscillating motion of the electronic device, a first oscillation frequency of the oscillating motion of the electronic device exceeding a first threshold frequency; a motion of the electronic device at a velocity above a threshold velocity; or an oscillating motion of an object in the radar field, the second oscillation frequency of the oscillating motion of the object in the radar field exceeding a second threshold frequency.

Example 14: The electronic device of example 12 or example 13, wherein the gesture-paused feedback element is a visual element that appears on an active area of the display of the electronic device.

Example 15: The electronic device of example 14, wherein the visual element moves on the active area of the display, the movement corresponding to the gesture-pause trigger.

Example 16: The electronic device of example 15, wherein the gesture-pause trigger is the oscillating motion of the electronic device and the corresponding movement of the visual element comprises: a decrease from a first luminosity of at least part of the visual element to a second luminosity of the at least part of the visual element; and a decrease from a first size of the visual feedback element to a second size of the visual feedback element.

Example 17: The electronic device of example 16, wherein the corresponding movement of the visual element further comprises a lateral oscillation of the visual element, the lateral oscillation having a frequency that is approximately a same frequency as the first oscillation frequency of the oscillating motion of the electronic device.

Example 18: The electronic device of example 15, wherein the gesture-pause trigger is the oscillating motion of the object in the radar field and the corresponding movement of the visual element comprises: a decrease from a first luminosity of at least part of the visual element to a second luminosity of the at least part of the visual element; and a decrease from a first size of the visual feedback element to a second size of the visual feedback element.

Example 19: The electronic device of example 18, wherein the corresponding movement of the visual element further comprises a lateral oscillation of the visual element, the lateral oscillation having a frequency that is approximately a same frequency as the second oscillation frequency of the oscillating motion of the object in the radar field.

Example 20: The electronic device of example 15, wherein: the gesture-pause trigger is the oscillating motion of the electronic device and the corresponding movement of the visual element comprises a lateral oscillation of the visual element, the lateral oscillation having a frequency that is approximately a same frequency as the first oscillation frequency of the oscillating motion of the electronic device; or the gesture-pause trigger is the oscillating motion of the object in the radar field and the corresponding movement of the visual element comprises a lateral oscillation of the visual element, the lateral oscillation having a frequency that is approximately a same frequency as the second oscillation frequency of the oscillating motion of the object in the radar field.

Example 21: The electronic device of any of examples 12-20, wherein the input-mode manager is further configured to: determine a background color of a region of the display on which the gesture-paused feedback element is displayed; and responsive to determining the background color of the region of the display on which the gesture-paused feedback element is displayed, cause the display to present the gesture-paused feedback element in another color that is different from the background color, the different color effective to provide human-discernable contrast between the gesture-paused feedback element and the region of the display on which the gesture-paused feedback element is displayed.

Example 22: The electronic device of any of examples 12-21, wherein the input-mode manager is further configured to: in response to detecting the gesture-pause trigger, cause the electronic device to: exit a current state in which the application can perform the action associated with the control input; and enter a new state in which the application cannot perform the action associated with the control input

CONCLUSION

Although implementations of techniques for, and apparatuses enabling, a visual indicator for paused radar gestures have been described in language specific to features and/or methods, it is to be understood that the subject of the appended claims is not necessarily limited to the specific features or methods described. Rather, the specific features and methods are disclosed as example implementations enabling the visual indicator for paused radar gestures.

What is claimed is:

1. A method implemented in an electronic device that includes a display, a computer processor, and a radar system, the method comprising:
   detecting a gesture-pause trigger, the detecting during a period in which:
      the radar system provides a radar field through which a radar gesture can be determined; and
      an application capable of receiving a control input corresponding to the radar gesture is executing, through the computer processor, on the electronic device; and
   providing, in response to detecting the gesture-pause trigger, a gesture-paused feedback element on the display of the electronic device, the gesture-paused feedback element comprising a visual element that:
      is presented on an active area of the display of the electronic device;
      moves on the active area of the display of the electronic device, the movement of the visual element corresponding to the gesture-pause trigger; and
      indicates that the application cannot perform an action associated with the control input.

2. The method of claim 1, wherein the gesture-pause trigger comprises at least one of:
   an oscillating motion of the electronic device, a first oscillation frequency of the oscillating motion of the electronic device exceeding a first threshold frequency;
   a motion of the electronic device at a velocity above a threshold velocity; or
   an oscillating motion of an object in the radar field, a second oscillation frequency of the oscillating motion of the object in the radar field exceeding a second threshold frequency.

3. The method of claim 2, wherein the gesture-pause trigger comprises the oscillating motion of the electronic device and the corresponding movement of the visual element comprises:
   a decrease from a first luminosity of at least part of the visual element to a second luminosity of the at least part of the visual element; and
   a decrease from a first size of the visual feedback element to a second size of the visual feedback element.

4. The method of claim 3, wherein the corresponding movement of the visual element further comprises a lateral oscillation of the visual element, the lateral oscillation having a frequency that is approximately a same frequency as the first oscillation frequency of the oscillating motion of the electronic device.

5. The method of claim 2, wherein the gesture-pause trigger comprises the oscillating motion of the object in the radar field and the corresponding movement of the visual element comprises:
   a decrease from a first luminosity of at least part of the visual element to a second luminosity of the at least part of the visual element; and
   a decrease from a first size of the visual element to a second size of the visual element.

6. The method of claim 5, wherein the corresponding movement of the visual element further comprises a lateral oscillation of the visual element, the lateral oscillation having a frequency that is approximately a same frequency as the second oscillation frequency of the oscillating motion of the object in the radar field.

7. The method of claim 2, wherein:
   the gesture-pause trigger comprises the oscillating motion of the electronic device and the corresponding movement of the visual element comprises a lateral oscillation of the visual element, the lateral oscillation having a frequency that is approximately a same frequency as the first oscillation frequency of the oscillating motion of the electronic device; or the gesture-pause trigger comprises the oscillating motion of the object in the radar field and the corresponding movement of the visual element comprises a lateral oscillation of the visual element, the lateral oscillation having a frequency that is approximately a same frequency as the second oscillation frequency of the oscillating motion of the object in the radar field.

8. The method of claim 1, further comprising:
determining a background color of a region of the display on which the gesture-paused feedback element is displayed; and
responsive to determining the background color of the region of the display on which the gesture-paused feedback element is displayed, causing the display to present the gesture-paused feedback element in another color that is different from the background color, the different color effective to provide human-discernable contrast between the gesture-paused feedback element and the region of the display on which the gesture-paused feedback element is displayed.

9. The method of claim 1, further comprising:
responsive to detecting the gesture-pause trigger, causing the electronic device to exit a current state in which the application can perform the action associated with the control input, and enter a new state in which the application cannot perform the action associated with the control input.

10. The method of claim 1, further comprising:
determining whether the user is interacting with the electronic device using input other than a radar gesture;
responsive to a determination that the user is interacting with the electronic device using input other than a radar gesture, modifying the appearance of the visual element by causing the visual element to decrease in brightness or disappear; or
responsive to another determination that the user has ceased interacting with the electronic device using input other than a radar gesture, modifying the appearance of the visual element by causing the visual element to increase in brightness or reappear.

11. An electronic device, comprising:
a display;
a computer processor;
a radar system, implemented at least partially in hardware, configured to:
provide a radar field;
sense reflections from a user in the radar field;
analyze the reflections from the user in the radar field; and
provide, based on the analysis of the reflections, radar data; and
a computer-readable media having instructions stored thereon that, responsive to execution by the computer processor, implement an input-mode manager configured to:
detect a gesture-pause trigger, the detection during a period in which:
the radar system is providing the radar field through which a radar gesture can be determined based on the radar data; and
an application capable of receiving a control input corresponding to the radar gesture is executing, through the computer processor, on the electronic device; and
provide, in response to the detection of the gesture-pause trigger, a gesture-paused feedback element on the display of the electronic device, the gesture-paused feedback element comprising a visual element that:
is presented on an active area of the display;
moves on the active area of the display, the movement of the visual element corresponding to the gesture-pause trigger; and
indicates that the application cannot perform an action associated with the control input.

12. The electronic device of claim 11, wherein the gesture-pause trigger comprises at least one of:
an oscillating motion of the electronic device, a first oscillation frequency of the oscillating motion of the electronic device exceeding a first threshold frequency;
a motion of the electronic device at a velocity above a threshold velocity; or
an oscillating motion of an object in the radar field, a second oscillation frequency of the oscillating motion of the object in the radar field exceeding a second threshold frequency.

13. The electronic device of claim 12, wherein the gesture-pause trigger comprises the oscillating motion of the electronic device and the corresponding movement of the visual element comprises:
a decrease from a first luminosity of at least part of the visual element to a second luminosity of the at least part of the visual element; and
a decrease from a first size of the visual feedback element to a second size of the visual feedback element.

14. The electronic device of claim 13, wherein the corresponding movement of the visual element further comprises a lateral oscillation of the visual element, the lateral oscillation having a frequency that is approximately a same frequency as the first oscillation frequency of the oscillating motion of the electronic device.

15. The electronic device of claim 12, wherein the gesture-pause trigger comprises the oscillating motion of the object in the radar field and the corresponding movement of the visual element comprises:
a decrease from a first luminosity of at least part of the visual element to a second luminosity of the at least part of the visual element; and
a decrease from a first size of the visual feedback element to a second size of the visual feedback element.

16. The electronic device of claim 15, wherein the corresponding movement of the visual element further comprises a lateral oscillation of the visual element, the lateral oscillation having a frequency that is approximately a same frequency as the second oscillation frequency of the oscillating motion of the object in the radar field.

17. The electronic device of claim 12, wherein:
the gesture-pause trigger comprises the oscillating motion of the electronic device and the corresponding movement of the visual element comprises a lateral oscillation of the visual element, the lateral oscillation having a frequency that is approximately a same frequency as the first oscillation frequency of the oscillating motion of the electronic device; or
the gesture-pause trigger comprises the oscillating motion of the object in the radar field and the corresponding movement of the visual element comprises a lateral oscillation of the visual element, the lateral oscillation having a frequency that is approximately a same frequency as the second oscillation frequency of the oscillating motion of the object in the radar field.

18. The electronic device of claim 11, wherein the input-mode manager is further configured to:

determine a background color of a region of the display on which the gesture-paused feedback element is displayed; and responsive to determining the background color of the region of the display on which the gesture-paused feedback element is displayed, cause the display to present the gesture-paused feedback element in another color that is different from the background color, the different color effective to provide human-discernable contrast between the gesture-paused feedback element and the region of the display on which the gesture-paused feedback element is displayed.

19. The electronic device of claim 11, wherein the input-mode manager is further configured to, responsive to detecting the gesture-pause trigger, cause the electronic device to:

exit a current state in which the application can perform the action associated with the control input; and enter a new state in which the application cannot perform the action associated with the control input.

20. The electronic device of claim 11, wherein the input-mode manager is further configured to:

determine that the user is interacting with the electronic device using input other than a radar gesture;

responsive to the determination that the user is interacting with the electronic device using input other than a radar gesture, modify the appearance of the visual element by causing the visual element to decrease in brightness or disappear;

determine that the user has ceased interacting with the electronic device using input other than a radar gesture; and responsive to the determination that the user has ceased interacting with the electronic device using input other than a radar gesture, modify the appearance of the visual element by causing the visual element to increase in brightness or reappear.

\* \* \* \* \*